United States Patent
Mitchell et al.

(10) Patent No.: US 9,525,168 B2
(45) Date of Patent: Dec. 20, 2016

(54) DRY-PARTICLE BASED ADHESIVE AND DRY FILM AND METHODS OF MAKING SAME

(71) Applicant: MAXWELL TECHNOLOGIES, INC., San Diego, CA (US)

(72) Inventors: Porter Mitchell, Chandler, AZ (US); Xiaomei Xi, Carlsbad, CA (US); Linda Zhong, San Diego, CA (US); Bin Zou, Chandler, AZ (US)

(73) Assignee: Maxwell Technologies, Inc., San Diego, CA (US)

( * ) Notice: Subject to any disclaimer, the term of this patent is extended or adjusted under 35 U.S.C. 154(b) by 87 days.

(21) Appl. No.: 14/466,855

(22) Filed: Aug. 22, 2014

(65) Prior Publication Data
US 2015/0072234 A1    Mar. 12, 2015

Related U.S. Application Data

(63) Continuation of application No. 12/720,910, filed on Mar. 10, 2010, now Pat. No. 8,815,443, which is a
(Continued)

(51) Int. Cl.
*H01M 4/13* (2010.01)
*H01M 4/36* (2006.01)
(Continued)

(52) U.S. Cl.
CPC ............. *H01M 4/366* (2013.01); *H01G 11/28* (2013.01); *H01G 11/38* (2013.01); *H01M 4/02* (2013.01); *H01M 4/0404* (2013.01); *H01M 4/0409* (2013.01); *H01M 4/0416* (2013.01); *H01M 4/0435* (2013.01); *H01M 4/131* (2013.01); *H01M 4/1391* (2013.01); *H01M 4/1393* (2013.01); *H01M 4/50* (2013.01); *H01M 4/505* (2013.01); *H01M 4/525* (2013.01); *H01M 4/58* (2013.01); *H01M 4/587* (2013.01); *H01M 4/62* (2013.01); *H01M 4/621* (2013.01); *H01M 4/622* (2013.01); *H01M 4/623* (2013.01); *H01M 4/8668* (2013.01); *H01M 4/886* (2013.01);
(Continued)

(58) Field of Classification Search
CPC ...... H01G 11/28; H01G 11/38; H01M 10/052; H01M 4/02; H01M 4/0404; H01M 4/0409; H01M 4/0416; H01M 4/0435; H01M 4/1391; H01M 4/1393
See application file for complete search history.

(56) References Cited

U.S. PATENT DOCUMENTS

| | | |
|---|---|---|
| 2,234,608 A | 3/1941 | Robinson et al. |
| 2,692,210 A | 10/1954 | Burnham |

(Continued)

FOREIGN PATENT DOCUMENTS

| | | |
|---|---|---|
| CA | 660854 | 4/1963 |
| EP | 0146764 | 7/1985 |

(Continued)

*Primary Examiner* — Patrick Ryan
*Assistant Examiner* — Ben Lewis
(74) *Attorney, Agent, or Firm* — Knobbe Martens Olson & Bear LLP

(57) ABSTRACT

Dry process based energy storage device structures and methods for using a dry adhesive therein are disclosed.

31 Claims, 29 Drawing Sheets

Related U.S. Application Data continuation of application No. 11/251,408, filed on Oct. 14, 2005, now abandoned, which is a continuation-in-part of application No. 11/116,882, filed on Apr. 27, 2005, now abandoned, which is a continuation-in-part of application No. 10/817,701, filed on Apr. 2, 2004, now abandoned, said application No. 12/720,910 is a continuation-in-part of application No. 11/116,882, filed on Apr. 27, 2005, now abandoned, which is a continuation-in-part of application No. 10/817,701, filed on Apr. 2, 2004, now abandoned.

(60) Provisional application No. 60/498,210, filed on Aug. 26, 2003, provisional application No. 60/498,346, filed on Aug. 26, 2003, provisional application No. 60/486,530, filed on Jul. 10, 2003, provisional application No. 60/486,002, filed on Jul. 9, 2003, provisional application No. 60/546,093, filed on Feb. 19, 2004, provisional application No. 60/511,273, filed on Oct. 14, 2003.

(51) Int. Cl.
| | |
|---|---|
| *H01G 11/38* | (2013.01) |
| *H01M 4/02* | (2006.01) |
| *H01M 4/04* | (2006.01) |
| *H01M 4/1391* | (2010.01) |
| *H01M 4/1393* | (2010.01) |
| *H01M 4/50* | (2010.01) |
| *H01M 4/58* | (2010.01) |
| *H01M 4/587* | (2010.01) |
| *H01M 4/62* | (2006.01) |
| *H01M 4/86* | (2006.01) |
| *H01M 4/88* | (2006.01) |
| *H01M 4/90* | (2006.01) |
| *H01M 4/92* | (2006.01) |
| *H01M 10/052* | (2010.01) |
| *H01G 11/28* | (2013.01) |
| *H01M 4/131* | (2010.01) |
| *H01M 4/505* | (2010.01) |
| *H01M 4/525* | (2010.01) |
| *H01M 10/0525* | (2010.01) |
| *H01M 4/583* | (2010.01) |

(52) U.S. Cl.
CPC ......... *H01M 4/8896* (2013.01); *H01M 4/9083* (2013.01); *H01M 4/926* (2013.01); *H01M 10/052* (2013.01); *H01M 10/0525* (2013.01); *H01M 4/583* (2013.01); *Y02E 60/122* (2013.01); *Y02E 60/13* (2013.01); *Y02E 60/50* (2013.01); *Y02P 70/54* (2015.11); *Y10T 29/49108* (2015.01); *Y10T 428/28* (2015.01); *Y10T 428/2878* (2015.01); *Y10T 428/31504* (2015.04); *Y10T 428/31678* (2015.04)

(56) References Cited

U.S. PATENT DOCUMENTS

| | | | |
|---|---|---|---|
| 2,800,616 | A | 7/1957 | Becker |
| 3,060,254 | A | 10/1962 | Urry |
| 3,105,178 | A | 9/1963 | Meyers |
| 3,201,516 | A | 8/1965 | Weingartner |
| 3,288,641 | A | 11/1966 | Rightmire |
| 3,528,955 | A | 9/1970 | Lippman et al. |
| 3,864,124 | A | 2/1975 | Breton et al. |
| 4,129,633 | A | 12/1978 | Biddick |
| 4,153,661 | A | 5/1979 | Ree et al. |
| 4,175,055 | A | 11/1979 | Goller et al. |
| 4,177,159 | A | 12/1979 | Singer |
| 4,194,040 | A | 3/1980 | Breton et al. |
| 4,287,232 | A | 9/1981 | Goller et al. |
| 4,313,972 | A | 2/1982 | Goller et al. |
| 4,317,789 | A | 3/1982 | Groult et al. |
| 4,320,184 | A | 3/1982 | Bernstein et al. |
| 4,320,185 | A | 3/1982 | Bernstein et al. |
| 4,336,217 | A | 6/1982 | Sauer |
| 4,354,958 | A | 10/1982 | Solomon |
| 4,379,772 | A | 4/1983 | Solomon et al. |
| 4,383,010 | A | 5/1983 | Spaepen |
| 4,405,544 | A | 9/1983 | Solomon |
| 4,482,931 | A | 11/1984 | Yializis |
| 4,500,647 | A | 2/1985 | Solomon et al. |
| 4,518,705 | A | 5/1985 | Solomon et al. |
| 4,556,618 | A | 12/1985 | Shia |
| 4,808,493 | A | 2/1989 | Breault |
| 4,877,694 | A | 10/1989 | Solomon et al. |
| 4,895,775 | A | 1/1990 | Kato et al. |
| 4,917,309 | A | 4/1990 | Zander et al. |
| 5,100,747 | A | 3/1992 | Hayashida et al. |
| 5,144,595 | A | 9/1992 | Graham et al. |
| 5,162,178 | A | 11/1992 | Ohsawa et al. |
| 5,198,313 | A | 3/1993 | Juergens |
| 5,381,303 | A | 1/1995 | Yoshida et al. |
| 5,393,617 | A | 2/1995 | Klein |
| 5,456,000 | A | 10/1995 | Gozdz et al. |
| 5,470,357 | A | 11/1995 | Schmutz et al. |
| 5,478,363 | A | 12/1995 | Klein |
| 5,482,906 | A | 1/1996 | Sakai et al. |
| 5,557,497 | A | 9/1996 | Ivanov et al. |
| 5,593,462 | A | 1/1997 | Gueguen et al. |
| 5,636,437 | A | 6/1997 | Kaschmitler et al. |
| 5,675,553 | A | 10/1997 | O'Brien et al. |
| 5,703,906 | A | 12/1997 | O'Brien et al. |
| 5,707,763 | A | 1/1998 | Shimizu et al. |
| 5,757,675 | A | 5/1998 | O'Brien |
| 5,778,515 | A | 7/1998 | Menon |
| 5,786,555 | A | 7/1998 | Saito et al. |
| 5,840,087 | A | 11/1998 | Gozdz et al. |
| 5,846,675 | A | 12/1998 | Sazhin et al. |
| 5,849,431 | A | 12/1998 | Kita et al. |
| 5,863,676 | A | 1/1999 | Charkey et al. |
| 5,871,860 | A | 2/1999 | Frost |
| 5,879,836 | A | 3/1999 | Ikeda et al. |
| 5,914,019 | A | 6/1999 | Dodgson et al. |
| 5,922,491 | A | 7/1999 | Ikawa et al. |
| 5,966,414 | A | 10/1999 | O'Brien |
| 5,973,912 | A | 10/1999 | Kibi et al. |
| 6,022,436 | A | 2/2000 | Koslow et al. |
| 6,031,712 | A | 2/2000 | Kurihara et al. |
| 6,072,692 | A | 6/2000 | Hiratsuka et al. |
| 6,094,338 | A | 7/2000 | Hirahara et al. |
| 6,127,474 | A | 10/2000 | Andelman |
| 6,134,760 | A | 10/2000 | Mushiake et al. |
| 6,136,476 | A | 10/2000 | Schutts et al. |
| 6,150,050 | A | 11/2000 | Mathew et al. |
| 6,159,611 | A | 12/2000 | Lee et al. |
| 6,207,251 | B1 | 3/2001 | Balsimo et al. |
| 6,225,733 | B1 | 5/2001 | Gadkaree et al. |
| 6,236,560 | B1 | 5/2001 | Ikeda et al. |
| 6,242,121 | B1 | 6/2001 | Pedicini et al. |
| 6,246,568 | B1 | 6/2001 | Nakao et al. |
| 6,308,405 | B1 | 10/2001 | Takamatsu et al. |
| 6,310,756 | B1 | 10/2001 | Miura et al. |
| 6,310,759 | B2 | 10/2001 | Ishigaki et al. |
| 6,310,762 | B1 | 10/2001 | Okamura et al. |
| 6,349,027 | B1 | 2/2002 | Suhara et al. |
| 6,359,769 | B1 | 3/2002 | Mushiake et al. |
| 6,397,274 | B1 | 5/2002 | Miller |
| 6,403,257 | B1 | 6/2002 | Christian et al. |
| 6,428,931 | B1 | 8/2002 | Golovin |
| 6,452,782 | B1 | 9/2002 | Otsuki et al. |
| 6,466,516 | B1 | 10/2002 | O'Brien et al. |
| 6,493,210 | B2 | 12/2002 | Nonaka et al. |
| 6,503,661 | B1 * | 1/2003 | Park ............... H01M 10/0525 252/62.2 |
| 6,524,737 | B1 | 2/2003 | Tanii Tadaaki et al. |

(56) References Cited

U.S. PATENT DOCUMENTS

| | | |
|---|---|---|
| 6,582,545 B1 * | 6/2003 | Thiebolt, III ........... H01M 4/04 |
| | | 156/242 |
| 6,589,299 B2 | 7/2003 | Missling et al. |
| 6,614,646 B2 | 9/2003 | Bogaki et al. |
| 6,697,249 B2 | 2/2004 | Maletin et al. |
| 6,768,056 B2 | 7/2004 | Fischer et al. |
| 6,795,297 B2 | 9/2004 | Iwaida et al. |
| 6,808,845 B1 | 10/2004 | Nonaka et al. |
| 6,831,826 B2 | 12/2004 | Iwaida et al. |
| 6,841,594 B2 | 1/2005 | Jones et al. |
| 6,847,517 B2 | 1/2005 | Iwaida et al. |
| 6,887,617 B2 | 5/2005 | Sato et al. |
| 6,906,911 B2 | 6/2005 | Ikeda et al. |
| 6,914,768 B2 | 7/2005 | Matsumoto et al. |
| 7,018,568 B2 | 3/2006 | Tierney |
| 7,061,749 B2 | 6/2006 | Liu et al. |
| 7,090,946 B2 | 8/2006 | Mitchell et al. |
| 7,139,162 B2 | 11/2006 | Michel et al. |
| 7,199,997 B1 | 4/2007 | Lipka et al. |
| 7,227,737 B2 | 6/2007 | Mitchell et al. |
| 7,236,348 B2 | 6/2007 | Asano et al. |
| 7,295,423 B1 | 11/2007 | Mitchell et al. |
| 7,722,686 B2 | 5/2010 | Xi et al. |
| 2001/0049050 A1 | 12/2001 | Aragane Jun et al. |
| 2002/0039275 A1 | 4/2002 | Takeuchi et al. |
| 2002/0058179 A1 | 5/2002 | Segit et al. |
| 2002/0081495 A1 | 6/2002 | Nakajima et al. |
| 2002/0122985 A1 | 9/2002 | Sato et al. |
| 2002/0136948 A1 | 9/2002 | Missling et al. |
| 2002/0150812 A1 | 10/2002 | Kaz et al. |
| 2002/0163773 A1 | 11/2002 | Niiori et al. |
| 2002/0167782 A1 | 11/2002 | Andelman et al. |
| 2002/0167784 A1 | 11/2002 | Takatami et al. |
| 2003/0035997 A1 * | 2/2003 | Numata ............. C01G 45/1221 |
| | | 429/224 |
| 2003/0157314 A1 | 8/2003 | Penneau et al. |
| 2003/0165744 A1 | 9/2003 | Schubert et al. |
| 2003/0175588 A1 * | 9/2003 | Zhang ................ H01M 4/0404 |
| | | 429/217 |
| 2005/0064289 A1 | 3/2005 | Suzuki et al. |
| 2005/0078432 A1 | 4/2005 | Gallay et al. |
| 2005/0079599 A1 | 4/2005 | Bulan et al. |
| 2005/0186473 A1 | 8/2005 | Mitchell et al. |
| 2005/0225929 A1 | 10/2005 | Murakami et al. |
| 2005/0271798 A1 | 12/2005 | Zhong et al. |
| 2006/0054277 A1 | 3/2006 | Byun et al. |
| 2006/0112441 A1 | 5/2006 | Allen |
| 2006/0114643 A1 | 6/2006 | Mitchell et al. |
| 2006/0133012 A1 | 6/2006 | Zhong et al. |
| 2006/0133013 A1 | 6/2006 | Xi et al. |
| 2006/0146475 A1 | 7/2006 | Zhong et al. |
| 2006/0146479 A1 | 7/2006 | Mitchell et al. |
| 2006/0246343 A1 | 11/2006 | Mitchell et al. |
| 2007/0122698 A1 | 5/2007 | Mitchell et al. |
| 2007/0160901 A1 | 7/2007 | Kaun |
| 2007/0190424 A1 | 8/2007 | Mitchell et al. |

FOREIGN PATENT DOCUMENTS

| | | |
|---|---|---|
| EP | 0449145 | 10/1991 |
| EP | 1009058 | 6/2000 |
| EP | 1096587 | 5/2001 |
| EP | 1215742 | 6/2002 |
| EP | 1313158 | 5/2003 |
| EP | 1464620 | 10/2004 |
| JP | 04-067610 | 3/1992 |
| JP | 05-129020 | 5/1993 |
| JP | 05-326326 | 12/1993 |
| JP | 06-097003 | 4/1994 |
| JP | 07-201681 | 8/1995 |
| JP | 08-096810 | 4/1996 |
| JP | 2000-200737 | 7/2000 |
| JP | 2000-279777 | 10/2000 |
| JP | 2001-283918 | 10/2001 |
| JP | 2003-012311 | 1/2003 |
| JP | 2003-229124 | 8/2003 |
| JP | 2004-281096 | 10/2004 |
| WO | WO 01/39305 | 5/2001 |
| WO | WO 02/065563 | 8/2002 |
| WO | WO 03/015199 | 2/2003 |
| WO | WO 03/016219 | 2/2003 |
| WO | WO 03044245 | 5/2003 |
| WO | WO 03/065391 | 8/2003 |
| WO | WO 2006/001847 | 1/2006 |

\* cited by examiner

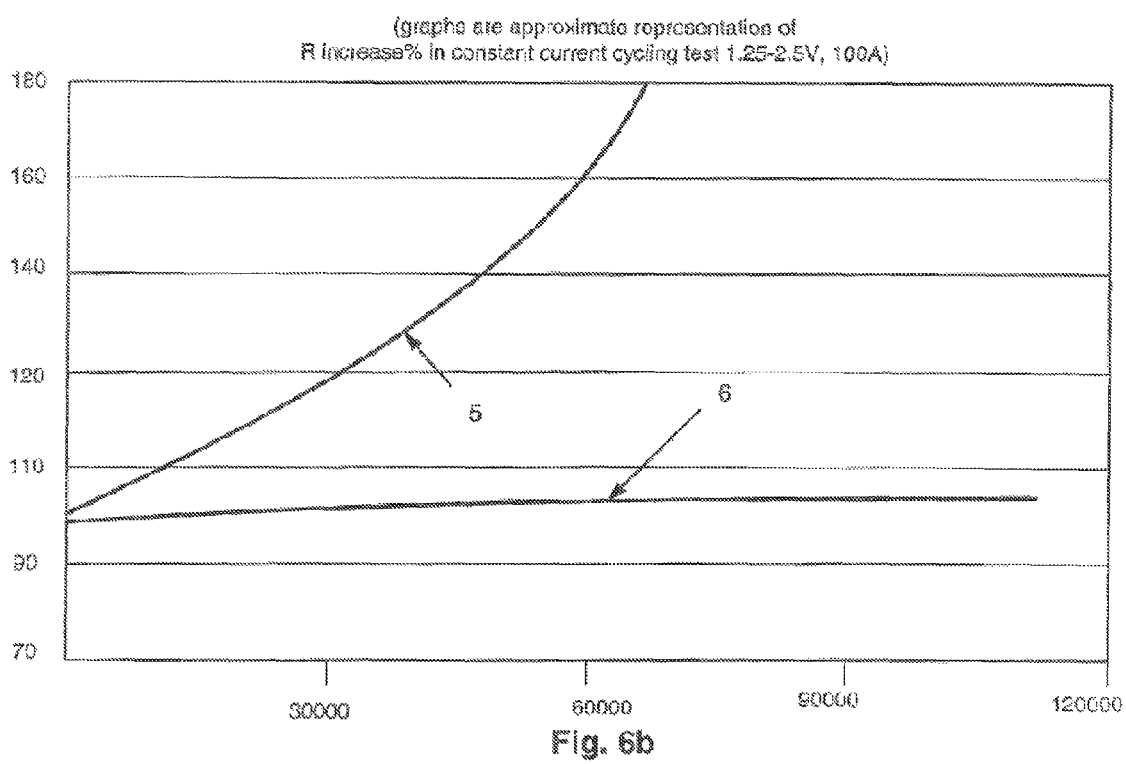

Fibrils

DRY-PARTICLE BASED ADHESIVE AND DRY FILM AND METHODS OF MAKING SAME

RELATED APPLICATIONS

Any and all applications for which a foreign or domestic priority claim is identified in the Application Data Sheet as filed with the present application are hereby incorporated by reference under 37 CFR 1.57.

FIELD OF THE INVENTION

The present invention relates generally to the field energy storage devices. More particularly, the present invention relates to structures and methods for making dry particle based adhesives and films for capacitor products.

BACKGROUND INFORMATION

Energy storage devices are used throughout modern society to provide energy. Inclusive of such energy storage devices are batteries, fuel cells, and capacitors. With each type of device are associated positive and negative characteristics. Based on these characteristics, decisions are made as to which device is more suitable for use in a particular application. Overall cost of an energy storage device is an important characteristic that can make or break a decision as to whether a particular type of energy storage device is used.

Double-layer capacitors, also referred to as ultracapacitors and super-capacitors, are energy storage devices that are able to store more energy per unit weight and unit volume than capacitors made with traditional technology, for example, electrolytic capacitors.

Double-layer capacitors store electrostatic energy in a polarized electrode/electrolyte interface layer. Double-layer capacitors include two electrodes, which are separated from contact by a porous separator. The separator prevents an electronic (as opposed to an ionic) current from shorting the two electrodes. Both the electrodes and the porous separator are immersed in an electrolyte, which allows flow of the ionic current between the electrodes and through the separator. At the electrode/electrolyte interface, a first layer of solvent dipole and a second layer of charged species is formed (hence, the name "double-layer" capacitor).

Although, double-layer capacitors can theoretically be operated at voltages as high as 4.0 volts, and possibly higher, current double-layer capacitor manufacturing technologies limit nominal operating voltages of double-layer capacitors to about 2.5 to 2.7 volts. Higher operating voltages are possible, but at such voltages undesirable destructive breakdown begins to occur, which in part may be due to interactions with impurities and residues that can be introduced into and/or attach themselves to electrodes during manufacture. For example, undesirable destructive breakdown of double-layer capacitors is seen to appear at voltages between about 2.7 to 3.0 volts.

Known capacitor electrode fabrication techniques utilize processing additive based coating and/or extrusion processes. Both processes utilize binders, which typically comprise polymers or resins that provide cohesion between structures used to make the capacitor. Known double-layer capacitors utilize electrode film and adhesive/binder layer formulations that have in common the use of one or more added processing additive (hereafter referred throughout as "additive"), variations of which are known to those skilled in the arts as solvents, to lubricants, liquids, plasticizers, and the like. When such additives are utilized in the manufacture of a capacitor product, the operating lifetime, as well maximum operating voltage, of a final capacitor product may become reduced, typically because of undesirable chemical interactions that can occur between residues of the additive(s) and a subsequently used capacitor electrolyte.

In a coating process, an additive (typically organic, aqueous, or blends of aqueous and organic solvents) is used to dissolve binders within a resulting wet slurry. The wet slurry is coated onto a collector through a doctor blade or a slot die. The slurry is subsequently dried to remove the solvent. With prior art coating based processes, as layer thickness is increased above a certain thickness or decreased below a certain thickness, it becomes increasingly more difficult to achieve an even homogeneous layer, for example, wherein a uniform above 25 micron thick coating of an adhesive/binder layer is desired, or a coating of less than 5 microns is desired. The process of coating also entails high-cost and complicated processes. Furthermore, coating processes require large capital investments, as well as high quality control to achieve a desired thickness, uniformity, top to bottom registration, and the like.

In the prior art, a first wet slurry layer is coated onto a current collector to provide the current collector with adhesive/binder layer functionality. A second slurry layer, with properties that provide functionality of a conductive electrode layer, may be coated onto the first coated layer. In another prior art example, an extruded layer can be applied to the first coated layer to provide conductive electrode layer functionality.

In the prior art process of forming an extruded conductive electrode layer, binder and carbon particles are blended together with one or more processing additive. The resulting material has dough-like properties that allow the material to be introduced into an extruder apparatus. The extruder apparatus fibrillates the binder and provides an extruded film, which is subsequently dried to remove most, but as discussed below, typically not all of the additive(s). When fibrillated, the binder acts to support the carbon particles as a matrix. The extruded film may be calendered many times to produce an electrode film of desired thickness and density.

Known methods for attaching additive/solvent based extruded electrode films and/or coated slurries to a current collector include the aforementioned precoating of a slurry of adhesive/binder. Pre-coated slurry layers of adhesive/binder are used in the capacitor prior arts to promote electrical and physical contact with current collectors, and the current collectors themselves provide a physical electrical contact point.

Impurities can be introduced or attach themselves during the aforementioned coating and/or extrusion processes, as well as during prior and subsequent steps. Just as with processing additives, the residues of impurities can reduce a capacitor's operating lifetime and maximum operating voltage. In order to reduce the amount of additive and impurity in a final capacitor product, one or more of the various prior art capacitor structures described above are processed through a dryer. In the prior art, the need to provide adequate throughput requires that the drying time be limited to on the order of hours, or less. However, with such short drying times, sufficient removal of additive and impurity is difficult to achieve. Even with a long drying time (on the order of days) the amounts of remaining additive and impurity is still measurable, especially if the additives or impurities have a high heat of absorption. Long dwell times limit production throughput and increase production and process equipment costs. Residues of the additives and impurities remain in commercially available capacitor products and can be measured to be on the order of many parts-per-million.

Binder particles used in prior art additive based fibrillization steps include polymers. Polymers and similar ultra-high molecular weight substances capable of fibrillization are commonly referred to as "fibrillizable binders" or "fibril-forming binders." Fibril-forming binders find use with other powder like materials. In one prior art process, fibrillizable binder and powder materials are mixed with solvent, lubricant, or the like, and the resulting wet mixture is subjected to high-shear forces to fibrillize the binder particles. Fibrillization of the binder particles produces fibrils that eventually allow formation of a matrix or lattice for supporting a resulting composition of matter. In the prior art, solvents, liquids, and processing aides are added so that subsequent shear forces applied to a resulting mixture are sufficient to fibrillize the particles. During prior art extrusion and/or coating and/or subsequent calendering stages, although fibrillization is known to occur, such processes also cause a large number of the fibrillized binder particles to re/coalesce and be formed into agglomerates. As seen in FIG. 13, such agglomeration is seen and evidenced by the large smeared and individual globular structures present in a final film product. The large number of such re/coalesced binder particles results in a reduced final film integrity and performance.

In the prior art, the resulting additive based extruded product can be subsequently processed in a high-pressure compactor, dried to remove the additive, shaped into a needed form, and otherwise processed to obtain an end-product for a needed application. For purposes of handling, processing, and durability, desirable properties of the end product typically depend on the consistency and homogeneity of the composition of matter from which the product is made, with good consistency and homogeneity being important requirements. Such desirable properties depend on the degree of fibrillization of the polymer. Tensile strength commonly depends on both the degree of fibrillization of the fibrillizable binder, and the consistency of the fibril lattice formed by the binder within the material. When used as an to electrode film, internal resistance of an end product is also important. Internal resistance may depend on bulk resistivity—volume resistivity on large scale—of the material from which the electrode film is fabricated. Bulk resistivity of the material is a function of the material's homogeneity; the better the dispersal of the conductive carbon particles or other conductive filler within the material, the lower the resistivity of the material. When electrode films are used in capacitors, such as double-layer capacitors, capacitance per unit volume is yet another important characteristic. In double layer capacitors, capacitance increases with the specific surface area of the electrode film used to make a capacitor electrode. Specific surface area is defined as the ratio of (1) the surface area of electrode film exposed to an electrolytic solution when the electrode material is immersed in the solution, and (2) the volume of the electrode film. An electrode film's specific surface area and capacitance per unit volume are believed to improve with improvement in consistency and homogeneity.

A need thus exists for new methods of producing low cost capacitor electrode materials with one or more of the following qualities: improved consistency and homogeneity of distribution of binder and active particles on microscopic and macroscopic scales; improved tensile strength of electrode film produced from the materials; decreased resistivity; and increased specific surface area. Yet another need exists for capacitor electrodes fabricated from materials with these qualities. A further need is to provide capacitors and capacitor electrode materials without the use of processing additives.

SUMMARY

The present invention provides a high yield method for making durable, highly reliable, and inexpensive structures. The present invention eliminates or substantially reduces use of water, additives, and solvents, and eliminates or substantially reduces impurities, and associated drying steps and apparatus. The invention utilizes a dry fibrillization technique, where a matrix formed thereby is used to support or hold one or more types of particles for use in further processing steps.

In one embodiment, a particle packaging process includes the steps of supplying articles; supplying binder; mixing the particles and binder; and dry fibrillizing the binder to create a matrix that supports the particles. The step of dry fibrillizing may comprise application of a high-shear. The high-shear may be applied in a jet-mill. The shear may be applied by a calendar mill. The application of high-shear may effectuated by application of a pressure. The pressure may be applied by a calendar roll. The pressure may be applied as a pressurized gas. The gas may comprise oxygen. The pressure may be greater than or equal to about 10 PSI. After and/or during a pass though a compacting apparatus the matrix may be formed into a dry self supporting film. The dry self supporting film may be formed without the use of processing additives. The dry self supporting film may be formed without the use of liquid. The binder may comprise a fibrillizable fluoropolymer. The matrix may comprise between about 1% to 30% fluoropolymer particles by weight. In one embodiment, a film manufacturing method may include the steps of: dry fibrillizing particles and binder; and forming a product from the fibrillized mix without the use of any processing additives. The fibrillized mix may be fibrillized by application of a pressure. The pressure may be applied as a pressurized gas.

In one embodiment, a product may include dry particles supported by a matrix of dry binder The product may comprise a compacted sheet. The compacted sheet may be coupled to a substrate. The sheet is preferably substantially free of processing additives. The processing additives that are not used include hydrocarbons, high boiling point solvents, antifoaming agents, surfactants, dispersion aids, water, pyrrolidone mineral spirits, ketones, naphtha, acetates, alcohols, glycols, toluene, xylene, Isopars™, and others used by those skilled in the art. The substrate may comprise a collector. In one embodiment, dry binder may also be fibrillized by application of a positive or negative pressure to the particles, for example as by a pressurized gas or a vacuum.

In one embodiment, a product is formed of a structure, the structure comprising a plurality of particles, wherein the structure is substantially free of processing additives. In one embodiment, the processing additive that are not used include hydrocarbons, high boiling point solvents, antifoaming agents, surfactants, dispersion aids, water, pyrrolidone mineral spirits, ketones, naphtha, acetates, alcohols, glycols, toluene, xylene, and/or Isopars™. The structure may comprise a capacitor structure. The structure may comprise a battery structure. The structure may comprise a fuel-cell structure. In one embodiment, at least some of the particles may comprise carbon. In one embodiment, at least some of the particles may comprise conductive carbon. In one embodiment, at least some of the particles may comprise activated carbon. In one embodiment, at least some of the particles may comprise activated carbon and conductive carbon. In one embodiment, at least some of the particles may comprise manganese dioxide. In one embodiment, at least some of the to particles may comprise a metal oxide. In one embodiment, at least some of the particles may comprise a fibrillizable fluoropolymer. In one embodiment, at least some of the particles may comprise thermoplastic. In one embodiment, at least some of the particles may comprise catalyst impregnated carbon. In one embodiment, at least some of the particles may comprise graphite. In one embodiment, at least some of the particles may comprise manganese dioxide. In one embodiment, at least some of the particles may comprise a metal. In one embodiment, at least some of the particles may comprise intercalated carbon. In one embodiment, at least some of the particles may comprise intercalated carbon. In one embodiment, the structure is in the form of a sheet.

In one embodiment, a solvent free method used for manufacture of a product device electrode includes steps of: providing particles; providing binder; and forming the particles and binder into a product without the use of any solvent.

In one embodiment, a matrix of dry fibrillized binder is used to support particles for use in medical applications. Products contemplated to be produced and to benefit, in whole or in part, using principles described by present invention include, medical, electrodes, batteries, capacitors, and fuel-cells, as well as others.

In one embodiment, an article used in the manufacture of an energy storage device comprises a sheet of material; a dry film, the dry film including dry conductive carbon particles and dry binder, the dry film coupled to the sheet of material. The article may comprise a thermoplastic. The dry binder may include polyethylene, polypropylene, polyolefin, and non-fibrillizable fluoropolymer particles. The binder may comprise a thermoplastic, thermoset, and/or radiation set material. The sheet of material may comprise an aluminum foil. The aluminum may be corona treated. The sheet of material may comprise a dry process based electrode film. The dry process based electrode film may be a self-supporting dry film. The dry process based electrode film may be a compacted dry fibrillized blend of binder and carbon particles. The sheet of material may comprise an additive-based electrode film.

In one embodiment, a primer layer product may comprise a dry process based mix of dry particles, wherein the mix includes dry conductive carbon particles and dry binder. The binder may be a thermoplastic. The product may be an energy storage device primer layer product. The mix may comprise no processing additive.

In one embodiment, an electrode comprises a collector; and a dry process based structure, wherein the structure is coupled to the collector, wherein the structure comprises carbon and binder particles, and wherein between the collector and the structure there exists only one distinct interface. The binder particles may comprise a thermoplastic. The carbon particles may comprise conductive carbon. The structure may comprise substantially no to processing additive.

In one embodiment, an energy storage device adhesive structure comprises dry adhesive binder; and dry carbon particles, the dry carbon particles comprising a surface, wherein a plurality of the carbon particles are coupled to each other by the dry adhesive binder, and wherein a plurality of the carbon particles make direct carbon particle to carbon particle contact. The dry adhesive binder may comprise a thermoplastic. The dry adhesive binder may be selected from a group consisting of polyethylene, polypropylene, polyolefin, and non-fibrillizable fluoropolymer particles. The structure may comprise no processing additive.

In one embodiment, an energy storage device comprises dry process used adhesive means for providing adhesive and functionality in an energy storage device.

In one embodiment, a capacitor structure comprises a collector; and a plurality of dry processed particles coupled to the collector, wherein the plurality of particles define a long intermixed film. The film may comprise conductive carbon and thermoplastic. The structure may comprise no processing additive. In one embodiment, a capacitor structure comprises a continuous compacted dry adhesive film comprising a dry mix of dry binder and dry carbon particles, the film coupled to a collector, the collector shaped into a roll and disposed within a sealed aluminum housing. The dry adhesive film may comprise no processing additive.

In one embodiment, an energy storage device structure comprises one or more dry electrode film, wherein the one or more dry electrode film is both conductive and adhesive, and wherein the one or more dry electrode film is coupled directly to a current collector. The dry electrode film includes substantially no processing additive.

In one embodiment, a solventless method for manufacture of an energy storage adhesive layer comprises the steps of providing carbon particles; providing binder particles; intermixing the carbon and binder particles to form an adhesive layer without the use of any solvent.

In one embodiment, a process for manufacturing a dry adhesive film for use in an energy storage device product comprises the steps of supplying dry carbon particles; supplying dry binder; dry mixing the dry carbon particles and dry binder; and dry fibrillizing at least some of the dry binder to create a matrix within which to support the dry carbon particles as a dry material. The step of dry fibrillizing may comprise application of sufficiently high-shear. The high-shear may be applied in a jet-mill. The application of sufficiently high-shear may be effectuated by application of a pressure. The pressure may be applied as a pressurized gas. The gas may comprise oxygen. The pressure may be greater than or equal to 10 PSI. The process may comprise a step of compacting the dry material. The step of compacting may be performed after one pass through a compacting apparatus. The compacting apparatus may be a roll-mill. After one pass through the compacting apparatus the dry material may comprise a self-supporting dry adhesive electrode film. The self-supporting dry adhesive electrode film may comprise a thickness of about 80 to 250 microns. The self-supporting dry adhesive electrode film may be formed as a continuous sheet. The sheet may be at least 1 meter long. The dry material may be manufactured without the use of any processing additives. The electrode film may be calendered onto a substrate. The substrate may comprise a collector. The collector may comprise an aluminum foil. The electrode film may be calendered directly onto the substrate without use of an intermediate layer. The dry material may be calendered onto a coated substrate. At least some of the dry binder may comprise a fibrillizable fluoropolymer. The carbon particles may comprise activated carbon and conductive carbon. The dry material may consist of the dry carbon particles and the dry binder. The dry material may comprise between about 50% to 99% activated carbon. The dry material may comprise between about 0% to 30% conductive carbon. The dry material may comprise between about 1% to 50% fluoropolymer particles. The dry material may comprise between about 80% to 95% carbon and between about 0% to 15% conductive carbon, and the dry binder may comprise between about 3% to 15% fluoropolymer. In one embodiment, a method of manufacturing an adhesive electrode film comprises the steps of mixing dry carbon and dry binder particles; and forming a self-supporting adhesive film from the dry particles without the use of any processing additives. The processing additives may be include hydrocarbons, high boiling point solvents, antifoaming agents, surfactants, dispersion aids, water, pyrrolidone, mineral spirits, ketones, naphtha, acetates, alcohols, glycols, toluene, xylene, and Isopars™.

In one embodiment, an energy storage device product may comprise a self-supporting film consisting of a dry mix of dry carbon and dry binder particles. At least some of the dry mix may be dry fibrillized. The dry mix may consist of no processing additive.

In one embodiment, an energy storage device product may comprise one or more self-supporting dry adhesive film comprising a dry mix of dry binder and dry carbon particles. The self-supporting dry adhesive film may be a compacted film. The dry adhesive film may comprise a thickness of about 10 um to about 2 mm. The self-supporting dry adhesive film may comprise a length of at least 1 meter. The self-supporting dry adhesive film may be coupled directly against a substrate. The self-supporting dry adhesive film may comprise no processing additive. The substrate may comprise a collector. The collector may comprise aluminum. The product may comprise a collector, and wherein the dry adhesive film is coupled directly against a surface of the collector. The collector may be untreated. The collector may comprise two sides, wherein one self-supporting dry adhesive film is calendered directly against one side of the collector, and wherein a second self-supporting dry adhesive film is calendered directly against a second side of the collector. The collector may be treated. The collector may be formed to comprise a roll. The roll may be disposed within a sealed aluminum housing. The housing may be disposed in an electrolyte, wherein the product comprises a double-layer capacitor. At least some of the dry binder may comprise a fibrillizable fluoropolymer, wherein the dry carbon particles comprise activated carbon particles and conductive carbon particles. At least some of the dry binder may comprise a thermoplastic, wherein the dry carbon particles comprise conductive carbon particles.

In one embodiment, an energy storage product may consist of a dry fibrillized mix of dry binder and dry carbon particles formed into a continuous self-supporting adhesive electrode film without the use of any processing additives such as hydrocarbons, high boiling point solvents, antifoaming agents, surfactants, dispersion aids, water, pyrrolidone, mineral spirits, ketones, naphtha, acetates, alcohols, glycols, toluene, xylene, and Isopars™. At least some of the dry binder may comprise a fibrillized dry binder. The binder may be fibrillized by pressurized gas. The pressure may comprise a pressure of more than 60 PSI.

In one embodiment, a process for making an energy storage device comprises the steps of mixing dry carbon particles and dry binder to form one or more dry mixture; and compacting the one or more dry mixture to form one or more dry film. The process may comprise the step of bonding the one or more dry film to a current collector. The process may comprise the step of bonding the one or more dry film to a separator. The step of compacting may comprise heating the carbon particles and binder. The step of compacting may comprise forming the dry film after one pass through a compacting device. The dry film may be formed as a long continuous film. The dry film may be self-supporting. The process may further comprise a step wherein the dry film is bonded directly to the current collector. The mixing step may comprise dry fibrillizing at least some of the dry mixture. The mixing step may comprise subjecting at least some of the dry binder to high shear forces. The high shear forces may be applied by a pressurized gas. The gas may comprise oxygen. The pressure may be greater than or equal to 10 PSI. At least some of the dry binder may comprise thermoplastic particles. The dry binder may include polyethylene, polypropylene, polyolefin, and non-fibrillizable fluoropolymer particles. At least some of the dry binder may comprise fibrillizable fluoropolymer particles. The fibrillizable fluoropolymer particles may comprise PTFE. At least some of the dry carbon particles may comprise conductive graphite. At least some of the dry carbon particles may comprise a mixture of activated carbon and conductive carbon. The current collector may comprise a metal. The current collector may comprise aluminum foil. The one or more dry film to may comprise a dry conductive electrode film. The dry film may consist of a mix of dry carbon particles and dry binder particles. The dry carbon particles may comprise dry conductive carbon particles. The dry carbon particles may comprise dry activated carbon particles. The dry binder may comprise dry thermoplastic particles. The dry binder may comprise dry thermoplastic particles, wherein the step of bonding occurs during application of heat. After compacting, the dry film may comprise a compression density of about 0.3 gm/cm$^3$. Depending on particle type, particle composition, and roll-mill pressures other densities are possible as well. The dry binder may comprise radiation set particles. The dry binder may comprise thermoset particles. A first dry mixture of the one or more dry mixture may comprise activated carbon particles, conductive carbon particles, and first binder particles; and a second dry mixture of the one or more dry mixture may comprise conductive carbon particles and second binder particles. The process may comprise a feeding step, wherein a first dry mixture of the one or more dry mixture comprises first dry particles, wherein a second dry mixture of the one or more dry mixture comprises second dry particles, wherein during the feeding step the first dry particles are provided as a first stream of dry particles, wherein during the feeding step the second dry particles are provided as a second stream of dry particles, and wherein during the mixing step the second stream is intermixed within the first stream. The second stream may comprise a distribution of dry particles sizes, wherein during the mixing step the second stream is intermixed within the first stream so as to have a similar distribution of particles sizes as that in the feeding step. The one or more dry mixture may comprise a first dry film, wherein a second dry mixture of the one or more dry mixture comprises dry particles, wherein during the mixing step the dry particles are provided against the first dry film as a stream of dry particles. The process may comprise the step of providing an additive-based film, wherein a first dry mixture of the one or more dry mixture comprises dry particles, wherein during the mixing step the dry particles are provided against the additive-based film as a stream of dry particles. The energy storage device may comprise an energy storage device electrode, wherein all process steps do not utilize any processing additives.

In one embodiment, a blend of dry particles for use in the dry manufacture of a self-supporting energy storage device electrode comprises dry carbon particles; and dry binder particles. The dry carbon particles may comprise activated carbon and conductive carbon particles, wherein the electrode is a capacitor electrode. The dry binder particles may comprise a dry thermoplastic. The dry binder and dry carbon particles may be intermixed, wherein the dry thermoplastic is distributed within a thickness of a surface of the intermix with a decreasing gradient that is greater at a first thickness than a different second thickness. In one embodiment, an electrode may comprise a self-supporting dry film including compacted dry binder and dry carbon particles. The particles may be dry intermixed so as to be distributed within the film with a gradually decreasing gradient. The electrode may comprise a collector, wherein a first side of the dry film is coupled to the collector. The electrode may comprise a separator, wherein a second side of the dry film is coupled to the separator. The dry binder may comprise a heated thermoplastic. The dry carbon particles may comprise conductive carbon particles. The dry binder may comprise a dry fluoropolymer. The dry carbon particles may comprise dry conductive carbon particles and dry activated carbon particles. The dry film may be subjected to heat heated dry film. The dry carbon film may comprise a density of at least 0.3 gm/cm³. The dry intermixed particles may comprise two mixes, wherein as a percentage of a weight of a first mix, the first mix comprises between about 50% to 99% activated carbon, between about 0% to 30% conductive carbon, and between about 1% to 50% fibrillizable fluoropolymer; and wherein as percentage of weight of a second mix, the second mix comprises about 40% to 60% binder, and about 40% to 60% conductive carbon. The dry carbon film may comprise about 1 to 100 parts of the second mix for about every 1000 parts of the first mix.

In one embodiment, a capacitor may comprise a plurality of dry processed particles, the dry processed particles including binder and carbon particles. The dry processed particles may be formed as a self-supporting dry electrode film, wherein at least some of the dry processed particles are compacted against the dry electrode film. The capacitor may comprise a current so collector, wherein the dry processed particles are dry bonded to the current collector, and wherein the current collector comprises aluminum. The may comprise a separator, wherein the dry processed particles are dry bonded to the separator. The separator may comprise a porous electrically insulating layer or film or paper. The capacitor operating voltage may be limited by the electrochemical-voltage window of the capacitor. The capacitor may comprise an additive-based electrode film, wherein the dry processed particles are compacted against the additive based electrode film. The dry processed particles may be compacted into a dry self-supporting electrode film by a single pass compaction device. The capacitor may comprise a sealed aluminum housing, wherein the dry processed particles are disposed within the housing. The capacitor may comprise a sealed aluminum housing, wherein the current collector is coupled to the housing by a laser weld. The capacitor may comprise a jellyroll type electrode.

In one embodiment, a capacitor comprises a collector; the collector having two sides; and two electrode film layers, wherein a first electrode film layer is bonded directly onto a first surface of the collector, and wherein a second electrode film layer is bonded directly onto a second surface of the collector. The two electrode film layers may include no processing to additives. The two electrode layers may comprise a thermoplastic. The capacitor may comprise substantially zero residues as determined by a chemical analysis of the layers before impregnation by an electrolyte. The residues may be selected from a group consisting of: hydrocarbons, high boiling point solvents, antifoaming agents, surfactants, dispersion aids, water, pyrrolidone, mineral spirits, ketones, naphtha, acetates, alcohols, glycols, toluene, xylene, and Isopars™ The layers may be impregnated with an electrolyte. The capacitor may comprise a double-layer capacitor.

In one embodiment, an apparatus for manufacture of an energy device electrode may comprise one or more feeder, wherein each feeder provides dry carbon and binder particles for processing by the apparatus. The apparatus may comprise at least two rollers, wherein the at least two rollers are disposed to receive the particles from the feeders to form a dry film from the particles. The apparatus may comprise a compactor, wherein the compactor is disposed to receive the particles to form a dry film from the particles, and wherein the dry film is self-supporting after one pass-through the compactor. The dry film may comprise a density of at least 0.3 gm/cm³. The dry film may be a long continuous film. The dry film may comprise an intermixed dry film, wherein some of the dry carbon and dry binder particles are intermixed within the dry film with a first gradient, wherein some of the dry carbon and dry binder particles are intermixed within the dry film with a first gradient, wherein the first gradient of particles provides electrode functionality, and wherein the second gradient of particles provides adhesive functionality. The apparatus may comprise at least two heated rollers, wherein the at least two rollers are disposed to receive the particles to form a dry electrode film from the mixture. The apparatus may be disposed to receive a current collector and to calender the dry electrode film directly to the current collector.

In one embodiment, an energy storage device electrode comprises a dry film, wherein the dry film comprises intermixed dry carbon and dry binder particles, wherein some of the dry carbon and dry binder particles are intermixed within the dry film with a first gradient, wherein some of the dry carbon and dry binder particles are intermixed within the dry film with an opposing different second gradient, wherein the first gradient of particles provides electrode functionality, and wherein the second gradient of particles provides adhesive functionality.

In one embodiment, an energy storage device comprises one or more continuous self supporting intermixed film structure comprising conductive dry carbon particles and dry binder particles, the film structure consisting of about zero parts per million processing additive. The additive is selected from the group consisting of hydrocarbons, high boiling point solvents, antifoaming agents, surfactants, dispersion aids, water, pyrrolidone, mineral spirits, ketones, naphtha, acetates, alcohols, glycols, toluene, xylene, and Isopars™. The film structure may comprise a dry adhesive binder. The film structure may comprise a dry conductive carbon. The film structure may comprise dry activated carbon, dry conductive carbon, and dry adhesive binder. The film structure may be coupled to a collector. The intermixed film structure may comprise two intermixed film structures coupled to a collector, wherein a first of the film structures is coupled to a first side of the collector, and wherein a second of the film structures is coupled to a second side of the collector. The intermixed film structure may be an electrode film. The electrode film may be an energy storage device electrode film. The electrode film may comprise a capacitor electrode film.

In one embodiment, an energy storage device comprises a housing; a collector, the collector having an exposed surface; an electrolyte, the electrolyte disposed within the housing; and an electrode film, wherein the electrode film is impregnated with the electrolyte, and wherein the electrode film is coupled directly to the exposed surface. The electrode film may be substantially insoluble in the electrolyte. The electrode may comprise a dry adhesive binder, wherein the binder is substantially insoluble in the electrolyte. The adhesive binder may comprise a thermoplastic, wherein the thermoplastic couples the electrode film to the collector. The electrolyte may comprise an acetonitrile type of electrolyte. In one embodiment, a solventless method for manufacture of an energy storage device electrode comprises the steps of providing dry carbon particles; providing dry binder particles; forming the dry carbon and dry binder particles into an adhesive energy storage device electrode without the use of any solvent.

In one embodiment, a solventless method for manufacture of an energy storage device electrode comprises the steps of providing dry carbon particles; providing dry binder particles; intermixing the dry carbon and dry binder particles to form an adhesive energy storage device electrode without the use of any solvent.

In one embodiment, an energy storage device structure comprises one or more electrode film, wherein the one or more electrode film is both conductive and adhesive, and wherein the one or more electrode film is coupled directly to a current collector.

In one embodiment, an energy storage device structure comprises one or more self-supporting dry process based electrode film. The film may comprise conductive and adhesive particles. The adhesive particles may comprise a thermoplastic. The electrode may be a capacitor electrode.

In one embodiment, a method of adhering capacitor structures together comprises the steps of providing a first capacitor material; providing a first dry mixture of particles; and adhering the first material to the first mixture. The step of adhering may comprise a step of compacting the material and the particles together. The material may comprise a second dry mixture of particles. The material may comprise a current collector. The step of compacting may form the material and the particles into a capacitor electrode. The first material may comprise an additive-based film. The particles may comprise conductive carbon and binder. The binder may comprise a thermoplastic material. The step of adhering may occur during application of heat to the particles. The electrode may comprise a density of about 0.45 gm/cm$^3$. The binder may comprise a thermoset material. The binder may comprise a radiation set material. As a percentage of a weight of the first dry mixture, the first dry mixture may comprise between about 50% to 99% activated carbon, between about 0% to 30% conductive carbon, and between about 1% to 50% fibrillizable fluoropolymer; and as percentage of weight of the second dry mixture, the second dry mixture may comprise about 40% to 60% binder, and about 40% to 60% conductive carbon. The first and second dry mixtures may define a dry carbon film that comprises about 1 to 100 parts of the second mixture for about every 1000 parts of the first dry mixture.

In one embodiment, a capacitor structure may comprise a collector; and a plurality of dry processed particles coupled to the collector, wherein the particles define a long integral dry electrode film. The film may comprise dry conductive carbon and dry adhesive materials. The film may comprise one or more blend of dry particles. The particles may comprise carbon, conductive carbon, and a fibrillizable binder; wherein a second of the particles comprises conductive carbon and adhesive binder. As a percentage of a weight of the film, the first of the particles may comprise between about 50% to 99% activated carbon, between about 0% to 30% conductive carbon, and between about 1% to 50% fibrillizable fluoropolymer; and as percentage of weight of the film, the second of the particles may comprise about 40% to 60% binder, and about 40% to 60% conductive carbon. The film may comprise about 1 to 100 parts of the second of the particles for about every 1000 parts of the first of the particles. The dry particles may comprise conductive carbon, and a thermoplastic binder. The film may be at least 5 meters long. The film may be self-supporting. The adhesive materials may be selected from a group consisting of thermoplastic, thermoset, and radiation set materials.

In one embodiment, an electrode may comprise a collector; and a dry process based electrode film, wherein the electrode film is coupled to the collector, wherein the electrode film comprises carbon and binder particles, and wherein between the collector and the electrode film there exists only one distinct interface. The binder particles may comprise a thermoplastic. The carbon particles may comprise activated carbon and conductive carbon.

In one embodiment, an energy storage device electrode comprises adhesive binder to particles; and carbon particles, the carbon particles comprising a surface, wherein a plurality of the carbon particles are coupled to each other by the adhesive binder particles, and wherein a plurality of the carbon particles make direct carbon particle to carbon particle contact.

In one embodiment, an energy storage device structure comprises a plurality of intermixed dry processed carbon and binder particles formed into an electrode, wherein as compared to an electrode formed of a plurality of the same carbon and binder particles processed with a processing additive, the intermixed dry processed carbon and binder particles comprises less residue.

In one embodiment, a capacitor comprises a continuous compacted self supporting dry adhesive electrode film comprising a dry mix of dry binder and dry carbon particles, the film coupled to a collector, the collector shaped into a roll disposed within a sealed aluminum housing. The dry adhesive electrode film may comprise no processing additive. In one embodiment, an energy storage device comprises dry process based adhesive electrode means for providing adhesive and electrode functionality in an energy storage device.

In one embodiment, a process for manufacturing a dry electrode for use in an energy storage device product comprises the steps of supplying dry carbon particles; supplying dry binder; dry mixing the dry carbon particles and dry binder; and dry fibrillizing the dry binder to create a matrix within which to support the dry carbon particles as a dry material. The step of dry fibrillizing may comprise application of sufficiently high-shear. The high-shear may be applied in a jet-mill. The application of sufficiently high-shear may be effectuated by application so of a pressure. The pressure may be applied as a pressurized gas. The gas may comprise oxygen. The pressure may be greater than or equal to about 10 PSI. The process may further include a step of compacting the dry material. In the process, the step of compacting may be performed after one pass through a compacting apparatus. The compacting apparatus may be a roll-mill. In one embodiment, after the one pass though the compacting apparatus the dry material comprises a self-supporting dry film. The self-supporting dry film may comprise a thickness of about 10 um to 2 mm. self-supporting dry film may be formed as a continuous sheet. The sheet may be one meter long. The sheet may be 10 mm or wider in width. The dry material may be manufactured without the substantial use of any processing additives such as hydrocarbons, high boiling point solvents, antifoaming agents, surfactants, dispersion aids, water, pyrrolidone mineral spirits, ketones, naphtha, acetates, alcohols, glycols, toluene, xylene, and Isopars™. The process may include a step of calendering the dry material onto a substrate. The substrate may comprise a collector. The collector may comprise an aluminum foil. The dry material may calendered directly onto the substrate without use of an intermediate layer. The dry material may be calendered onto a treated substrate. The dry binder may comprise a fibrillizable fluoropolymer. In one embodiment, the dry material consists of the dry carbon particles and the dry binder. The dry material may comprise between about 50% to 99% activated carbon. The dry material may comprise between about 0% to 30% conductive carbon. The dry material may comprise between about 1% to 50% fluoropolymer particles. The dry material may comprise between about 50% to 99% activated carbon and between about 0% to 30% conductive carbon, and the dry binder may comprise between about 1% to 50% fluoropolymer.

In one embodiment, a method of manufacturing an electrode film may comprise the steps of mixing dry carbon and dry binder particles; and forming a self-supporting film from the dry particles without the use of any processing additives. The processing additives not used may be hydrocarbons, high boiling point solvents, antifoaming agents, surfactants, dispersion aids, water, pyrrolidone mineral spirits, ketones, naphtha, acetates, alcohols, glycols, toluene, xylene, and Isopars™.

In one embodiment, an energy storage device product, may comprise a self-supporting film consisting of a dry mix of dry carbon and dry binder particles. The dry mix may be a dry fibrillized mix. The dry mix may comprise substantially no processing additives. The processing additives not used may be hydrocarbons, high boiling point solvents, antifoaming agents, surfactants, dispersion aids, water, pyrrolidone mineral spirits, ketones, naphtha, acetates, alcohols, glycols, toluene, xylene, and Isopars™. The dry mix may be dry fibrillized by application of a pressure. The pressure may be applied by a pressurized gas.

In one embodiment an energy storage device product, comprises one or more self-supporting dry film consisting of a dry fibrillized mix of dry binder and dry carbon particles. The sell-supporting dry film may be compacted. The dry film may comprise a thickness of between 80 to 250 microns. The self-supporting dry film may comprise a length of at least 1 meter. A width of the film may be as wide as 10 mm. The self-supporting dry film may be positioned against a substrate. The mix may comprise between about 50% to 99% activated carbon. The mix may comprise between about 0% to 30% conductive carbon. The mix may comprise between about 1% to 50% fluoropolymer particles. The self-supporting film may comprise no processing additives. The processing additives not used may be hydrocarbons, high boiling point solvents, antifoaming agents, surfactants, dispersion aids, water, pyrrolidone mineral spirits, ketones, naphtha, acetates, alcohols, glycols, toluene, xylene, and Isopars™. The substrate may comprise a collector. The collector may comprise aluminum. The product may comprise a collector, wherein the dry film is positioned directly against a surface of the collector. The dry mix may be dry fibrillized by a pressurized gas.

The collector may comprise two sides, wherein one self-supporting dry film is calendered directly against one side of the collector, and wherein a second self-supporting dry film is calendered directly against a second side of the collector. The collector may be treated. The collector may be formed to comprise a roll. The roll may be disposed within a sealed aluminum housing. The housing may be disposed an electrolyte, wherein the product comprises a double-layer capacitor.

In one embodiment, an energy storage product may consist of a dry fibrillized mix of dry binder and dry carbon particles formed into a continuous self supporting electrode film without the use of any processing additives. The processing additives not used may include high boiling point solvents, antifoaming agents, surfactants, dispersion aids, water, pyrrolidone mineral spirits, ketones, naphtha, acetates, alcohols, glycols, toluene, xylene, and Isopars™.

In one embodiment, dry conductive particles, may comprise conductive carbon. In one embodiment, dry conductive particles may comprise a metal.

In one embodiment, a capacitor comprises a film comprising a dry fibrillized mix of dry binder and dry carbon particles, the film coupled to a collector, the collector shaped into a roll, the roll impregnated with an electrolyte and disposed within a sealed aluminum housing. The film may comprise substantially no processing additive. The film may consist of the dry carbon particles and the dry binder. The film may comprise a long compacted self-supporting dry film. The film may comprise a density of at least 0.3 gm/cm$^3$.

In one embodiment, an energy storage device comprises a dry process based electrode means for providing conductive electrode functionality in an energy storage device.

In one embodiment, a solventless method for manufacture of an energy storage device electrode comprises the steps of providing dry carbon particles; providing dry binder particles; and forming the dry carbon and dry binder particles into an energy storage device electrode without the use of any solvent.

In one embodiment, a solventless method for manufacture of an energy storage device electrode comprises the steps of providing dry carbon particles; providing dry binder particles; and intermixing the dry carbon and dry binder particles to form an energy storage device electrode without the substantial use of any solvent or processing additive.

Other embodiments, benefits, and advantages will become apparent upon a further reading of the following Figures, Description, and Claims.

BRIEF DESCRIPTION OF THE DRAWINGS

FIG. 6b shows resistance vs. number of full charge/discharge charge cycles.

DESCRIPTION OF THE PREFERRED EMBODIMENTS

Figure 1A:
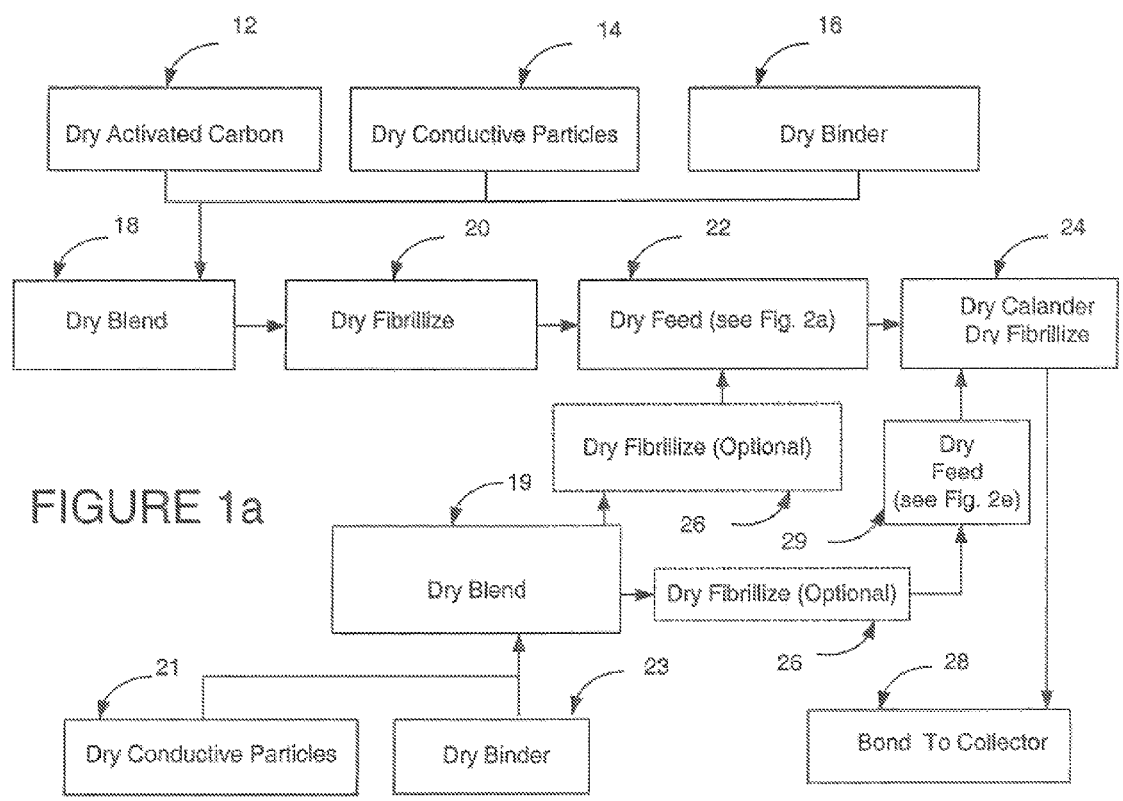
FIG. 1a is a block diagram illustrating a method for making an energy storage device electrode.

Reference will now be made in detail to several embodiments of the invention that are illustrated in the accompanying drawings. Wherever possible, same or similar reference numerals are used to refer to the same or like elements, and/or steps and elements used therein.

The present invention provides a high yield method for making durable, highly reliable, and inexpensive structures. The present invention eliminates or substantially reduces use of water, additives, and solvents, and eliminates or substantially reduces impurities, and associated drying steps and apparatus. The invention utilizes a dry fibrillization technique, where a matrix formed thereby is used to support a selected variety of particles. In one embodiment, the dry fibrillization technique is used to fibrillize binder. In one embodiment, the binder comprises fibrillizable fluoropolymer. In one embodiment, the fibrillizable fluoropolymer comprises PTFE or Teflon particles. In one embodiment, the matrix of dry fibrillized binder is used to support carbon particles. The present invention provides distinct advantages to the solvent, water, and/or additive-based method of forming prior art structures and products. The present invention also provides distinct advantages when compared to those of the additive-based coating/extruder devices of the prior art. In accordance with some embodiments of the present invention, a reliable and inexpensive dry particle capacitor, capacitor adhesive electrode, and structures thereof, as well as methods for making the same are described.

The energy storage devices and methods associated with the present invention do not use the one or more prior art processing aides or additives associated with coating and extrusion based processes (hereafter referred throughout as "processing additive" and "additive"), including: added solvents, liquids, lubricants, plasticizers, and the like. As well, one or more associated additive removal steps, post coating treatments such as curing or cross-linking, drying step(s) and apparatus associated therewith, and the like, are eliminated. Because additives are not used during manufacture, a final electrode product is not subject to chemical interactions that may occur between the aforementioned prior art residues of such additives and a subsequently used electrolyte. Because binders that are dissolvable by additives do not need to be used with present invention, a wider class of or selection of binders may be used than in the prior art. Such binders can be selected to be completely or substantially insoluble and nonswellable in typically used electrolytes, an advantage, which when combined with a lack of additive based impurities or residues such electrolytes can react to, allows that a much more reliable and durable energy storage device may be provided. A high throughput method for making more durable and more reliable energy storage devices is thus provided.

In the embodiments that follow, it will be understood that reference to no-use and non-use of additive(s) in the manufacture of an energy storage device according to the present invention takes into account that electrolyte may be used during a final electrode electrolyte immersion/impregnation step. An electrode electrolyte immersion/impregnation step is typically utilized prior to providing a final finished capacitor electrode in a sealed housing. Furthermore, even though additives, such as solvents, liquids, and the like, are not used in the manufacture of embodiments disclosed herein, during manufacture, a certain amount of impurity, for example, moisture, may be absorbed or attach itself from a surrounding environment. Those skilled in the art will understand that the dry particles used with embodiments and processes disclosed herein may also, prior to their being provided by particle manufacturers as dry particles, have themselves been pre-processed with additives and, thus, comprise one or more pre-process residue. For these reasons, despite the non-use of additives, one or more of the embodiments and processes disclosed herein may require a drying step (which, however, if performed with embodiments of the present invention, can be much shorter than the drying steps of the prior art) prior to a final electrolyte impregnation step so as to remove/reduce such aforementioned pre-process residues and impurities. It is identified that even after one or more drying step, trace amounts of the aforementioned pre-process residues and impurities may be present in the prior art, as well as embodiments described herein.

In general, because both the prior art and embodiments of the present invention obtain base particles and materials from similar manufacturers, and because they may be exposed to similar pre-process environments, measurable amounts of prior art pre-process residues and impurities may be similar in magnitude to those of embodiments of the present invention, although variations may occur due to differences in pre-processes, environmental effects, etc. In the prior art, the magnitude of such preprocess residues and impurities is smaller than that of the residues and impurities that remain and that can be measured after processing additives are used. This measurable amount of processing additive based residues and impurities can be used as an indicator that processing additives have been used in a prior art energy storage device product. The lack of such measurable amounts of processing additive can as well be used to distinguish the non-use of processing additives in embodiments of the present invention.

Table 1 indicates the results of a chemical analysis of a prior art electrode film and an embodiment of a dry electrode film made in accordance with principles disclosed further herein. The chemical analysis was conducted by Chemir Analytical Services, 2672 Metro Blvd., Maryland Heights, Mo. 63043, Phone 314-291-6620. Two samples were analyzed with a first sample (Chemir 533572) comprised of finely ground powder obtained from a prior art additive based electrode film sold under the EXCELLERATOR™ brand of electrode film by W. L Gore & Associates, Inc. 401 Airport Rd., Elkton, Md. 21922, 410-392-444, which in one embodiment is referenced under part number 102304. A second sample (Chemir 533571) comprised a thin black sheet of material cut into ⅛ to 1 inch sided irregularly shaped pieces obtained from a dry film 33 (as discussed in FIG. 2g below). The second sample (Chemir 533571) comprised a particle mixture of about 50% to 99% activated carbon, about 0% to 30% conductive carbon, and about 1% to 50% PTFE binder by weight. Suitable carbon powders are available from a to variety of sources, including YP-17 activated carbon particles sold by Kuraray Chemical Co., LTD, Shin-hankyu Bldg. 9F Blvd. C-237, 1-12-39 Umeda, Kiata-ku, Osaka 530-8611, Japan; and BP 2000 conductive particles sold by Cabot Corp. 157 Concord Road, P.O. Box 7001, Billerica, Mass. 01821-7001, Phone: 978 663-3455. A tared portion of prior art sample Chemir 53372 was transferred to a quartz pyrolysis tube. The tube with its contents was placed inside of a pyrolysis probe. The probe was then inserted into a valved inlet of a gas chromatograph. The effluent of the column was plumbed directly into a mass spectrometer that served as a detector. This configuration allowed the sample in the probe to be heated to a predetermined temperature causing volatile analytes to be swept by a stream of helium gas into the gas into the gas chromatograph, and through the analytical column and to be detected by the mass spectrometer. The pyrolysis probe was flash heated from ambient temperature at a rate of 5 degrees C./millisecond to 250 degrees C. and held constant for 30 seconds. The gas chromatograph was equipped with a 30 meter Agilent DB-5 analytical column. The gas chromatograph oven temperature was as follows: the initial temperature was held at 45 degrees C. for 5 minutes and then was ramped at 20 degrees C. to 300 degrees C. and held constant for 12.5 minutes. A similar procedure was conducted for sample 53371 of a dry film 33. Long chain branched hydrocarbon olefins were detected in both samples, with 2086 parts per million (PPM) detected in the prior art sample, and with 493 PPM detected in dry film 33. Analytes dimethylamine and a substituted alkyl propanoate were detected in sample Chemir 53372 with 337 PPM and were not detected in sample Chemir 53371. It is envisioned that future analysis of other prior art additive based electrode films will provide similar results with which prior art use of processing additives, or equivalently, the non-use of additives of embodiments described herein, can be identified and distinguished.

One or more prior art additives, impurities, and residues that exist in, or are utilized by, and that may be present in lower quantities in embodiments of the present invention than the prior art, include: hydrocarbon solvents, high boiling point solvents, antifoaming agents, surfactants, dispersion aids, water, pyrrolidone mineral spirits, ketones, naphtha, acetates, alcohols, glycols, toluene, xylene, Isopars™, plasticizers, and the like.

TABLE 1

| Pyrolysis GC/MS Analysis | | |
|---|---|---|
| Retention Time in Minutes | Chemir 53371 | Chemir 53372 (Prior Art) |
| 1.65 | 0 PPM | 0 PPM |
| 12.3 | 0 PPM | 0 PPM |
| 13.6 | 0 PPM | Butylated hydroxyl toluene 337 PPM |
| 20.3 | 0 PPM | 0 PPM |
| 20.6 | A long chain branched hydrocarbon 493 PPM | A long chain branched hydrocarbon olefin 2086 PPM |

Referring now to FIG. 1a, a block diagram illustrating a process for making a dry particle based energy storage device is shown. As used herein, the term "dry" implies non-use of additives during process steps described herein, other than during a final impregnating electrolyte step. The process shown in FIG. 1a begins by blending dry carbon particles and dry binder together. As previously discussed, one or more of such dry carbon particles, as supplied by carbon particle manufacturers for use herein, may have been pre-processed. Those skilled in the art will understand that depending on particle size, particles can be described as powders and the like, and that reference to particles is not meant to be limiting to the embodiments described herein, which should be limited only by the appended claims and their equivalents. For example, within the scope of the term "particles," the present invention contemplates powders, spheres, platelets, flakes, fibers, nano-tubes, and other particles with other dimensions and other aspect ratios. In one embodiment, dry carbon particles as referenced herein refers to activated carbon particles 12 and/or conductive particles 14, and binder particles 16 as referenced herein refers to an inert dry binder. In one embodiment, conductive particles 14 comprise conductive carbon particles. In one embodiment, conductive particles 14 comprise conductive graphite particles. In one embodiment, it is envisioned that conductive particles 14 comprise an electrically conductive polymer, metal powder, or the like. In one embodiment, dry binder 16 comprises a fibrillizable fluoropolymer, for example, polytetrafluoroethylene (PTFE) particles. Other possible fibrillizable binders include ultra-high molecular weight polypropylene, polyethylene, co-polymers, polymer blends and the like. It is understood that the present invention should not be limited by the disclosed or suggested particles and binder, but rather, by the claims that follow. In one embodiment, particular mixtures of particles 12, 14, and binder 16 comprise about 50% to 99% activated carbon, about 0% to 30% conductive carbon, and/or about 1% to 50% binder by weight. In a more particular embodiment, particle mixtures include about 80% to 90% activated carbon, about 0% to 15% conductive carbon, and about 3% to 15% binder by weight. In one embodiment, the activated carbon particles 12 comprise a mean diameter of about 10 microns. In one embodiment, the conductive carbon particles 14 comprise diameters less than 20 microns. In one embodiment, the binder particles 16 comprise a mean diameter of about 450 microns. Suitable carbon to powders are available from a variety of sources, including YP-17 activated carbon particles sold by Kuraray Chemical Co., LTD, Shin-hankyu Bldg. 9F Blvd. C-237, 1-12-39 Umeda, Kiata-ku, Osaka 530-8611, Japan; and BP 2000 conductive particles sold by Cabot Corp. 157 Concord Road, P.O. Box 7001, Billerica, Mass. 01821-7001, Phone: 978 663-3455.

In step 18, particles of activated carbon, conductive carbon, and binder provided during respective steps 12, 14, and 16 are dry blended together to form a dry mixture. In one embodiment, dry particles 12, 14, and 16 are blended for 1 to 10 minutes in a V-blender equipped with a high intensity mixing bar until a uniform dry mixture is formed. Those skilled in the art will identify that blending time can vary based on batch size, materials, particle size, densities, as well as other properties, and yet remain within the scope of the present invention. With reference to blending step 18, in one embodiment, particle size reduction and classification can be carried out as part of the blending step 18, or prior to the blending step 18. Size reduction and classification may improve consistency and repeatability of the resulting blended mixture and, consequently, of the quality of the electrode films and electrodes fabricated from the dry blended mixture.

Figure 11:
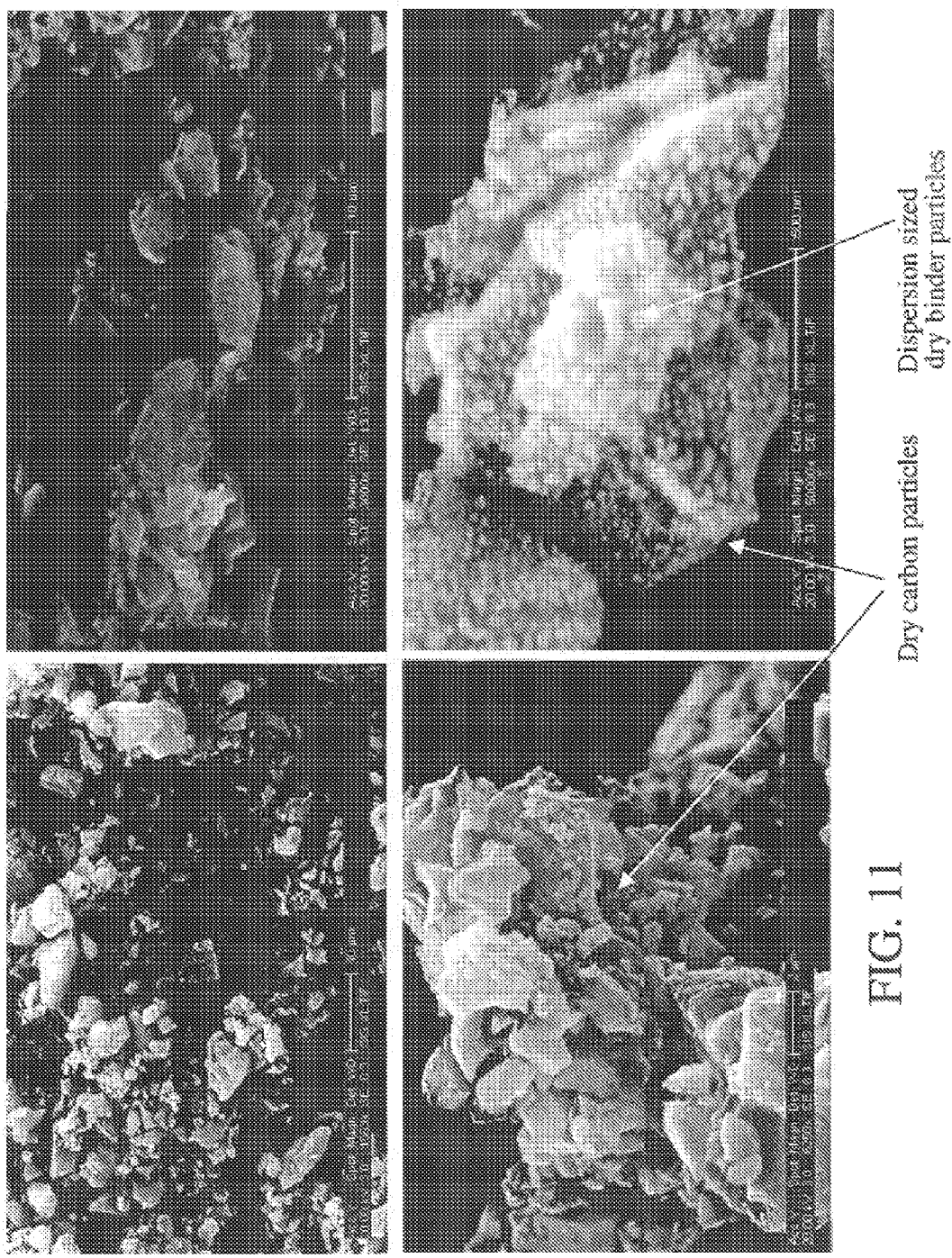
FIG. 11 illustrates an SEM of dry particles before calendering.

Referring to FIG. 11, there is seen a SEM taken of dry particles that are formed by dry fibrillization step 20. After dry blending step 18, dry binder 16 within the dry particles is fibrillized in a dry fibrillizing step 20. The dry fibrillizing step 20 is effectuated using a dry solventless and liquidless high shear technique. The high shear acts to enmesh, entrap, bind, and/or support the dry particles 12 and 14. However, as can be seen from FIG. 11, even at magnifications as high as 100,000×, evidence of fibrillization in the form of fibrils is difficult, if not impossible, to discern. Although fibrils seemingly are not visible, it is conjectured that rather than the type of fibril formation that occurs in coating and extrusion based processes, during dry fibrillization step 20, dry binder in the form of macroscopic aggregates becomes pulverized by the energy imparted to the dry particles to a size that fibrils are not visible. It is believed that dry fibrillization causes a reduction of dry binder particles 20 to their basic constituent size, which is known to those skilled in the art as a dispersion particle size. In one embodiment, such dispersion size is on the order of about 0.1 to 2 um. Pulverization of dry binder 16 occurs when carbon or other dry non-binder material is added to the jet mill. The presence of particles other than binder acts as diluent that disperses the binder particles away from each other so that they cannot re/coalesce. At least in part, because dry binder particles are dispersed, they are unable to form agglomerates as occurs in the prior art. As well, as seen in FIG. 11, at 100,000× magnification, at least some dispersion sized dry binder particles appear to have been deposited or adhered onto dry particles 12 and/or 14. Thus, as defined herein a "weak" to and/or not visible form of fibrillization has occurred such that dry binder within the dry mixture has been pulverized and/or converted, at least in part, into dispersion sized particles that are of such short length and/or small size that they may act to provide the aforementioned enmeshing, entrapping, binding, and/or supporting functionality. Thus, fibrillization on the scale of one or more dispersion sized particle is contemplated, wherein fibrillization may comprise a change in dimension of such dispersion particle(s), which is within the scope of the definition of fibrillization as used by those skilled in the art wherein an elongation of binder particle or coalesced binder particles is known to occur.

As further seen from FIG. 11, direct surface to surface contact exists between many of the dry carbon particles within the dry fibrillized mixture of dry particles. It is believed that the weak fibrillization described above causes dry binder particles that have been reduced in size to be deposited onto and between the dry carbon particles and with surface energies such that sufficient contact and adhesion between the carbon articles can be maintained to provide enmeshment, entrapment, binding, and/or support to the mix of dry particles, and such that the dry particles can be later easily formed into a dry film as is described further below. Such conclusions are supported by EDX sampling of the dry fibrillized powder during imaging of the dry fibrillized particles with an SEM. It has been identified by the present inventors from EDX analysis that although dry binder 16 can be detected in the original proportions that were present during step 18, the binder is in a from that is substantially changed from that originally introduced in step 20. A typical SEM image so taken of dry fibrillized carbon and binder particles formed during step 20 shows only dry carbon particles. Although EDX shows that dry binder is present, it is in a form that does not appear to be imagable as fibril or in its originally introduced aggregate form, even using an SEM at 100000×. Nevertheless, the dry fibrillized mixture of dry particles at step 20 exhibits the characteristics of a homogeneous matrix that can be handled as a free-flowing dry compounded material and formed into a dry film without the use of additives, solvents, liquids, or the like. This is in contrast to the prior art wherein solvents, liquids, additives, and the like are used, and wherein binder particles are present as re/coalesced agglomerates and visible fibrils prior to and/or after a calendering step.

Figure 1B:
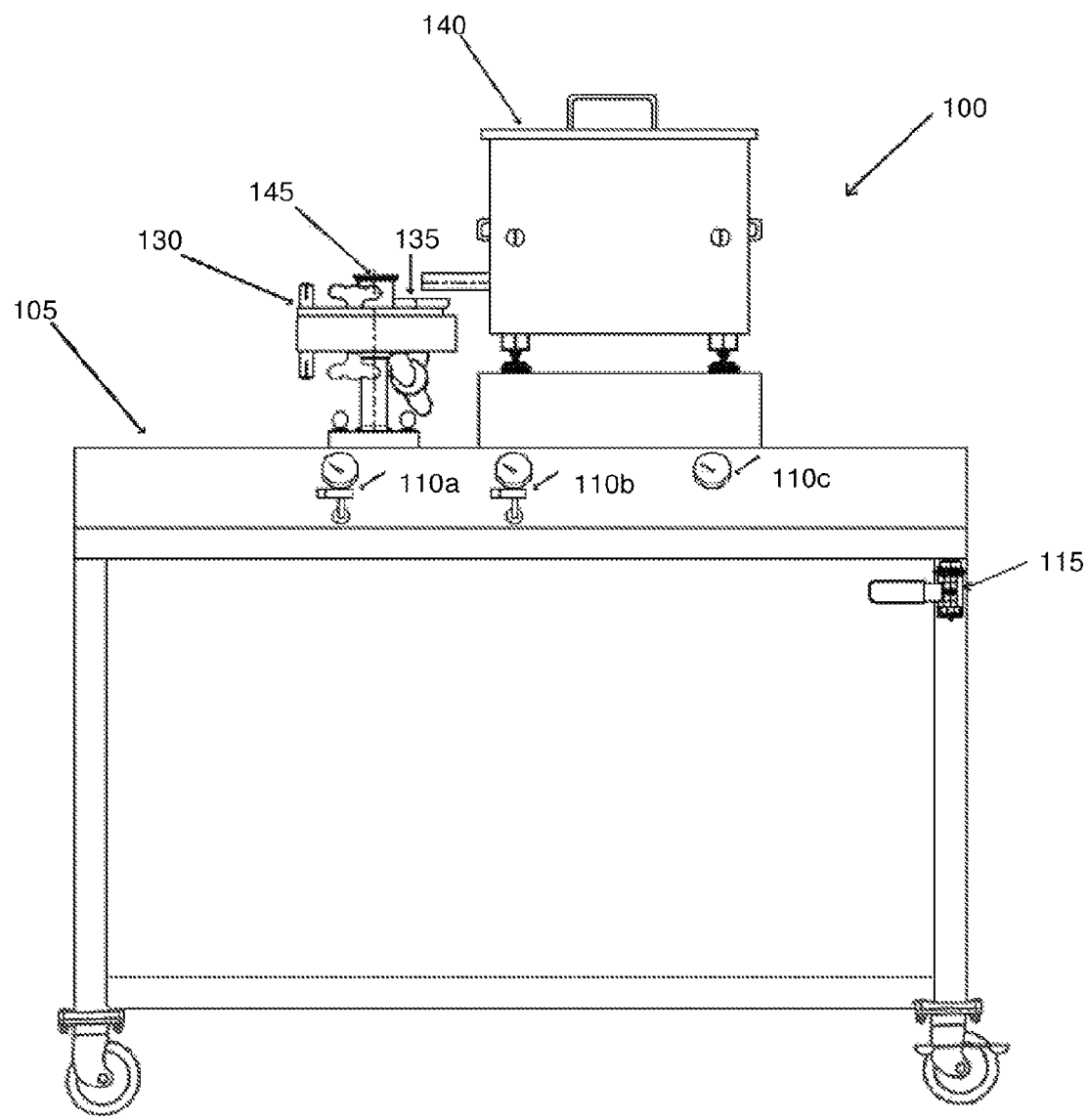
FIG. 1b is a high-level front view of a jet mill assembly used to fibrillize binder within a dry carbon particle mixture.
Figure 1C:
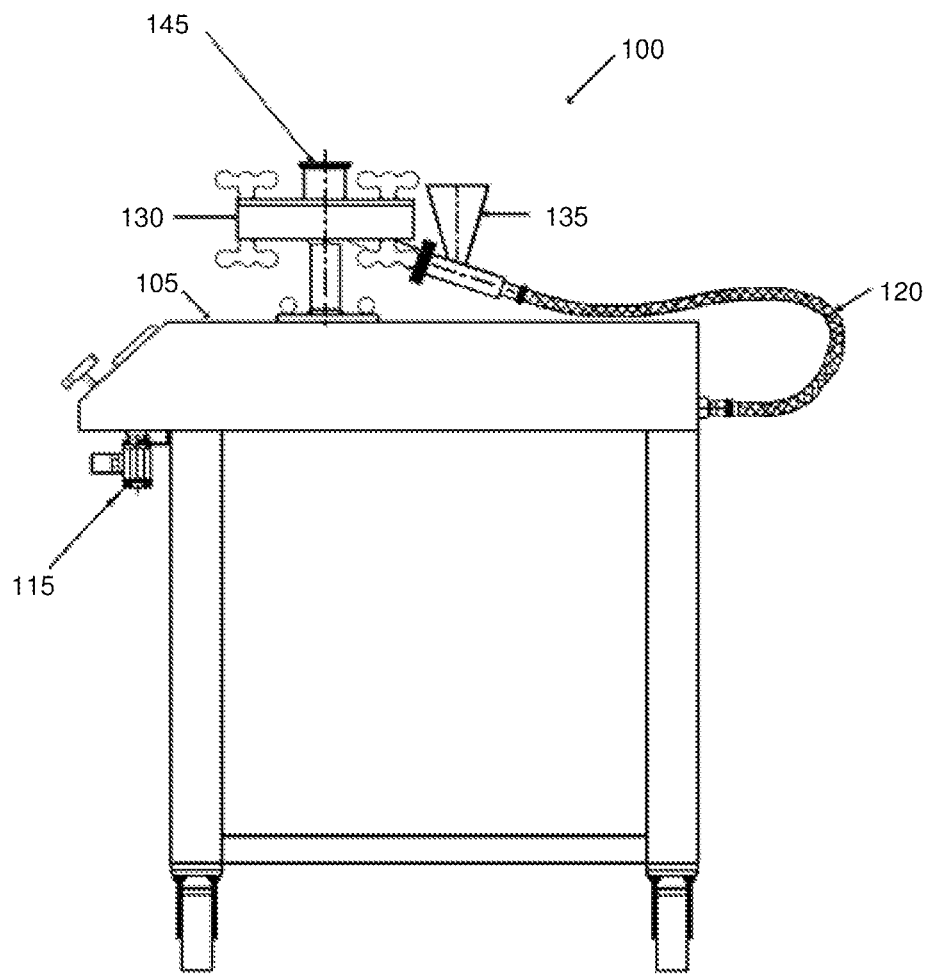
FIG. 1c is a high-level side view of a jet mill assembly shown in FIG. 1b.
Figure 1D:
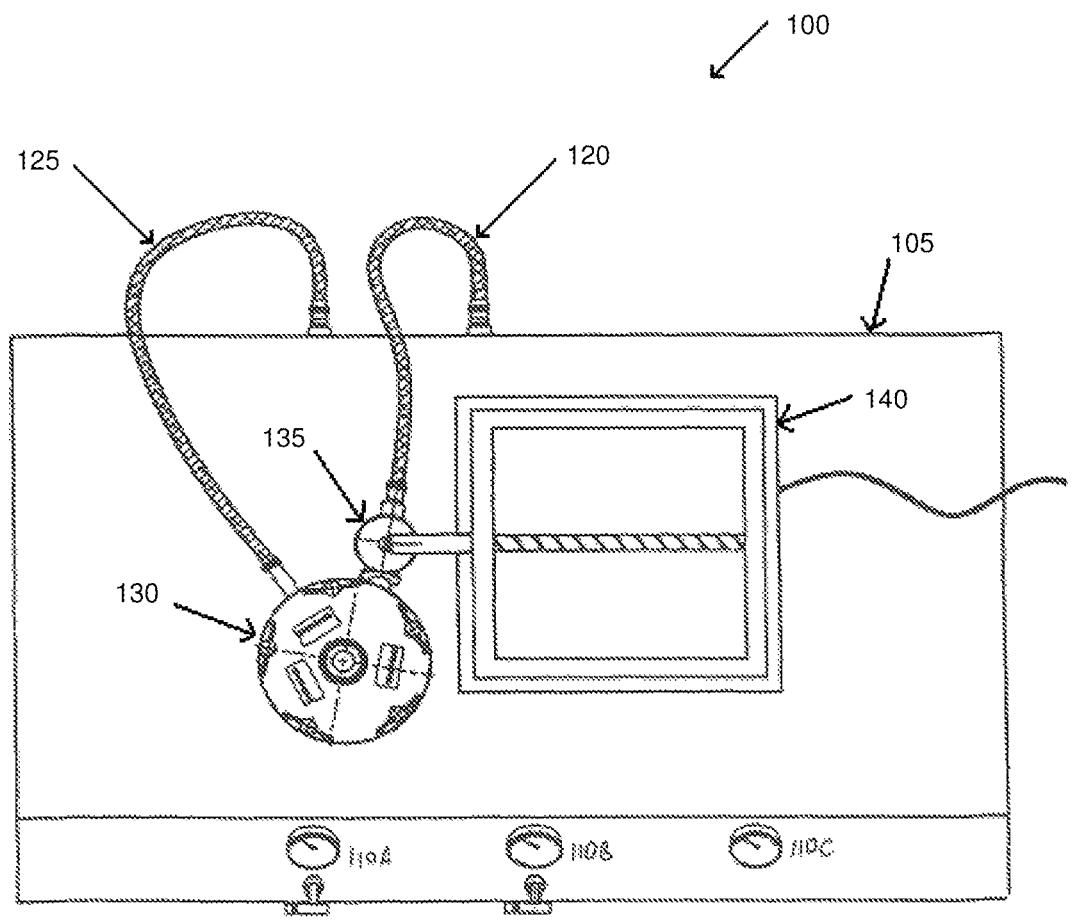
FIG. 1d is a high-level top view of the jet mill assembly shown in FIGS. 1b and 1c.

Referring to now to FIGS. 1b, 1c, and 1d, there is seen, respectively, front, side, and top views of a jet-mill assembly 100 used to perform a dry fibrillization step 20. For convenience, the jet-mill assembly 100 is installed on a movable auxiliary equipment table 105, and includes indicators 110 for displaying various temperatures and gas pressures that arise during operation. A gas input connector 115 receives compressed air from an external supply and routes the compressed air through internal tubing (not shown) to a feed air hose 120 and a grind air hose 125, which both lead and are connected to a jet-mill 130. The jet-mill 130 includes: (1) a funnel-like material receptacle device 135 that receives compressed feed air from the feed air hose 120, and the blended carbon-binder mixture of step 18 from a feeder 140; (2) an internal grinding chamber where the carbon-binder mixture material is processed; and (3) an output connection 145 for removing the processed material. In the illustrated embodiment, the jet-mill 130 is a 4-inch Micronizer® model available from Sturtevant, Inc., 348 Circuit Street, Hanover, Mass. 02339; telephone number (781) 829-6501. The feeder 140 is an AccuRate® feeder with a digital dial indicator model 302M, available from Schenck AccuRate®, 746E. Milwaukee Street, P.O. Box 208, Whitewater, Wis. 53190; telephone number (888) 742-1249. The feeder includes the following components: a 0.33 cubic ft. internal hopper; an external paddle agitation flow aid; a 1.0-inch, full pitch, open flight feed screw; a ⅛ hp, 90 VDC, 1,800 rpm, TENV electric motor drive; an internal mount controller with a variable speed, 50:1 turndown ratio; and a 110 Volt, single-phase, 60 Hz power supply with a power cord. The feeder 140 dispenses the carbon-binder mixture provided by step 18 at a preset rate. The rate is set using the digital dial, which is capable of settings between 0 and 999, linearly controlling the feeder operation. The highest setting of the feeder dial corresponds to a feeder output of about 12 kg per hour.

Figure 1E:
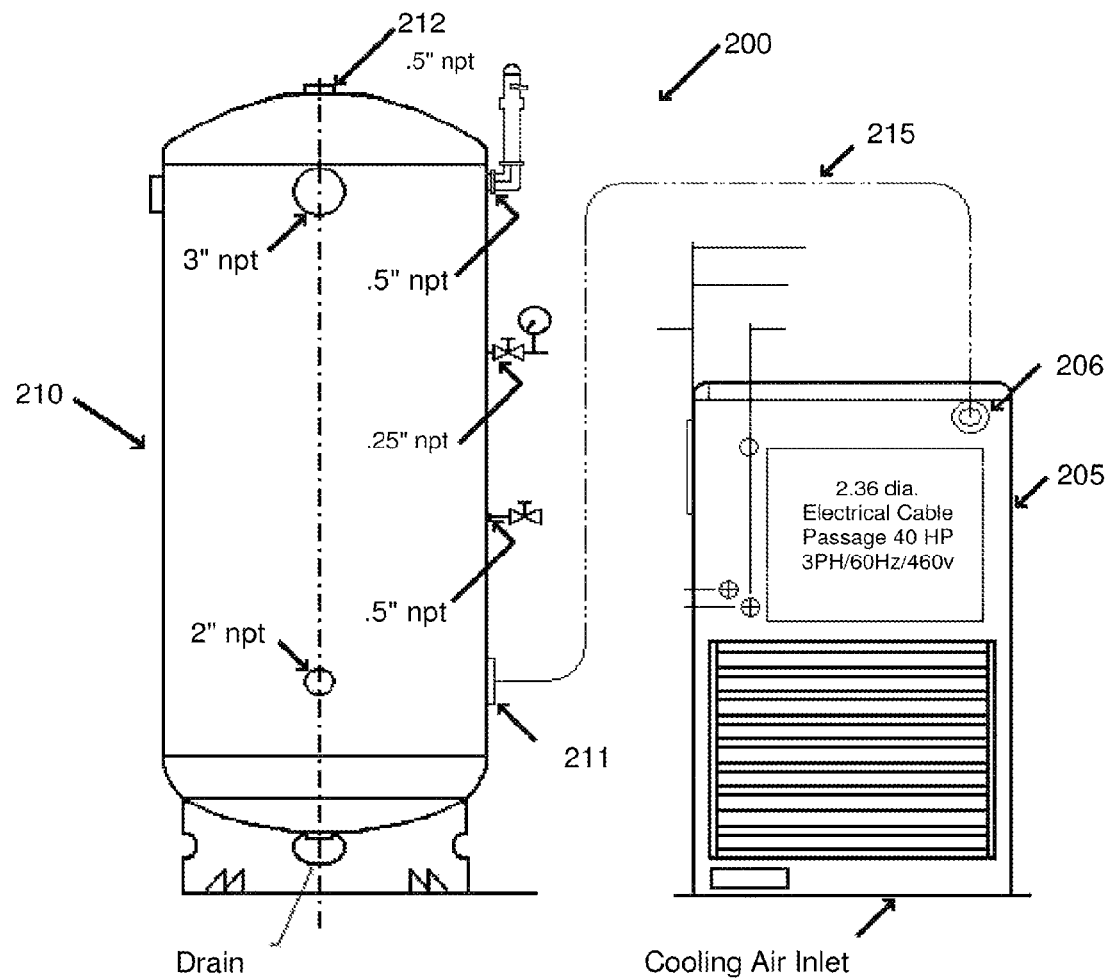
FIG. 1e is a high-level front view of a compressor and a compressed air storage tank used to supply compressed air to a jet mill assembly.
Figure 1F:
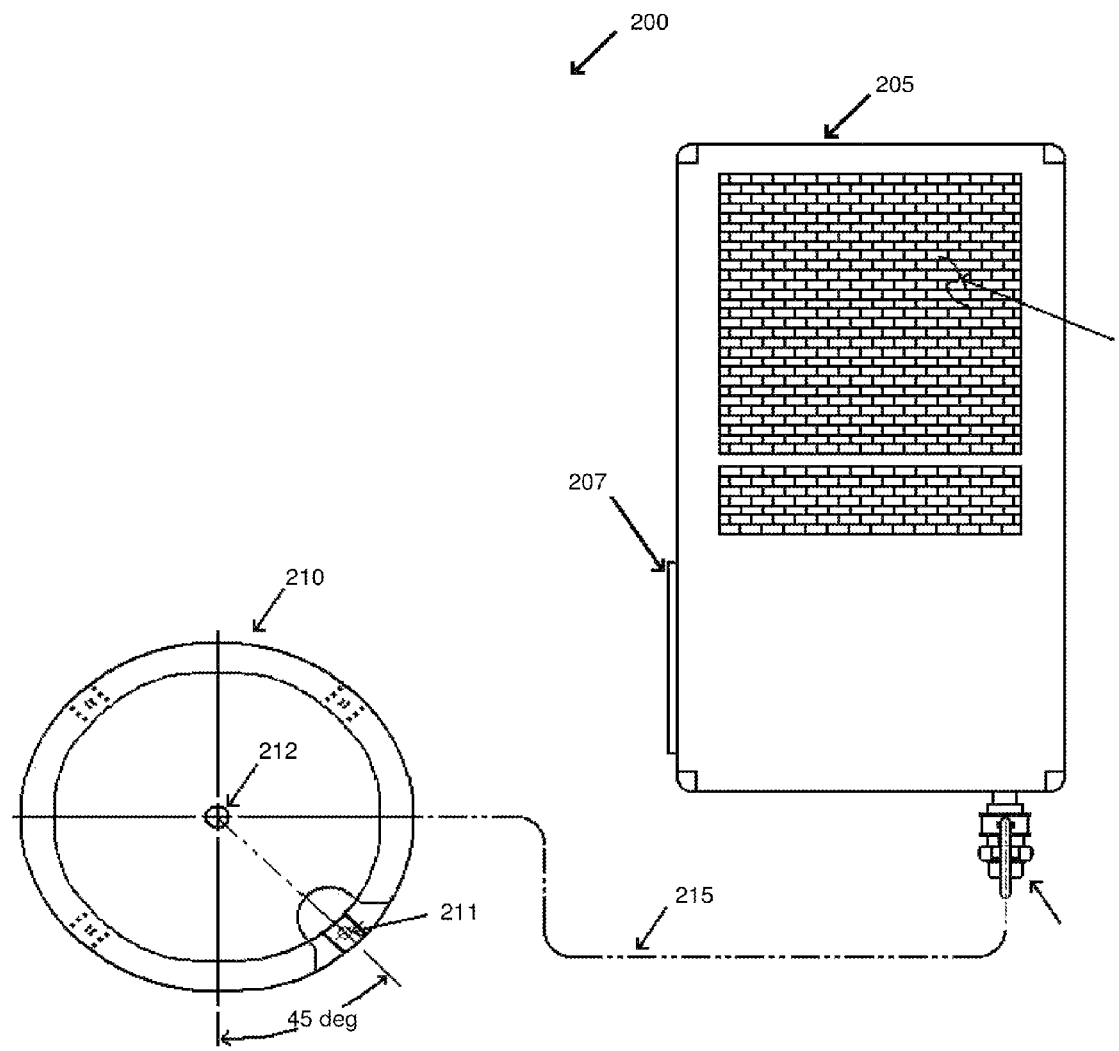
FIG. 1f is a high-level top view of the compressor and the compressed air storage tank shown in FIG. 1e, in accordance with the present invention.

The feeder 140 appears in FIGS. 1b and 1d, but has been omitted from FIG. 1c, to prevent obstruction of view of other components of the jet-mill 130. The compressed air used in the jet-mill assembly 100 is provided by a combination 200 of a compressor 205 and a compressed air storage tank 210, illustrated in FIGS. 1e and 1f; FIG. 1e is a front view and FIG. 1f is a top view of the combination 200. The compressor 205 used in this embodiment is a GA 30-55C model available from Atlas Copco Compressors, Inc., 161 Lower Westfield Road, Holyoke, Mass. 01040; telephone number (413) 536-0600. The compressor 205 includes the following features and components: air supply capacity of 180 standard cubic feet per minute ("SCFM") at 125 PSIG; a 40-hp, 3-phase, 60 HZ, 460 VAC premium efficiency motor; a WYE-delta reduced voltage starter; rubber isolation pads; a refrigerated air dryer; air filters and a condensate separator; an air cooler with an outlet 206; and an air control and monitoring panel 207. The 180-SCFM capacity of the compressor 205 is more than sufficient to supply the 4-inch Micronizer® jet-mill 130, which is rated at 55 SCFM. The compressed air storage tank 210 is a 400-gallon receiver tank with a safety valve, an automatic drain valve, and a pressure gauge. The compressor 205 provides compressed air to the tank 205 through a compressed air outlet valve 206, a hose 215, and a tank inlet valve 211.

In one embodiment, it is identified that the compressed air provided under high-pressure by compressor 205 is as dry as possible. Thus, in one embodiment, an appropriately placed in-line filter and/or dryer may be added. In one embodiment, a range of acceptable dew point for the air is about −20 to −40 degrees F., and water content of less than about 20 ppm; other ranges are within the scope of the present invention also. Although discussed as being effectuated by high-pressure air, it is understood that other sufficiently dry gases are envisioned as being used to fibrillize binder particles utilized in embodiments of the present invention, for example, oxygen, nitrogen, helium, and the like.

In the jet-mill 130, the carbon-binder mixture is inspired by venturi and transferred by the compressed feed air into a grinding chamber, where the fibrillization of the mixture takes place. In one embodiment, the grinding chamber is lined with a ceramic such that abrasion of the internal walls of the jet-mill is minimized and so as to maintain purity of the resulting jet-milled carbon-binder mixture. The grinding chamber, which has a generally cylindrical shape, includes one or more nozzles placed circumferentially. The nozzles discharge the compressed grind air that is supplied by the grind air hose 125. The compressed air jets injected by the nozzles accelerate the carbon-binder particles and cause predominantly particle-to-particle collisions, although some particle-wall collisions also take place. The collisions dissipate the energy of the compressed air relatively quickly, fibrillizing the dry binder 16 within the mixture by causing size reduction of the aggregates and agglomerates of originally introduced dry particles and so as to adhere and embed carbon particle 12 and 14 within a resulting lattice of particles formed by the fibrillized binder. The colliding particles 12, 14, and 16 spiral towards the center of the grinding chamber and exit the chamber through the output connection 145.

Figure 1G:
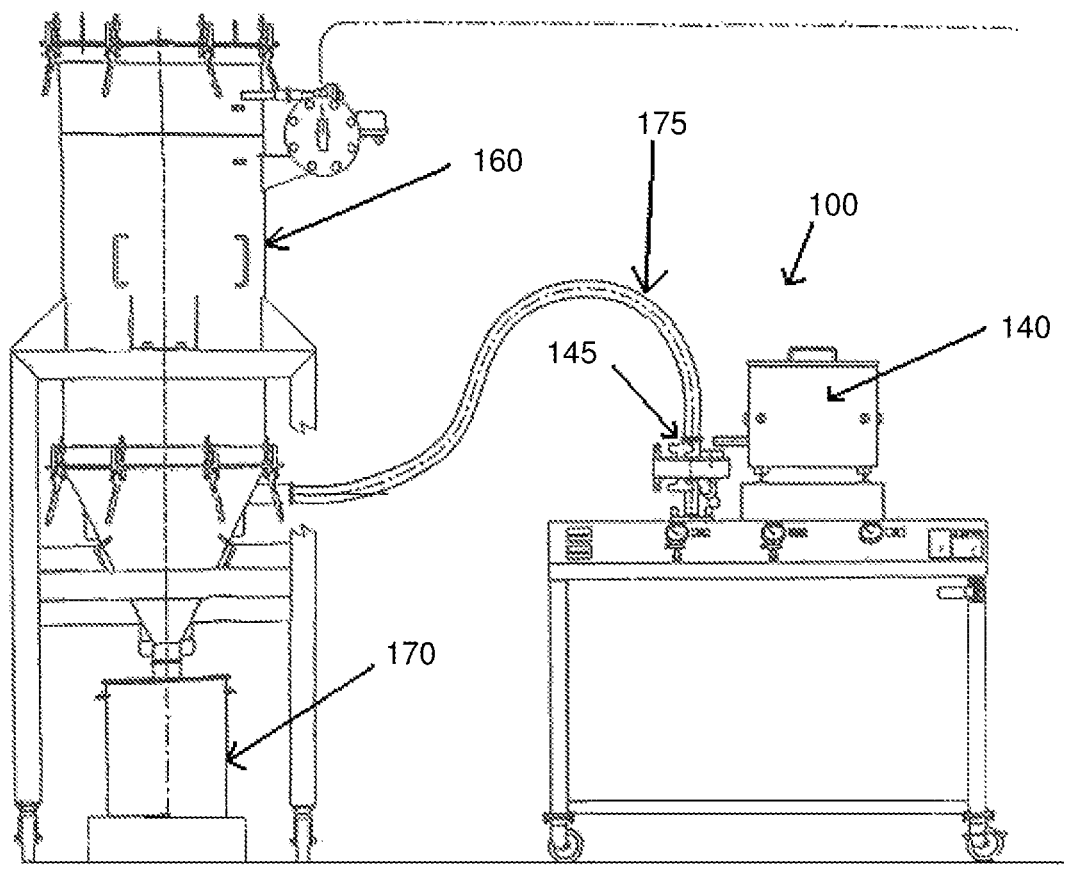
FIG. 1g is a high-level front view of the jet mill assembly of FIGS. 1b-d in combination with a dust collector and a collection container.
Figure 1H:
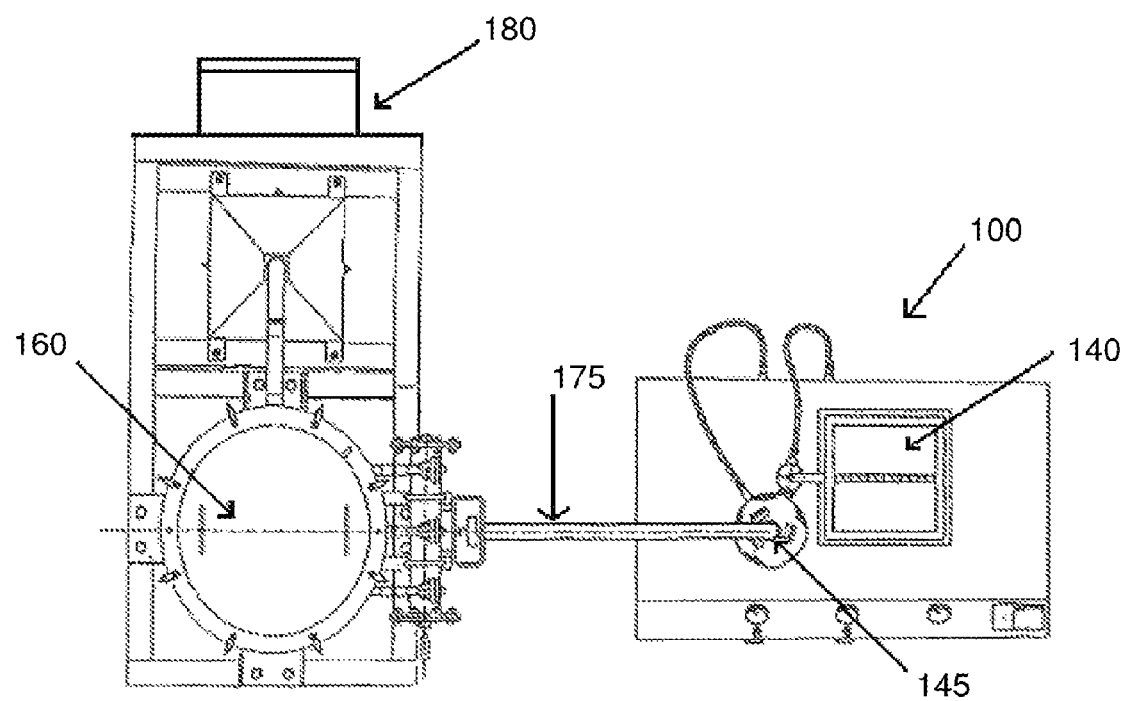
FIG. 1h is a high-level top view of the combination of FIGS. 1f and 1g.
Figure 2A:
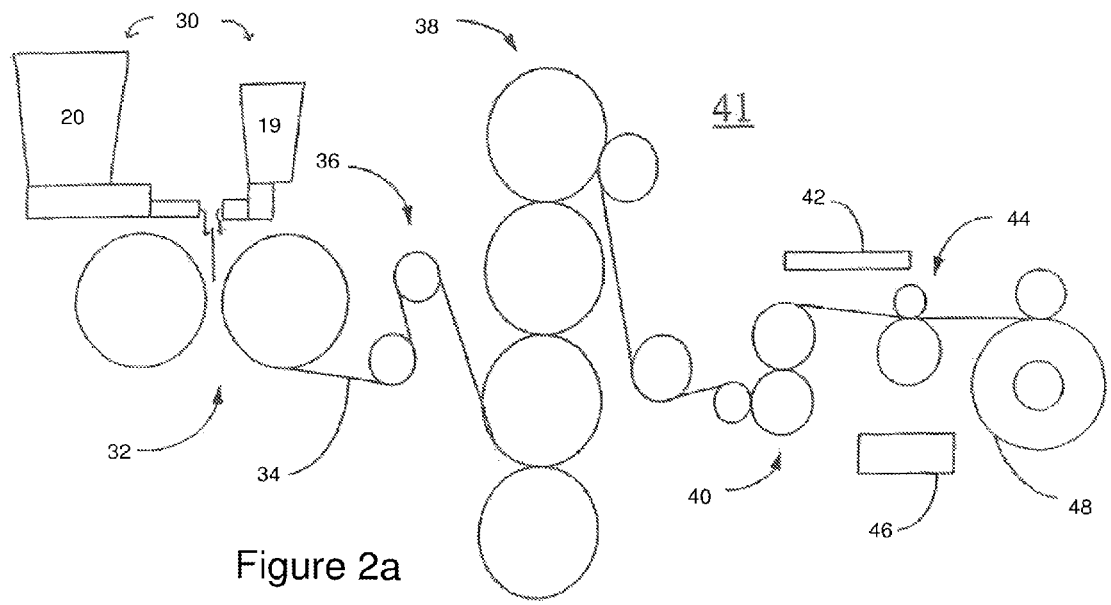
FIG. 2a shows an apparatus for forming a structure of an electrode.

Referring now to FIGS. 1g and 1h, there are seen front and top views, respectively, of the jet-mill assembly 100, a dust collector 160, and a collection container 170 (further referenced in FIG. 2a as container 20). In one embodiment, the fibrillized carbon-binder particles that exit through the output connection 145 are guided by a discharge hose 175 from the jet-mill 130 into a dust collector 160. In the illustrated embodiment, the dust collector 160 is model CL-7-36-11 available from Ultra Industries, Inc., 1908 DeKoven Avenue, Racine, Wis. 53403; telephone number (262) 633-5070. Within the dust collector 160 the output of the jet-mill 130 is separated into (1) air, and (2) a dry fibrillized carbon-binder particle mixture 20. The carbon-binder mixture is collected in the container 170, while the air is filtered by one or more filters and then discharged. The filters, which may be internal or external to the dust collector 160, are periodically cleaned, and the dust is discarded. Operation of the dust collector is directed from a control panel 180.

It has been identified that a dry compounded material, which is provided by dry fibrillization step 20, retains its homogeneous particle like properties for a limited period of time. In one embodiment, because of forces, for example, gravitational forces exerted on the dry particles 12, 14, and 16, the compounded material begins to settle such that spaces and voids that exist between the dry particles 12, 14, 16 after step 20 gradually become reduced in volume. In one embodiment, after a relatively short period of time, for example 10 minutes or so, the dry particles 12, 14, 16 compact together and begin to form clumps or chunks such that the homogeneous properties of the compounded material may be diminished and/or such that downstream processes that require free flowing compounded materials are made more difficult or impossible to achieve. Accordingly, in one embodiment, it is identified that a dry compounded material as provided by step 20 should be utilized before its homogeneous properties are no longer sufficiently present and/or that steps are taken to keep the compounded material sufficiently aerated to avoid clumping.

It should be noted that the specific processing components described so far may vary as long as the intent of the embodiments described herein is achieved. For example, techniques and machinery that are envisioned for potential use to provide high shear and/or pressure forces to effectuate a dry fibrillization step 20 include jet-milling, pin milling, impact pulverization, roll milling, and hammer milling, and other techniques and apparatus. Further in example, a wide selection of dust collectors can be used in alternative embodiments, ranging from simple free-hanging socks to complicated housing designs with cartridge filters or pulse-cleaned bags. Similarly, other feeders can be easily substituted in the assembly 100, including conventional volumetric feeders, loss-weight volumetric feeders, and vibratory feeders. The size, make, and other parameters of the jet-mill 130 and the compressed air supply apparatus (the compressor 205 and the compressed air storage tank 210) may also vary and yet be within the scope of the present invention.

The present inventors have performed a number of experiments to investigate the effects of three factors in the operation of jet-mill assembly 100 on qualities of the dry compounded material provided by dry fibrillization step 20, and on compacted/calendered electrode films fabricated therefrom. The three factors are these: (1) feed air pressure, (2) grind air pressure, and (3) feed rate. The observed qualities included tensile strength in width (i.e., in the direction transverse to the direction of movement of a dry electrode film in a high-pressure calender during a compacting process); tensile strength in length (i.e., in the direction of the dry film movement); resistivity of the jet-mill processed mixture provided by dry fibrillization step 20; internal resistance of electrodes made from the dry electrode film in a double layer capacitor application; and specific capacitance achieved in a double layer capacitor application.

Resistance and specific capacitance values were obtained for both charge (up) and discharge (down) capacitor cycles.

The design of experiments ("DOE") included a three-factorial, eight experiment to investigation performed with dry electrode films dried for 3 hours under vacuum conditions at 160 degrees Celsius. Five or six samples were produced in each of the experiments, and values measured on the samples of each experiment were averaged to obtain a more reliable result. The three-factorial experiments included the following points for the three factors:

1. Feed rate was set to indications of 250 and 800 units on the feeder dial used. Recall that the feeder rate has a linear dependence on the dial settings, and that a full-scale setting of 999 corresponds to a rate of production of about 12 kg per hour (and therefore a substantially similar material consumption rate). Thus, settings of 250 units corresponded to a feed rate of about 3 kg per hour, while settings of 800 units corresponded to a feed rate of about 9.6 kg per hour. In accordance with the standard vernacular used in the theory of design of experiments, in the accompanying tables and graphs the former setting is designated as a "0" point, and the latter setting is designated as a "1" point.

2. The grind air pressure was set alternatively to 85 psi and 110 psi, corresponding, respectively, to "0" and "1" points in the accompanying tables and graphs.

3. The feed air pressure (also known as inject air pressure) was set to 60 and 70 psi, corresponding, respectively, to "0" and "1" points.

Turning first to tensile strength measurements, strips of standard width were prepared from each sample, and the tensile strength measurement of each sample was normalized to a one-mil thickness. The results for tensile strength measurements in length and in width appear in Tables 2 and 3 below.

TABLE 2

Tensile Strength in Length

| Exp. No. | FACTORS Feed Rate, Grind psi, Feed psi | DOE POINTS | SAMPLE THICKNESS (mil) | TENSILE STRENGTH IN LENGTH (grams) | NORMALIZED TENSILE STRENGTH IN LENGTH (g/mil) |
|---|---|---|---|---|---|
| 1 | 250/85/60 | 0/0/0 | 6.1 | 123.00 | 20.164 |
| 2 | 250/85/70 | 0/0/1 | 5.5 | 146.00 | 26.545 |
| 3 | 250/110/60 | 0/1/0 | 6.2 | 166.00 | 26.774 |
| 4 | 250/110/70 | 0/1/1 | 6.1 | 108.00 | 17.705 |
| 5 | 800/85/60 | 1/0/0 | 6.0 | 132.00 | 22.000 |
| 6 | 800/85/70 | 1/0/1 | 5.8 | 145.00 | 25.000 |
| 7 | 800/110/60 | 1/1/0 | 6.0 | 135.00 | 22.500 |
| 8 | 800/110/70 | 1/1/1 | 6.2 | 141.00 | 22.742 |

TABLE 3

Tensile Strength in Width

| Exp. No. | Factors (Feed Rate, Grind psi, Feed psi) | DOE Points | Sample Thickness (mil) | Tensile Strength in Length (grams) | Normalized Tensile Strength in Length (g/mil) |
|---|---|---|---|---|---|
| 1 | 250/85/60 | 0/0/0 | 6.1 | 63.00 | 10.328 |
| 2 | 250/85/70 | 0/0/1 | 5.5 | 66.00 | 12.000 |
| 3 | 250/110/60 | 0/1/0 | 6.2 | 77.00 | 12.419 |
| 4 | 250/110/70 | 0/1/1 | 6.1 | 59.00 | 9.672 |
| 5 | 800/85/60 | 1/0/0 | 6.0 | 58.00 | 9.667 |
| 6 | 800/85/70 | 1/0/1 | 5.8 | 70.00 | 12.069 |
| 7 | 800/110/60 | 1/1/0 | 6.0 | 61.00 | 10.167 |
| 8 | 800/110/70 | 1/1/1 | 6.2 | 63.00 | 10.161 |

Table 4 below presents resistivity measurements of a jet mill-dry blend of particles provided by dry fibrillization step 20. Note that the resistivity measurements were taken before the mixture was processed into a dry electrode film.

TABLE 4

Dry Resistance

| Exp. No. | Factors (Feed Rate, Grind psi, Feed psi) | DOE Points | DRY RESISTANCE (Ohms) |
|---|---|---|---|
| 1 | 250/85/60 | 0/0/0 | 0.267 |
| 2 | 250/85/70 | 0/0/1 | 0.229 |
| 3 | 250/110/60 | 0/1/0 | 0.221 |
| 4 | 250/110/70 | 0/1/1 | 0.212 |
| 5 | 800/85/60 | 1/0/0 | 0.233 |
| 6 | 800/85/70 | 1/0/1 | 0.208 |
| 7 | 800/110/60 | 1/1/0 | 0.241 |
| 8 | 800/110/70 | 1/1/1 | 0.256 |

Figure 1I:
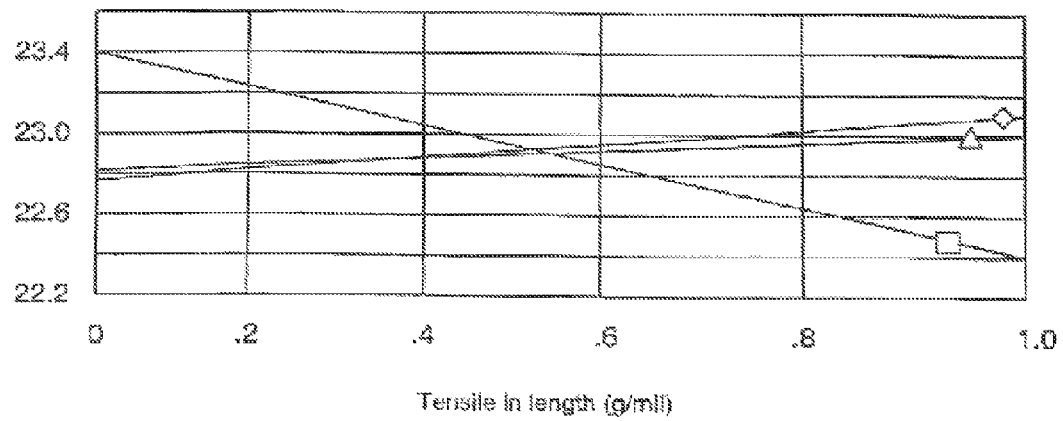
FIGS. 1i, 1j, and 1k illustrate effects of variations in feed rate, grind pressure, and feed pressure on tensile strength in length, tensile strength in width, and dry resistivity of electrode materials.
Figure 1J:
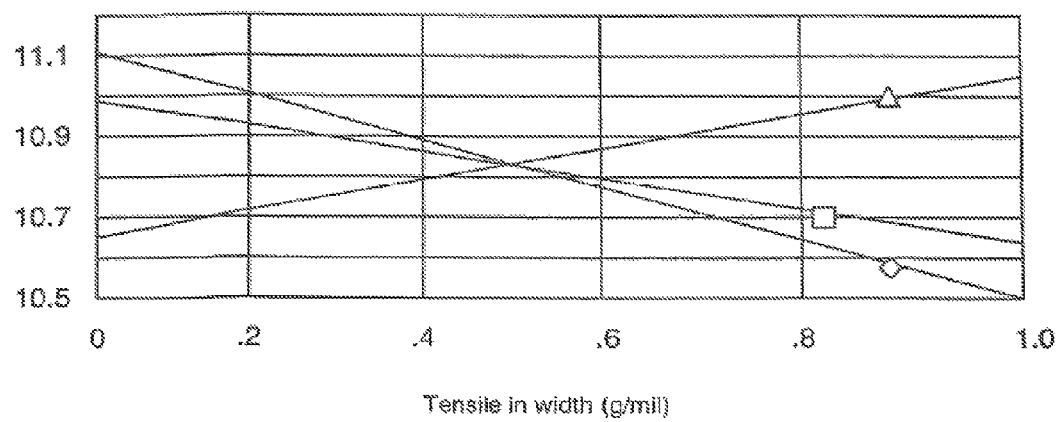
Figure 1K:
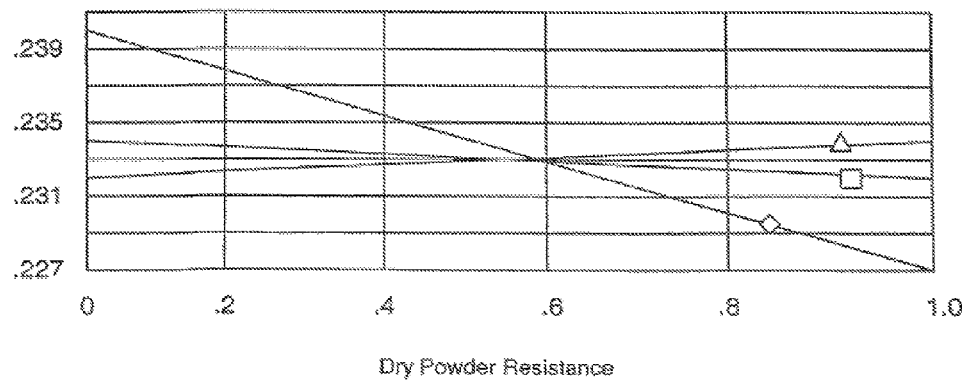

Referring now to FIGS. 1*i*, 1*j*, and 1*k*, there are illustrated the effects of the three factors on the tensile strength in length, tensile strength in width, and dry resistivity. Note that each end-point for a particular factor line (i.e., the feed rate line, grind pressure line, or inject pressure line) on a graph corresponds to a measured value of the quality parameter (i.e., tensile strength or resistivity) averaged over all experiments with the particular key factor held at either "0" or "1," as the case may be. Thus, the "0" end-point of the feed rate line (the left most point) represents the tensile strength averaged over experiments numbered 1-4, while the "1" end-point on the same line represents the tensile strength averaged over experiments numbered 4-8. As can be seen from FIGS. 1*i* and 1*j*, increasing the inject pressure has a moderate to large positive effect on the tensile strength of an electrode film. At the same time, increasing the inject pressure has the largest effect on the dry resistance of the powder mixture, swamping the effects of the feed rate and grind pressure. The dry resistance decreases with increasing the inject pressure. Thus, all three qualities benefit from increasing the inject pressure.

In Table 5 below we present data for final capacitances measured in double-layer capacitors utilizing dry electrode films made from dry fibrillized particles as described herein by each of the 8 experiments, averaged over the sample size of each experiment. Note that $C_{up}$ refers to the capacitances measured when charging double-layer capacitors, while $C_{down}$ values were measured when discharging the capacitors. As in the case of tensile strength data, the capacitances were normalized to the thickness of the electrode film. In this case, however, the thicknesses have changed, because the dry film has undergone compression in a high-pressure nip during the process of bonding the film to a current collector. It is noted in obtaining the particular results of Table 5, the dry electrode film was bonded to a current collector by an intermediate layer of adhesive. Normalization was carried out to the standard thickness of 0.150 millimeters.

TABLE 5

$C_{up}$ and $C_{down}$

| Exp. No. | Factors (Feed Rate, Grind psi, Feed psi) | DOE Points | Sample Thickness (mm) | $C_{up}$ (Farads) | Normalized $C_{up}$ (Farads) | $C_{down}$ (Farads) | NORMALIZED $C_{down}$ (Farads) |
|---|---|---|---|---|---|---|---|
| 1 | 250/85/60 | 0/0/0 | 0.149 | 1.09 | 1.097 | 1.08 | 1.087 |
| 2 | 250/85/70 | 0/0/1 | 0.133 | 0.98 | 1.105 | 0.97 | 1.094 |
| 3 | 250/110/60 | 0/1/0 | 0.153 | 1.12 | 1.098 | 1.11 | 1.088 |
| 4 | 250/110/70 | 0/1/1 | 0.147 | 1.08 | 1.102 | 1.07 | 1.092 |
| 5 | 800/85/60 | 1/0/0 | 0.148 | 1.07 | 1.084 | 1.06 | 1.074 |
| 6 | 800/85/70 | 1/0/1 | 0.135 | 1.00 | 1.111 | 0.99 | 1.100 |
| 7 | 800/110/60 | 1/1/0 | 0.150 | 1.08 | 1.080 | 1.07 | 1.070 |
| 8 | 800/110/70 | 1/1/1 | 0.153 | 1.14 | 1.118 | 1.14 | 1.118 |

In Table 6 we present data for resistances measured in each of the 8 experiments, averaged over the sample size of each experiment. Similarly to the previous table, $R_{up}$ designates resistance values measured when charging double-layer capacitors, while $R_{down}$ refers to resistance values measured when discharging the capacitors.

TABLE 6

$R_{up}$ and $R_{down}$

| Exp. No. | Factors (Feed Rate, Grind psi, Feed psi) | DOE Points | Sample Thickness (mm) | Electrode Resistance $R_{up}$ (Ohms) | Electrode Resistance $R_{down}$ (Ohms) |
|---|---|---|---|---|---|
| 1 | 250/85/60 | 0/0/0 | 0.149 | 1.73 | 1.16 |
| 2 | 250/85/70 | 0/0/1 | 0.133 | 1.67 | 1.04 |
| 3 | 250/110/60 | 0/1/0 | 0.153 | 1.63 | 1.07 |
| 4 | 250/110/70 | 0/1/1 | 0.147 | 1.64 | 1.07 |
| 5 | 800/85/60 | 1/0/0 | 0.148 | 1.68 | 1.11 |
| 6 | 800/85/70 | 1/0/1 | 0.135 | 1.60 | 1.03 |
| 7 | 800/110/60 | 1/1/0 | 0.150 | 1.80 | 1.25 |
| 8 | 800/110/70 | 1/1/1 | 0.153 | 1.54 | 1.05 |

Figure 1M:
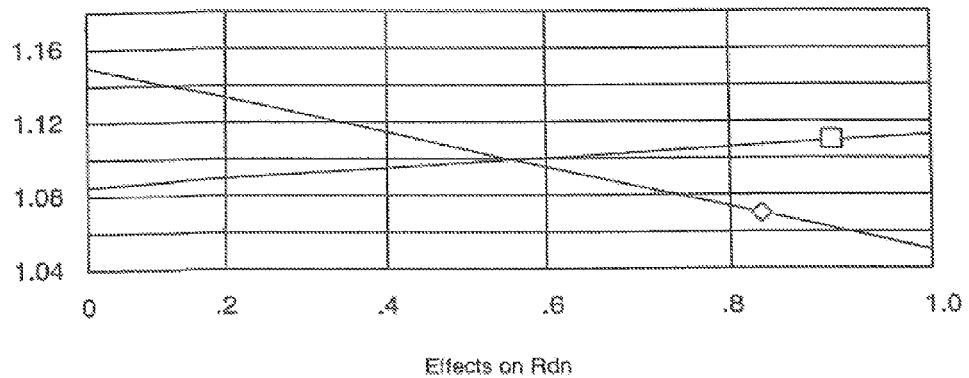
FIG. 1m illustrates effects of variations in feed rate, grind pressure, and feed pressure on internal resistance.
Figure 1N:
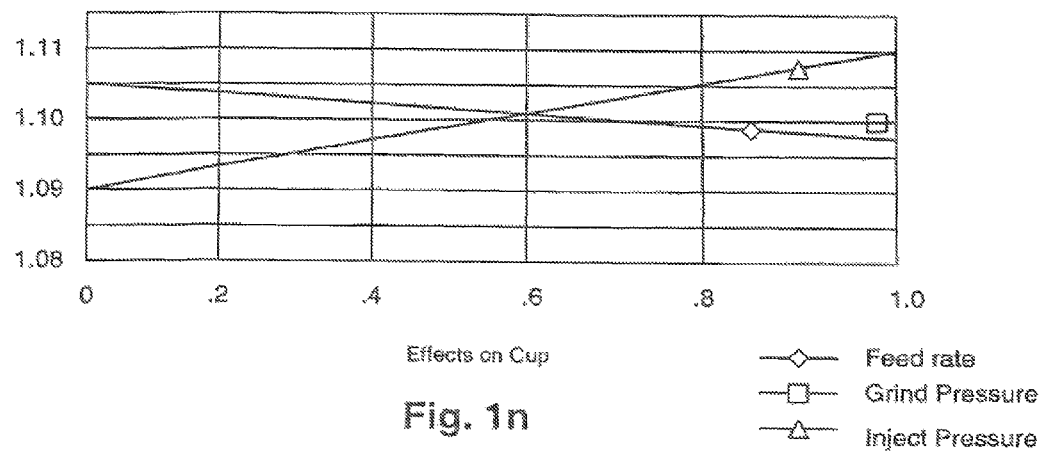
FIG. 1n illustrates effects of variations in feed rate, grind pressure, and feed pressure on capacitance.

To help visualize the above data and identify the data trends, we present FIGS. 1*m* and 1*n*, which graphically illustrate the relative importance of the three factors on the resulting $R_{down}$ and normalized $C_{up}$. Note that in FIG. 1*m* the Feed Rate and the Grind Pressure lines are substantially coincident.

Once again, increasing the inject pressure benefits both electrode resistance $R_{down}$ (lowering it), and the normalized capacitance $C_{up}$ (increasing it). Moreover, the effect of the inject pressure is greater than the effects of the other two factors. In fact, the effect of the inject pressure on the normalized capacitance overwhelms the effects of the feed rate and the grind pressure factors, at least for the factor ranges investigated.

Figure 1P:
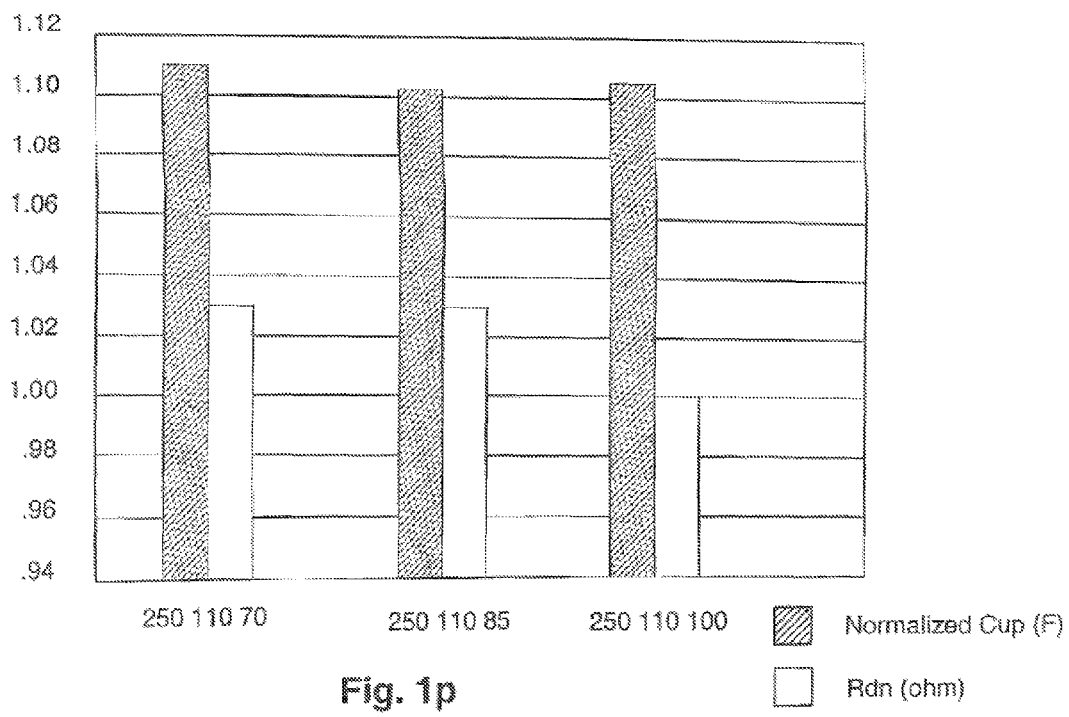
FIG. 1p illustrates effect of variation in feed pressure on internal resistance of electrodes, and on the capacitance of double layer capacitors using such electrodes.

Additional data has been obtained relating $C_{up}$ and $R_{down}$ to further increases in the inject pressure. Here, the feed rate and the grind pressure were kept constant at 250 units and 110 psi, respectively, while the inject pressure during production was set to 70 psi, 85 psi, and 100 psi. Bar graphs in FIG. 1*p* illustrate these data. As can be seen from these graphs, the normalized capacitance $C_{up}$ was little changed with increasing inject pressure beyond a certain point; while electrode resistance displayed a drop of several percentage points when the inject pressure was increased from 85 psi to 100 psi. The inventors herein believe that increasing the inject pressure beyond 100 psi would further improve electrode performance, particularly by decreasing internal electrode resistance.

Although dry blending 18 and dry fibrillization step 20 have been discussed herein as two separate steps that utilize multiple apparatus, it is envisioned that steps 18 and 20 could be conducted in one step wherein one apparatus receives dry particles 12, 14, and/or 16 as separate streams to mix the particles and thereafter fibrillize the particles. Accordingly, it is understood that the embodiments herein should not be limited by steps 18 and 20, but by the claims that follow. Furthermore, the preceding paragraphs describe in considerable detail inventive methods for dry fibrillizing carbon and binder mixtures to fabricate dry films, however, neither the specific embodiments of the invention as a whole, nor those of its individual features should limit the general principles described herein, which should be limited only by the claims that follow.

It is identified that in order to form a self-supporting dry film that has adequate physical as well as electrical properties for use in an energy storage device, sufficiently high force and/or energy needs be applied to a dry particle mixture. In one embodiment, such force is applied by shear forces. In another embodiment such force is applied by pressure. In one embodiment, such force is applied by a combination of shear and pressure. In one so embodiment, pressure is applied by a gas. In one embodiment, pressure is applied by a compaction step. As described above, such or similar energy and/or force may be applied during a dry fibrillization step 20, and as well, as described below, during one or more electrode formation step. In contrast to the additive-based prior art fibrillization steps, the present invention provides such forces without using solvents, processing aides, and/or additives. In one embodiment, after application of a sufficiently high shear and/or pressure force to a dry mix of dry particles, particles with sufficiently small size that may have been provided or formed within a dry mix of such particles may become attracted by their surface free energies to provide a supporting matrix within which other particles may become supported. It is believed that under sufficient shear force and or pressure, particles within the dry particle mixture described herein may be caused to approach one another to separation distances at which generally attractive forces (more specifically London-van der Waals forces), resulting from surface free energies inherent to the particles, attractively interact with sufficient force to hold the particles together thereby allowing formation of a continuous, self-supporting film.

Because solvents, liquids, additives, and the like, are not used, sufficiently high attraction may be maintained between dry particles for their use in a self supporting dry process based electrode film as described further herein. Thus, with the present invention, no solvents, liquids, additives or the like are used before, during, or after application of the shear and/or pressure forces that are disclosed herein. Numerous other benefits derive from non-use of prior art additives including: reduction of process steps and processing apparatus, increase in throughput and performance, the elimination or substantial reduction of residue and impurities that can derive from the use of additives and additive-based process steps, as well as other benefits that are discussed or that can be understood by those skilled in the art from the description of the embodiments that follows.

Referring back to FIG. 1a, the illustrated process also includes steps 21 and 23, wherein dry conductive particles 21 and dry binder 23 are blended in a dry blend step 19. Step 19, as well as possible step 26, also do not utilize additives before, during, or after the steps. In one embodiment, dry conductive particles 21 comprise conductive carbon particles. In one embodiment, dry conductive particles 21 comprise conductive graphite particles. In one embodiment, it is envisioned that conductive particles may comprise a metal powder of the like. In one embodiment, dry binder 23 comprises a dry thermoplastic material. In one embodiment, the dry binder comprises non-fibrillizable fluoropolymer. In one embodiment, dry binder 23 comprises polyethylene particles. In one embodiment, dry binder 23 comprises polypropylene or polypropylene oxide particles. In one embodiment, the thermoplastic material is selected from polyolefin classes of thermoplastic known to those skilled in the art. Other thermoplastics of interest and envisioned for potential use include homo and copolymers, olefinic oxides, rubbers, butadiene rubbers, nitrile rubbers, polyisobutylene, poly(vinylesters), poly(vinylacetates), polyacrylate, fluorocarbon polymers, with a choice of thermoplastic dictated by its melting point, metal adhesion, and electrochemical and solvent stability in the presence of a subsequently used electrolyte. In other embodiments, thermoset and/or radiation set type binders are envisioned as being useful. The present invention, therefore, should not be limited by the disclosed and suggested binders, but only by the claims that follow.

As has been stated, a deficiency in the additive-based prior art is that residues of additive, impurities, and the like remain, even after one or more long drying step(s). The existence of such residues is undesirable for long-term reliability when a subsequent electrolyte impregnation step is performed to activate an energy storage device electrode. For example, when an acetonitrile-based electrolyte is used, chemical and/or electrochemical interactions between the acetonitrile and residues and impurities can cause undesired destructive chemical processes in, and/or a swelling of, an energy storage device electrode. Other electrolytes of interest include carbonate-based electrolytes (ethylene carbonate, propylene carbonate, dimethylcarbonate), alkaline (KOH, NaOH), or acidic (H2SO4) water solutions. It is identified when processing additives are substantially reduced or eliminated from the manufacture of energy storage device structures, as with one or more of the embodiments disclosed herein, the prior art undesired destructive chemical and/or electrochemical processes and swelling caused by the interactions of residues and impurities with electrolyte are substantially reduced or eliminated.

In one embodiment, dry carbon particles 21 and dry binder particles 23 are used in a ratio of about 40%-60% binder to about 40%-60% conductive carbon by weight. In step 19, dry carbon particles 21 and dry binder material 23 are dry blended in a V-blender for about 5 minutes. In one embodiment, the conductive carbon particles 21 comprise a mean diameter of about 10 microns. In one embodiment, the binder particles 23 comprise a mean diameter of about 10 microns or less. Other particle sizes are also within the scope of the invention, and should be limited only by the scope of the claims. In one embodiment, (further disclosed by FIG. 2a), the blend of dry particles provided in step 19 is used in a dry feed step 22. In one embodiment (further disclosed by FIG. 2g), the blend of dry particles in step 19 may be used in a dry feed step 29, instead of dry feed step 22. In order to improve suspension and characteristics of particles provided by container 19, a small amount of fibrillizable binder (for example binder 16) may be introduced into the mix of the dry carbon particles 21 and dry binder particles 23, and dry fibrillized in an added dry fibrillization step 26 prior to a respective dry feed step 22 or 29.

Referring now to FIG. 2a, and preceding Figures as needed, there is seen one or more apparatus used for forming one or more energy device structure. In one embodiment, in step 22, the respective separate mixtures of dry particles formed in steps 19 and 20 are provided to respective containers 19 and 20. In one embodiment, dry particles from container 19 are provided in a ratio of about 1 gram to about 100 grams for every 1000 grams of dry particles provided by container 20. The containers are positioned above a device 41 of a variety used by those skilled in the art to compact and/or calender materials into sheets. The compacting and/or calendering function provided by device 41 can be achieved by a roll-mill, calender, a belt press, a flat plate press, and the like, as well as others known to those skilled in the art. Thus, although shown in a particular configuration, those skilled in the art will understand that variations and other embodiments of device 41 could be provided to achieve one or more of the benefits and advantages described herein, which should be limited only by the claims that follow.

Figure 2B:
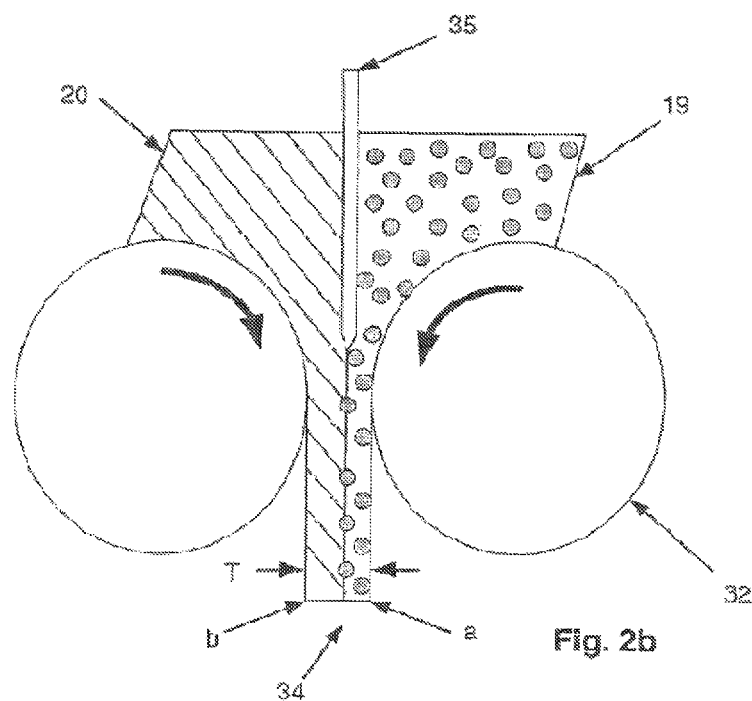
FIG. 2b shows a degree of intermixing of dry particles.

Referring now to FIG. 2b, and preceding Figures as needed, there is seen an apparatus to used for forming one or more electrode structure. As shown in FIG. 2b, the dry particles in containers 19 and 20 are fed as free flowing dry particles to a high-pressure nip of a roll-mill 32. As they are fed towards the nip, the separate streams of dry particles become intermixed and begin to loose their freedom of motion. It is identified that use of relatively small particles in one or more of the embodiments disclosed herein enables that good particle mixing and high packing densities can be achieved and that a concomitant lower resistivity may be achieved as a result. The degree of intermixing can be to an extent determined by process requirements and accordingly made adjustments. For example, a separating blade 35 can be adjusted in both a vertical and/or a horizontal direction to change a degree of desired intermixing between the streams of dry particles. The speed of rotation of each roll may be different or the same as determined by process requirements. A resulting intermixed compacted dry film 34 exits from the roll-mill 32 and is self-supporting after only one compacting pass through the roll-mill 32.

Particular dry particle formulations can affect characteristics of dry films formed by roll-mill 32, for example, thickness of films formed by a roll-mill can range between about 10 um to 2 mm and widths may range from on the order of meters to as small as 10 mm. In one embodiment, the width of a film formed by roll-mill 32 is about 30 mm. The ability to provide a self supporting film in one pass eliminates numerous folding steps and multiple compacting/calendering steps that in prior art embodiments are used to strengthen films to give them the tensile strength needed for subsequent handling and processing. Self supporting characteristics after one pass through a roll mill may also be effectuated by so further fibrillization that occurs during electrode formation steps that are described further herein. Because a dry film can be sufficiently self supporting after one pass through roll-mill 32, it can easily and quickly be formed into one long integral continuous sheet, which can be rolled for subsequent use in a commercial scale manufacture process. A dry film can be formed as a self-supporting sheet that is limited in length only by the capacity of the rewinding equipment. In one embodiment, the dry film is between 0.1 and 5000 meters long. Compared to some prior art additive based films which are described as non-self supporting and/or small finite area films, the dry self-supporting films described herein are more economically suited for large scale commercial manufacture.

Figure 2C:
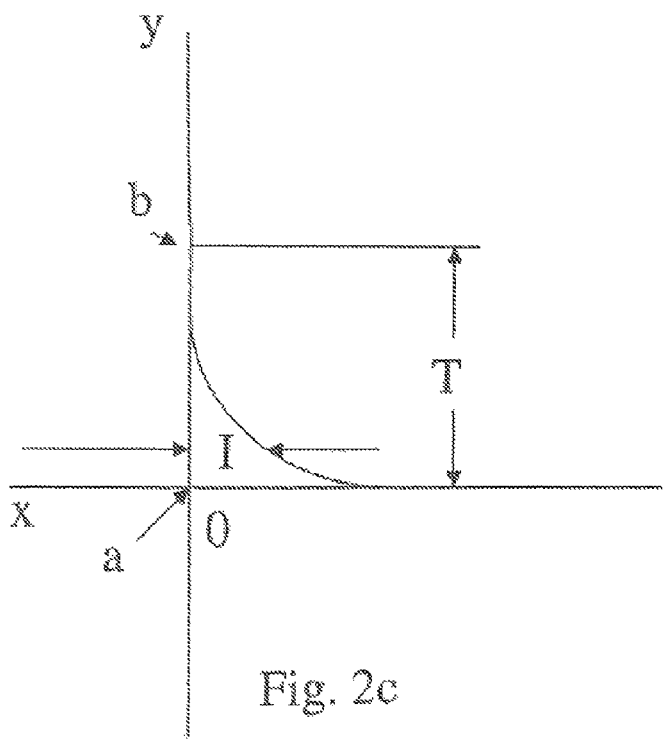
FIG. 2c shows a gradient of particles within a dry film.

Referring now to FIG. 2c, and preceding Figures as needed, there is seen a diagram representing the degree of intermixing that occurs between particles from containers 19 and 20. In FIG. 2c, a cross section of intermixed dry particles at the point of application to the high-pressure nip of roll-mill 32 is represented, with "T" being an overall thickness of the intermixed dry film 34 at a point of exit from the high-pressure nip. The curve in FIG. 2c represents the relative concentration/amount of a particular dry particle at a given thickness of the dry film 34, as measured from a right side of the dry film 34 in FIG. 2b (y-axis thickness is thickness of film, and x-axis is relative concentration/amount of a particular dry particle). For example, at a given thickness measured from the right side of the dry film 34, the amount of a type of dry particle from container 19 (as a percentage of the total intermixed dry particles that generally exists at a particular thickness) can be represented by an X-axis value "I". As illustrated, at a zero thickness of the dry film 34 (represented at zero height along the Y-axis), the percentage of dry binder particles "I" from container 19 will be at a maximum, and at a thickness approaching "T", the percentage of dry particles from container 19 will approach zero.

Figure 2D:
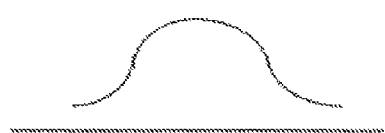
FIG. 2d shows a distribution of the sizes of dry binder and conductive carbon particles.

Referring now to FIG. 2d, and preceding Figures as needed, there is seen a diagram illustrating a distribution of the sizes of dry binder and carbon particles. In one embodiment, the size distribution of dry binder and carbon particles provided by container 19 may be represented by a curve with a centralized peak, with the peak of the curve representing a peak quantity of dry particles with a particular particle size, and the sides of the peak representing lesser amounts of dry particles with lesser and greater particle sizes. In dry compacting/calendering step 24, the intermixed dry particles provided by step 22 are compacted by the roll-mill 32 to form the dry film 34 into an intermixed dry film. In one embodiment, the dry particles from container 19 are intermixed within a particular thickness of the resulting dry film 34 such that at any given distance within the thickness, the size distribution of the dry particles 19 is the same or similar to that existing prior to application of the dry particles to the roll-mill 32 (i.e. as illustrated by FIG. 2d). A similar type of intermixing of the dry particles from container 20 also occurs within the dry film 34 (not shown).

In one embodiment, the process described by FIGS. 2a-d is performed at an operating temperature, wherein the temperature can vary according to the type of dry binder selected for use in steps 16 and 23, but such that the temperature is less than the melting point of the dry binder 23 and/or is sufficient to soften the dry binder 16. In one embodiment, it is identified that when dry binder particles 23 with a melting point of 150 degrees are used in step 23, the operating temperature at the roll-mill 32 is about 100 degrees centigrade. In other embodiments, the dry binder in step 23 may be selected to comprise a melting point that varies within a range of about 50 degrees centigrade and about 350 degrees centigrade, with appropriate changes made to the operating temperature at the nip.

The resulting dry film 34 can be separated from the roll-mill 32 using a doctor blade, or the edge of a thin strip of plastic or other separation material, including metal or paper. Once the leading edge of the dry film 34 is removed from the nip, the weight of the self-supporting dry film and film tension can act to separate the remaining exiting dry film 34 from the roll-mill 32. The self-supporting dry film 34 can be fed through a tension control system 36 into a calender 38. The calender 38 may further compact and densify the dry film 34. Additional calendering steps can be used to further reduce the dry film's thickness and to increase tensile strength. In one embodiment, dry film 34 comprises a calendered density of at least 0.3 gm/cm$^3$.

Figure 2E:
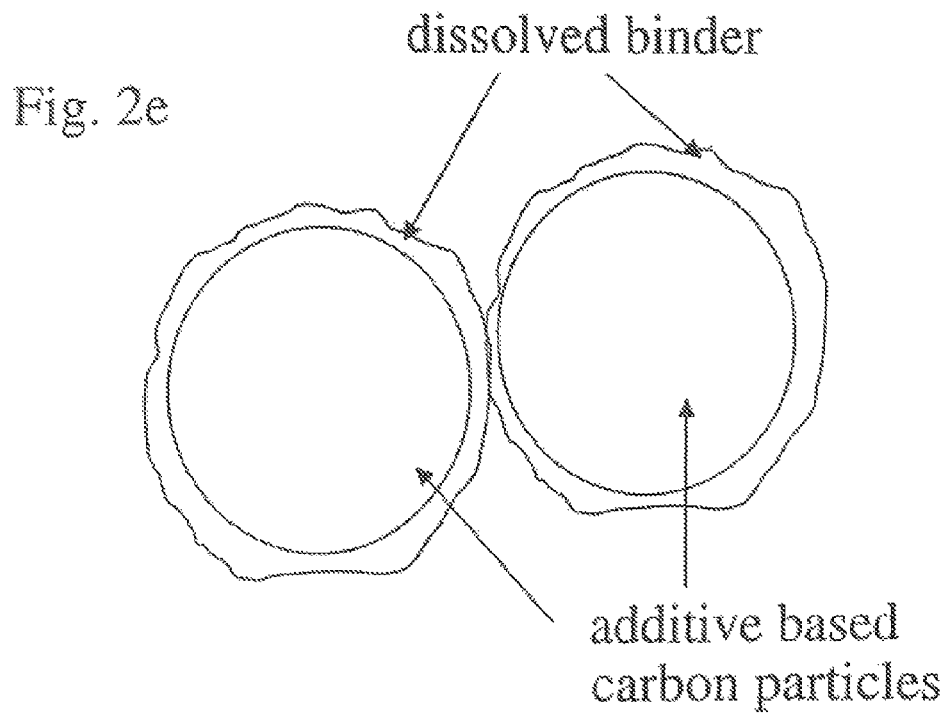
FIGS. 2e-f, show carbon particles as encapsulated by dissolved binder of the prior art and dry carbon particles as attached to dry binder of the present invention.
Figure 2F:
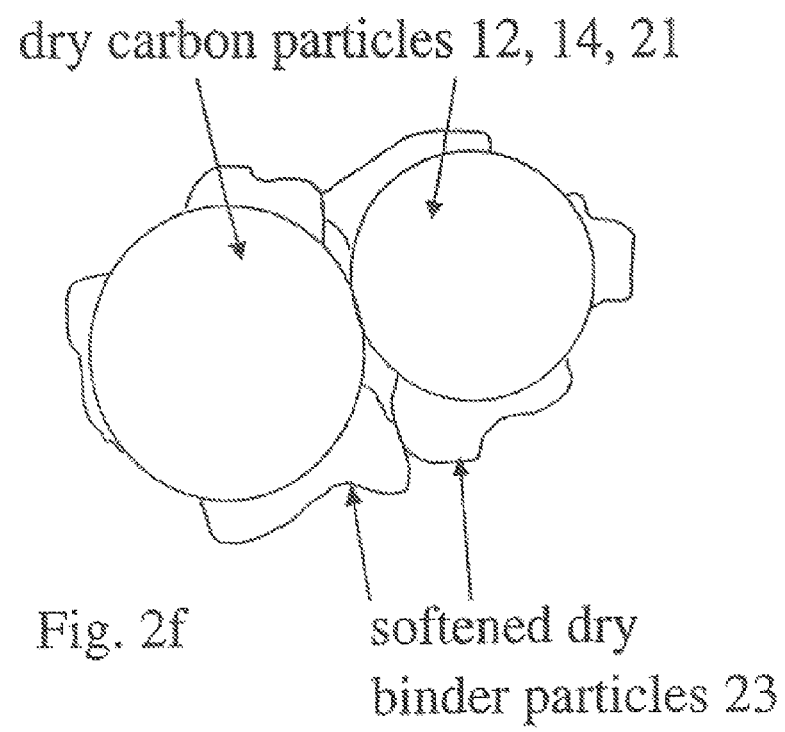

Referring now to FIGS. 2e-f, there are seen carbon particles encapsulated by dissolved binder of the prior art, and dry carbon particles attached to dry binder of the present invention, respectively. In the prior art, capillary type forces caused by the presence of solvents diffuse dissolved binder particles in a wet slurry based adhesive/binder layer into an attached additive-based electrode film layer. In the prior art, carbon particles within the electrode layer become completely encapsulated by the diffused dissolved binder, which when dried couples the adhesive/binder and electrode film layers together. Subsequent drying of the solvent results in an interface between the two layers whereat carbon particles within the electrode layer are prevented by the encapsulating binder from conducting, thereby undesirably causing an increased interfacial resistance. In the prior art, the extent to which binder particles from the adhesive/binder layer are present within the electrode film layer becomes limited by the size of the particles comprising each layer, for example, as when relatively large particles comprising the wet adhesive/binder layer are blocked from diffusing into tightly compacted particles of the attached additive-based electrode film layer.

In contrast to the prior art, particles from containers 19 and 20 are become intermixed within dry film 34 such that each can be identified to exist within a thickness "T" of the dry film with a particular concentration gradient. One concentration gradient associated with particles from container 19 is at a maximum at the right side of the intermixed dry film 34 and decreases when measured towards the left side of the intermixed dry film 34, and a second concentration gradient associated with particles from container 20 is at a maximum at the left side of the intermixed dry film 34 and decreases when measured towards the right side of the intermixed dry film 34. The opposing gradients of particles provided by container 19 and 20 overlap such that functionality provided by separate layers of the prior art may be provided by one dry film 34 of the present invention. In one embodiment, a gradient associated with particles from container 20 provides functionality similar to that of a separate prior art additive based electrode film layer, and the gradient associated with particles from container 19 provides functionality similar to that of a separate prior art additive based adhesive/binder layer. The present invention enables that equal distributions of all particle sizes can be smoothly intermixed (i.e. form a smooth gradient) within the intermixed dry film 34. It is understood that with appropriate adjustments to blade 35, the gradient of dry particles 19 within the dry film 34 can be made to penetrate across the entire thickness of the dry film, or to penetrate to only within a certain thickness of the dry film. In one embodiment, the penetration of the gradient of dry particles 19 is about 5 to 15 microns. In part, due to the gradient of dry particles 19 that can be created within dry film 34 by the aforementioned intermixing, it is identified that a lesser amount of dry particles need be utilized to provide a surface of the dry film with a particular adhesive property, than if dry particles 19 and dry particles 20 were pre-mixed throughout the dry film.

In the prior art, subsequent application of electrolyte to an additive based two-layer adhesive/binder and electrode film combination may cause the binder, additive residues, and impurities within the layers to dissolve and, thus, the two-layers to eventually degrade and/or delaminate. In contrast, because the binder particles of the present invention are distributed evenly within the dry film according to their gradient, and/or because no additives are used, and/or because the binder particles may be selected to be substantially impervious, insoluble, and/or inert to a wide class of additives and/or electrolyte, such destructive delamination and degradation can be substantially reduced or eliminated.

The present invention provides one intermixed dry film 34 such that the smooth transitions of the overlapping gradients of intermixed particles provided by containers 19 and 20 allow that minimized interfacial resistance is created. Because the dry binder particles 23 are not subject to and/or do not dissolve during intermixing, they do not completely encapsulate particles 12, 14, and 21. Rather, as shown in FIG. 2f, after compacting, and/or calendering, and/or heating steps, dry binder particles 23 become softened sufficiently such that they attach themselves to particles 12, 14, and 21. Because the dry binder particles 23 are not completely dissolved as occurs in the prior art, the particles 23 become attached in a manner that leaves a certain amount of surface area of the particles 12, 14, and 21 exposed; an exposed surface area of a dry conductive particle can therefore make direct contact with surface areas of other conductive particles. Because direct conductive particle-to-particle contact is not substantially impeded by use of dry binder particles 23, an improved interfacial resistance over that of the prior art binder encapsulated conductive particles can be achieved.

Figure 3:
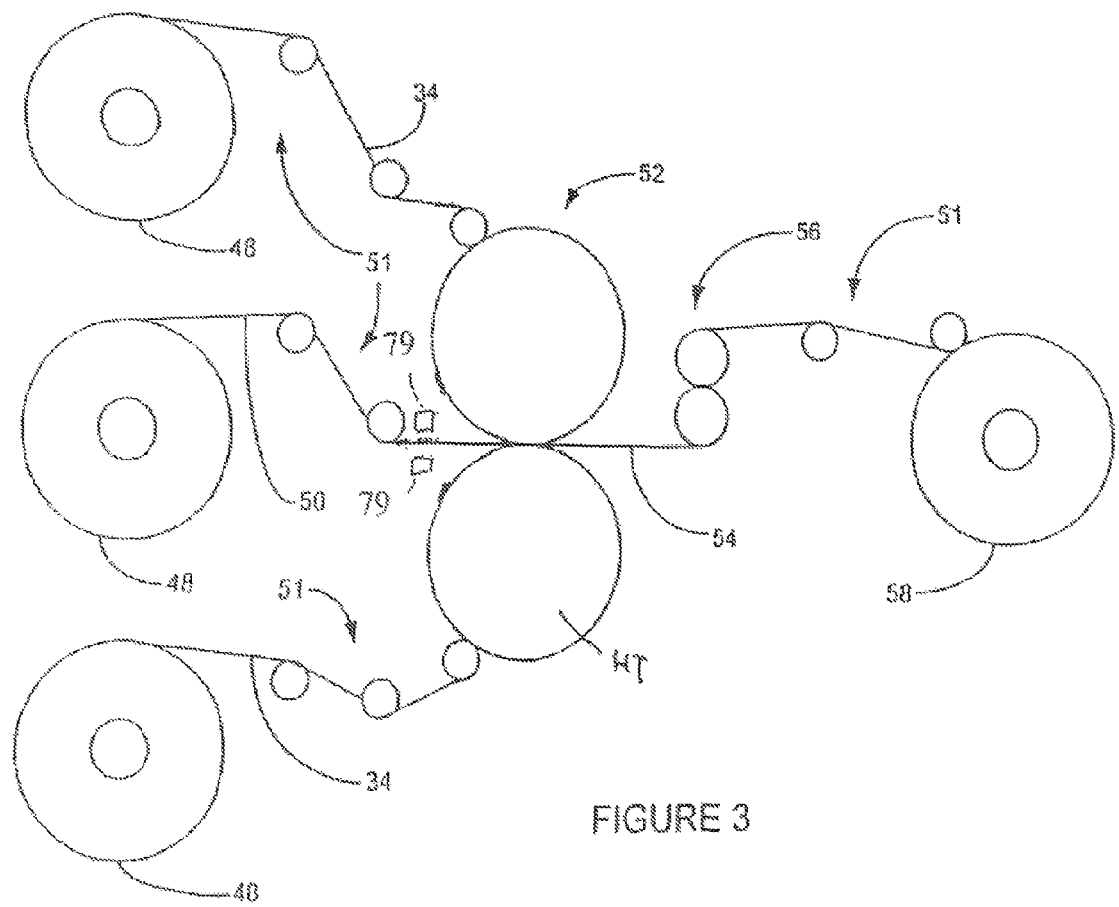
FIG. 3 is a side representation of one embodiment of a system for bonding electrode films to a current collector for use in an energy storage device.

The intermixed dry film 34 also exhibits dissimilar and asymmetric surface properties at opposing surfaces, which contrasts to the prior art, wherein similar surface properties exist at opposing sides of each of the separate adhesive/binder and electrode layers. The asymmetric surface properties of dry film 34 may be used to facilitate improved bonding and electrical contact to a subsequently used current collector (FIG. 3 below). For example, when bonded to a current collector, the one dry film 34 of the present invention introduces only one distinct interface between the current collector and the dry film 34, which contrasts to the prior art, wherein a distinct first interfacial resistance boundary exists between a collector and additive based adhesive/binder layer interface, and wherein a second distinct interfacial resistance boundary exists between an additive-based adhesive/binder layer and additive-based electrode layer interface.

Figure 2G:
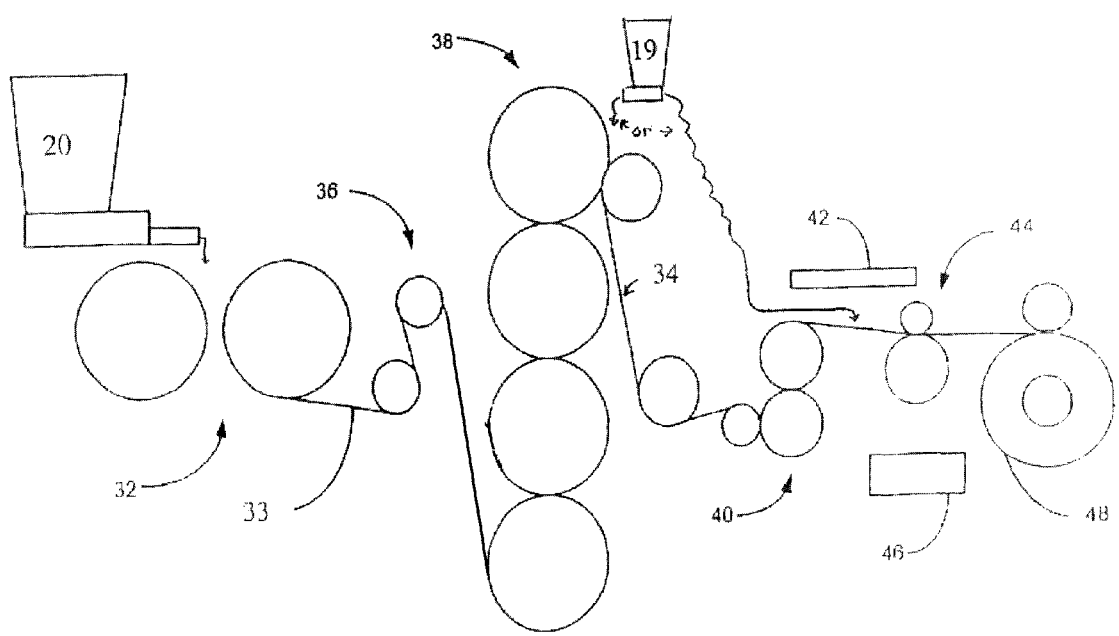
FIG. 2g shows a system for forming a structure for use in an energy storage device.

Referring now to FIG. 2g, and preceding Figures as needed, there is seen further apparatus that may be used for the manufacture of one or more structure described herein. Although FIG. 2g illustrates compacting apparatus similar to that of FIG. 2a. In FIG. 2a container or sources of particles are positioned at different locations. In one embodiment, a first container or source of particles 20 is positioned at a different point from that of a second container or source of particles 19. In one embodiment, dry fibrillized particles provided from the first source 20 are compacted and formed into a dry film 33, and a second source 19 of particles is provided downstream from the first source 20 of particles. In one embodiment, (illustrated as step 29 in FIG. 1a), the dry particles provided by source 19 are fed towards a high-pressure nip 38, which may compact and embed the dry particles from source 19 within the dry film 33. By providing dry particles from steps 19 and 20 at two different points, rather than one, it is identified that the temperature at each step of a process may in some instances be better controlled to take into account different softening/melting points of dry particles that may be provided. By appropriate choice of location of containers 19 and 20, separating blade 35, powder feed-rate, roll speed ratios, and/or surface of rolls, it is identified that the interface between dry particles provided to form a dry particle based electrode film may be appropriately varied.

FIG. 2g can also be used to describe a scatter coating embodiment. In one embodiment, a first source 20 may provide dry fibrillized particles in accordance with principles described above, which are subsequently formed into a dry film 33. In one embodiment, the dry fibrillized particles from first source 20 may comprise a mixed combination of dry particles 12, 14, 16, but it is understood that in other embodiments other particles may be used. In one embodiment, film 33 comprises a compression density that is greater than or equal to 0.3 gm/cm$^3$. Compression density may be measured by placing a known weight with a known surface area onto a sample of dry fibrillized powder and thereafter calculating the compression density from a change in the volume encompassed by the dry particles. It has been identified that with a compression density of about 0.45 gm/cm$^3$, a free flowing mixture of dry fibrillized particles from first source 20 may be compacted to provide a dry film 33 that is self-supporting after one pass through a compacting apparatus, for example roll-mill 32. The self-supporting continuous dry film 33 can be stored and rolled for later use as an energy device electrode film, or may be used in combination with dry particles provided by second source 19.

Figure 12:
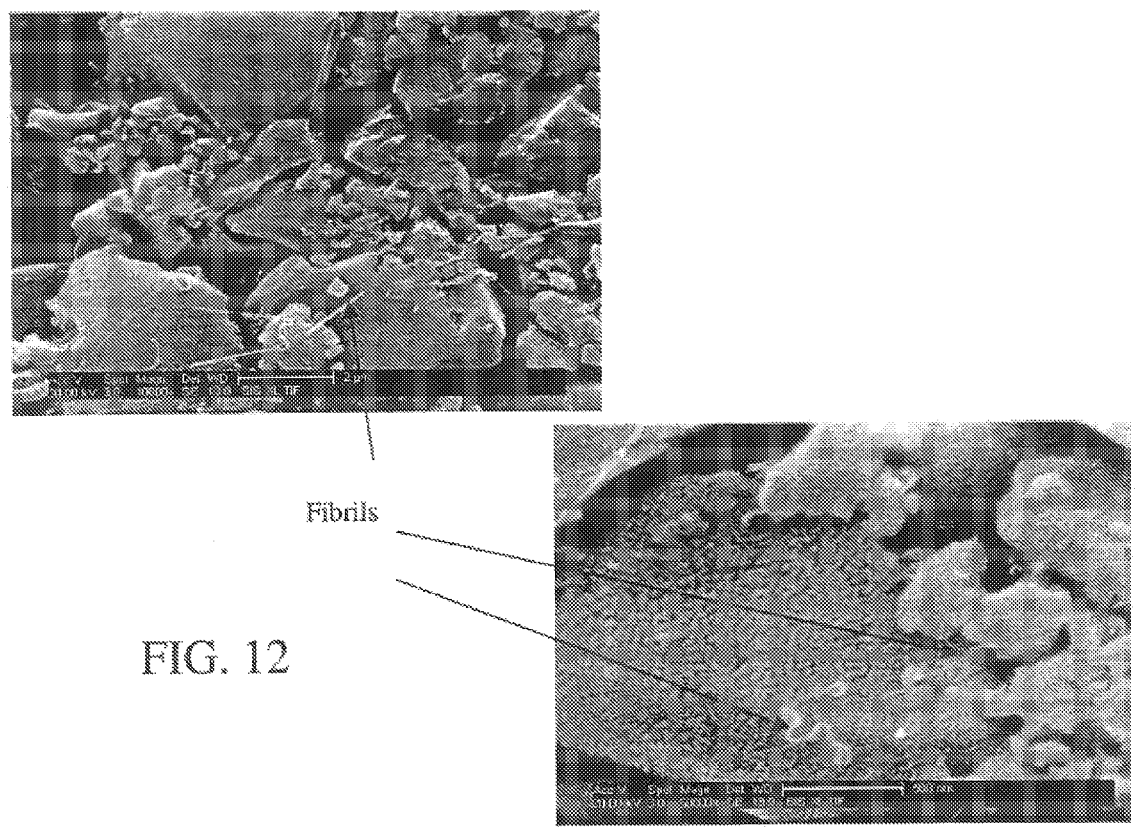
FIG. 12 illustrates an SEM of dry particles after calendering.
Figure 13:
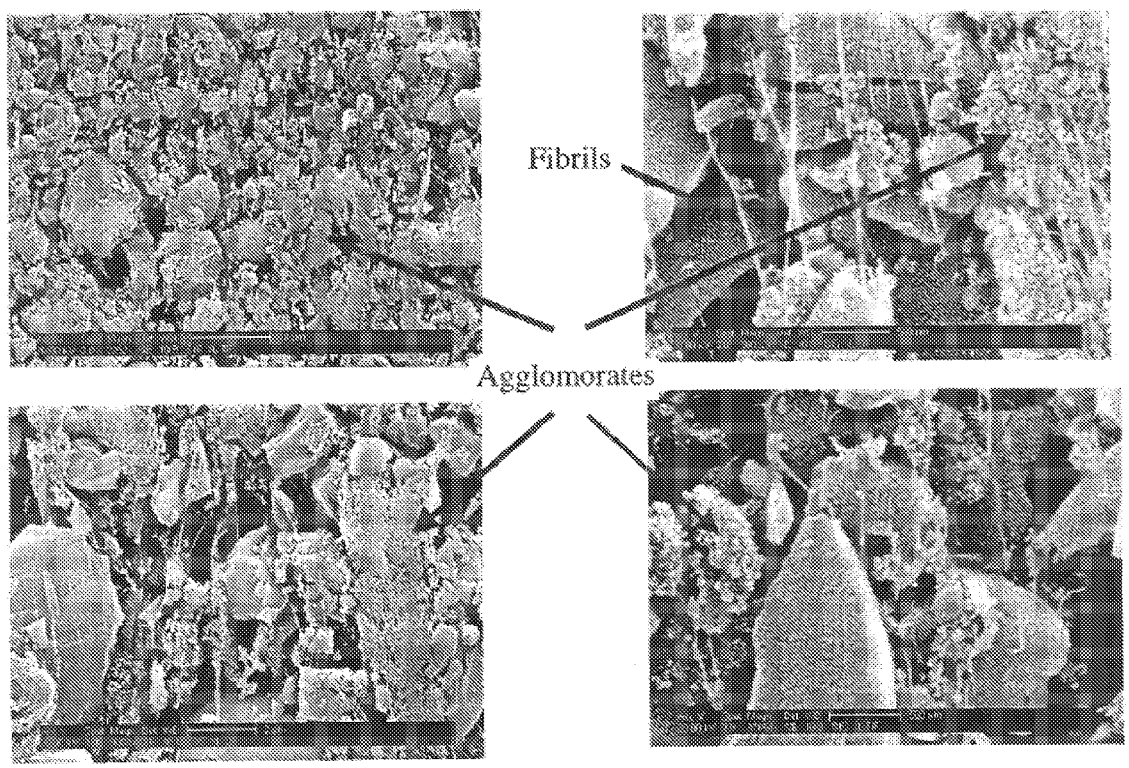
FIG. 13 illustrates a prior art additive based film with coalesced agglomerates of particles.

Referring to FIG. 12, there is seen an SEM of a dry compacted/calendered film. Dry particles that exit a roll-mill as a dry-film comprise self supporting characteristics at least to in part because of fibrillization of at least some of the dry particles. Weak fibrillization has been described above in the context of step(s) 20/26 (FIG. 1). However, it has been identified that further dry fibrillization also occurs during one or more dry compact/bonding/bonding step(s) 24/28. As seen from the SEM in FIG. 12, after compaction/calendering, visible formation of fibrils has occurred in a dry formed film. Such fibrillization is effectuated by the high pressure and shear forces that are known to exist and be applied to the dry particles between calender rolls during the formation of dry films and/or electrodes. It is understood that the amount of shear and/or energy applied in step(s) 24/28 to at least some of the dry particles is higher than during step(s) 20/26 such shear forces are of sufficient magnitude to stretch and/or unwind dry binder present in the dry mixture to a point that fibrils become formed and are visible under an SEM. Applying high pressure and shear forces can further reduce the separation distance between particles to increase attractive forces resulting from surface free energies. A "strong" type of fibrillization is thus made to occur in an amount that results in the visible formation of fibrils. As can be further seen from FIG. 12, fibrils are formed from dry binder particles without the large amount of agglomeration of binder that occurs in the prior art extrusion and coating processes. It is believed that the substantial or total absence of agglomerates in a final dry film product is effectuated by a certain minimal threshold of energy and/or force imparted to the constituent dry particles during the previously described dry fibrillization step. In this manner, both weak and strong fibrillization of one or more of the dry particles described herein contribute to the novel and new properties of the dry films described herein.

In one embodiment, one or more particles are provided by second source 19. In one embodiment, particles from second source 19 comprise a dry mix of conductive carbon 21 and binder 23 particles. In one embodiment, the binder 23 particles comprise same or similar thermoplastic binder particles to those described above. The particles from the second source 19 are fed or deposited onto the dry film 33 as the film is passed under the second source. Accordingly, in one embodiment, the second source 19 is positioned over a portion of the moving dry film 33 that is at some point horizontal, such that once deposited on the film, the particles from the second source remain more or less undisturbed until they are further calendered and/or heated. In one embodiment, the particles from the second source 19 are deposited by a scatter coating apparatus similar to that used in textile and non-woven fabric industries. The particles from the second source 19 are deposited onto the dry film 33 in a manner that preferably effectuates even distribution across the dry film. In one embodiment, 10 to 20 grams of particles from first source 19 are deposited per one square meter of dry film 33. After deposition of the particles from second source 19, the combination of particles and dry film 33 may be compacted and/or calendered against the film such that a resulting dry film 34 comprises dry particles which are adhered to, and/or embedded and intermixed within the dry film 33. In one embodiment one or more of heater 42, 46 and/or heated roll is used to heat the dry film 34 so as to soften the film and/or particles sufficiently to provide adequate adhesion between the particles adhered to and/or embedded within the film. An embedded/intermixed is dry film 34 may be subsequently attached to a collector or wound onto a storage roll 48 for subsequent use. In one embodiment, wherein one or more of the particles used to form film 34 provide adhesive functionality, the use of a subsequent prior art collector adhesive layer thus does not necessarily need to be used or included in an electrode product.

Alternative means, methods, steps, and setups to those disclosed herein are also within the scope of the present invention and should be limited only by the appended claims and their equivalents. For example, in one embodiment, instead of the self supporting continuous dry film 33 described herein, a commercially available prior art additive-based electrode film could be provided for subsequent calendering together with dry particles provided by the container or source 19 of FIG. 2g. Although a resulting two-layer film made in this manner would be at least in part additive based, and could undesirably interact with subsequently used electrolyte, such a two-layer film would nevertheless not need to utilize, or be subject to the limitations associated with, a prior art slurry based adhesive/binder layer. In one embodiment, instead of the continuous dry film 33 of FIG. 2g, a heated collector (not shown) could be provided, against which dry particles from container 19 could calendered. Such a combination of collector and adhered dry particles from container 19 could be stored and provided for later attachment to a separately provided electrode layer, which with appropriate apparatus could be heat calendered to attach the dry binder 23 of the dry particle mixture provided by container 19.

Referring to FIG. 3, and preceding Figures as needed, there is seen an apparatus used to bond a dry film to a current collector. In step 28, a dry film 34 is bonded to a current collector 50. In one embodiment, the current collector comprises an etched or roughened aluminum sheet, foil, mesh, screen, porous substrate, or the like. In one embodiment, the current collector comprises a metal, for example, copper, aluminum, silver, gold, and the like. In one embodiment, current collector comprises a thickness of about 30 microns. Those skilled in the art will recognize that if the electrochemical potential allows, other metals could also be used as a collector 50.

In one embodiment, a current collector 50 and two dry film(s) 34 are fed from storage rolls 48 into a heated roll-mill 52 such that the current collector 50 is positioned between two self-supporting dry films 34. In one embodiment, the current collector 50 may be pre-heated by a heater 79. The temperature of the heated roll-mill 52 may be used to heat and soften the dry binder 23 within the two intermixed dry films 34 such that good adhesion of the dry films to the collector 50 is effectuated. In one embodiment, a roll-mill 52 temperature of at the nip of the roll is between 100° C. and 300° C. In one embodiment, the nip pressure is selected between 50 pounds per linear inch (PLI) and 1000 PLI. Each intermixed dry film 34 becomes calendered and bonded to a side of the current collector 50. The two dry intermixed films 34 are fed into the hot roll nip 52 from storage roll(s) 48 in a manner that positions the peak of the gradients formed by the dry particles from container 19 directly against the current collector 50 (i.e. right side of a dry film 34 illustrated in FIG. 2b). After exiting the hot roll nip 52, it is identified that the resulting calendered dry film and collector product can be provided as a dry electrode 54 for use in an energy storage device, for example, as a double-layer capacitor electrode. In one embodiment, the dry electrode 54 can be S-wrapped over chill rolls 56 to set the dry film 34 onto the collector 50. The resulting dry electrode 54 can then be collected onto another storage roll 58. Tension control systems 51 can also be employed by the system shown in FIG. 3.

Other means, methods, and setups for bonding of films to a current collector 50 can be used to form energy storage device electrodes, which should be limited only by the claims. For example, in one embodiment (not shown), a film comprised of a combination of a prior art so additive-based electrode layer and embedded dry particles from a container 19 could be bonded to a current collector 50.

Figure 4A:
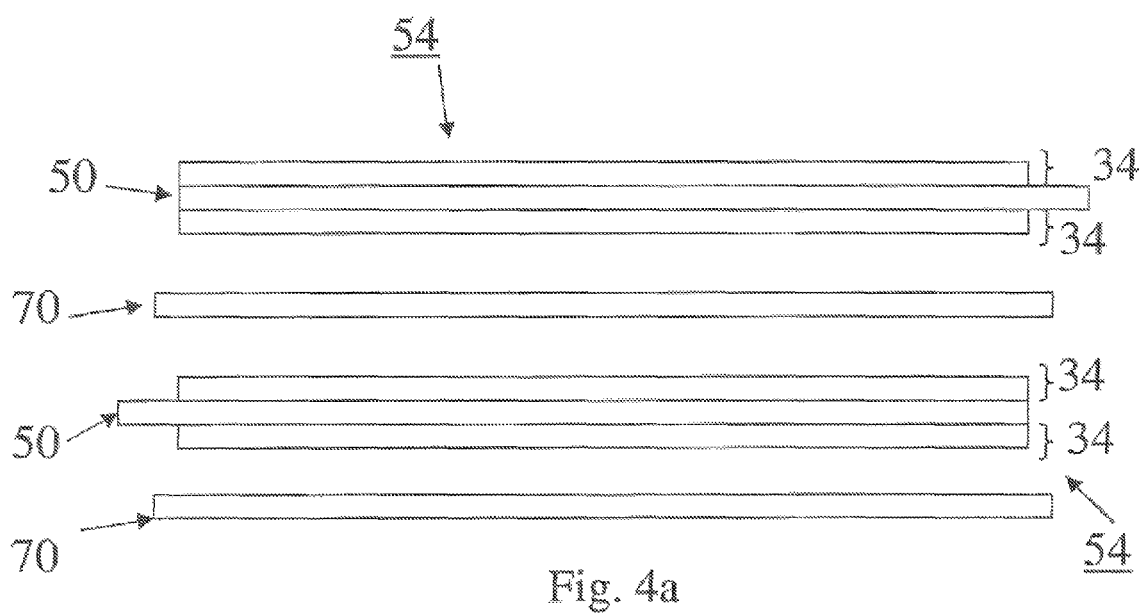
FIG. 4a is a side representation of one embodiment of a structure of an energy storage device electrode.
Figure 4B:
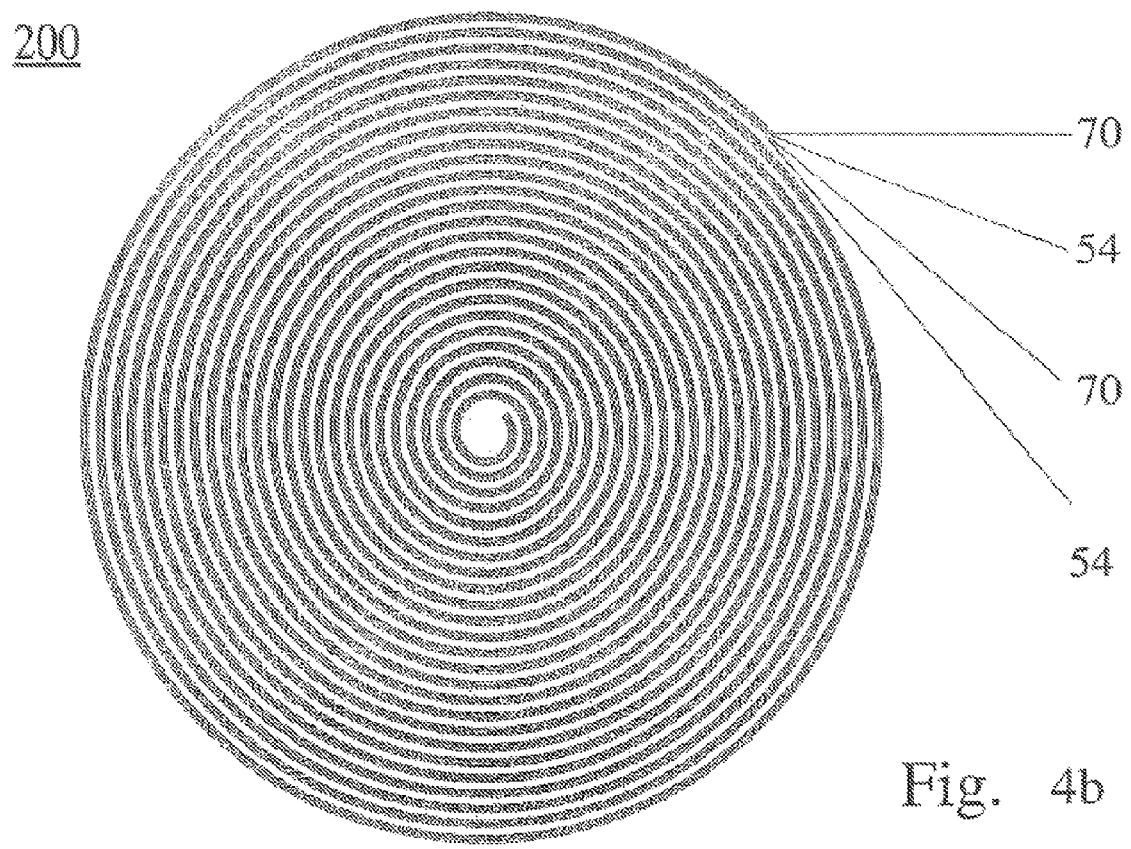
FIG. 4b is a top representation of one embodiment of an electrode.

Referring now to FIGS. 4a and 4b, and preceding Figures as needed, there are seen structures of an energy storage device. In FIG. 4a, there are shown cross-sections of four intermixed dry films 34, which are bonded to a respective current collector 50 according to one or more embodiments described previously herein. First surfaces of each of the dry films 34 are coupled to a respective current collector 50 in a configuration that is shown as a top dry electrode 54 and a bottom dry electrode 54. According to one or more of the embodiments discussed previously herein, the top and bottom dry electrodes 54 are formed from a blend of dry particles without use of any additives. In one embodiment, the top and bottom dry electrodes 54 are separated by a separator 70. In one embodiment, separator 70 comprises a porous paper sheet of about 30 microns in thickness. Extending ends of respective current collectors 50 are used to provide a point at which electrical contact can be effectuated. In one embodiment, the two dry electrodes 54 and separators 70 are subsequently rolled together in an offset manner that allows an exposed end of a respective collector 50 of the top electrode 54 to extend in one direction and an exposed end of a collector 50 of the bottom electrode 54 to extend in a second direction. The resulting geometry is known to those skilled in the art as a jellyroll and is illustrated in a top view by FIG. 4b.

Referring now to FIG. 4b, and preceding Figures as needed, first and second dry electrodes 54, and separator 70, are rolled about a central axis to form a rolled energy storage device electrode 200. In one embodiment, the electrode 200 comprises two dry films 34, each dry film comprising a width and a length. In one embodiment, one square meter of a 150 micron thick dry film 34 weighs about 0.1 kilogram. In one embodiment, the dry films 34 may comprise a thickness of about 80 to 260 microns. In one embodiment, depending on type of particle, particle composition, and/or roll-mill pressure other dry films may comprise a thickness of about 10 um to 2 mm. In one embodiment, a width of dry films described herein comprises between about 10 to 300 mm. In one embodiment, a length is about 0.1 to 5000 meters and the width is between 30 and 150 mm. Other particular dimensions may be may be determined by a required final energy storage device storage parameter. In one embodiment, the storage parameter includes values between 0.1 and 5000 Farads. With appropriate changes and adjustments, other dry film 34 dimensions and other capacitance are within the scope of the invention. Those skilled in the art will understand that offset exposed current collectors 50 (shown in FIG. 4a) extend from the roll, such that one collector extends from one end of the roll in one direction and another collector extends from an end of the roll in another direction. In one embodiment, the collectors 50 may be used to make electric contact with internal opposing ends of a sealed housing, which can include corresponding external terminals at each opposing end for completing an electrical contact.

Figure 5:
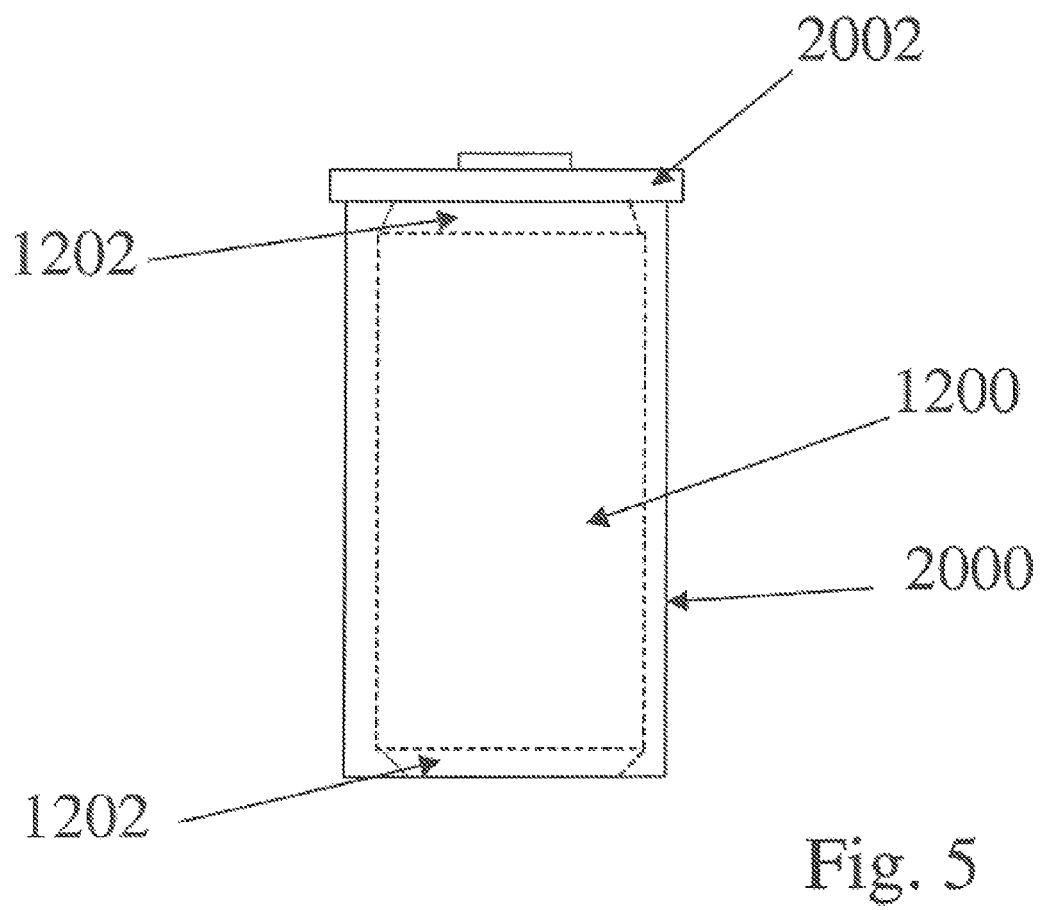
FIG. 5 is a side representation of a rolled electrode coupled internally to a housing.
Figure 6A:
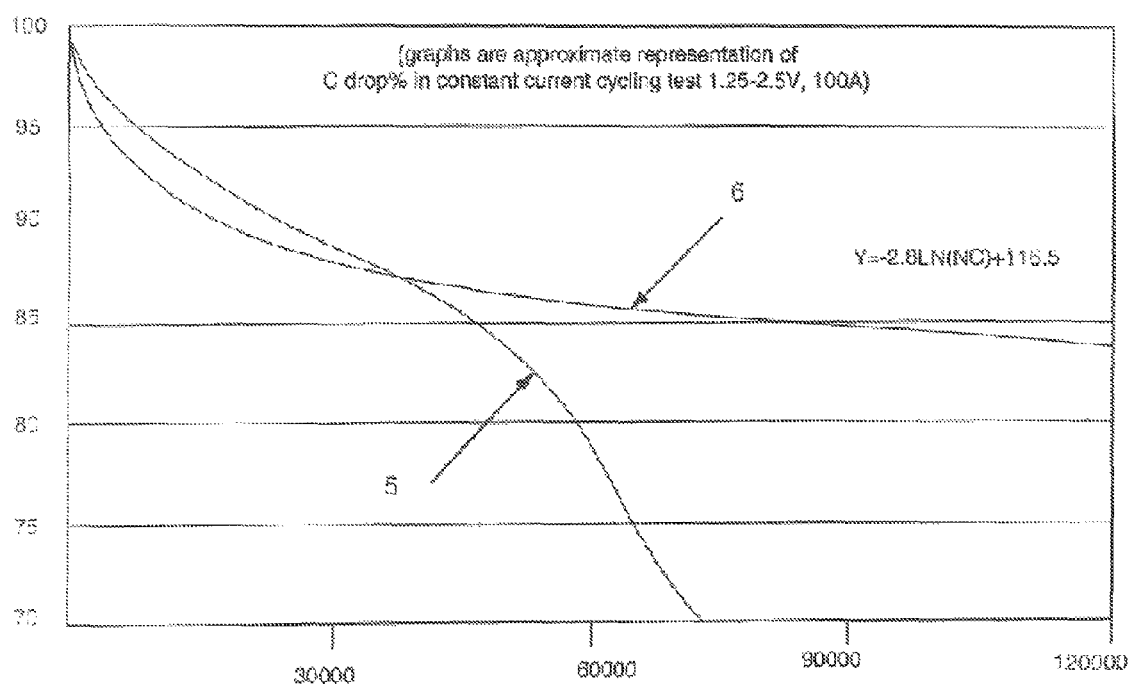
FIG. 6a shows capacitance vs. number of full charge/discharge charge cycles.
Figure 6C:
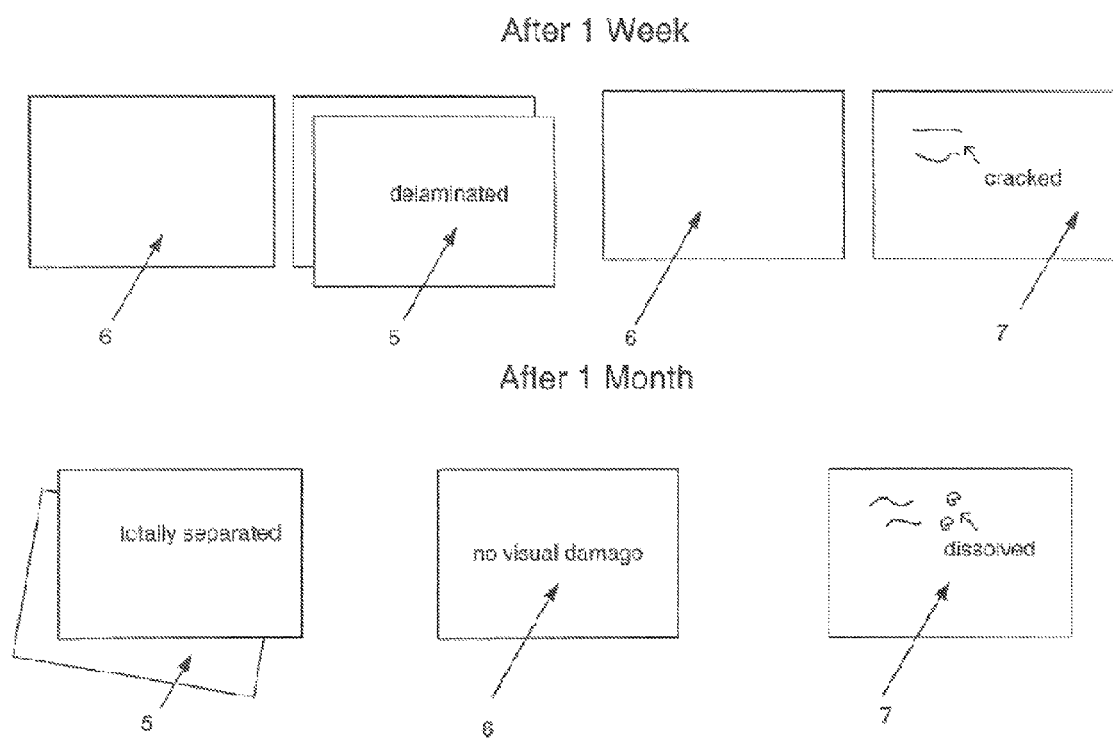
FIG. 6c shows effects of electrolyte on specimens of electrodes.

Referring now to FIG. 5, and preceding Figures as needed, during manufacture, a rolled electrode 1200 made according to one or more of the embodiments disclosed herein is inserted into an open end of a housing 2000. An insulator (not shown) is placed along a top periphery of the housing 2000 at the open end, and a cover 2002 is placed on the insulator. During manufacture, the housing 2000, insulator, and cover 2002 may be mechanically curled together to form a tight fit around the periphery of the now sealed end of the housing, which after the curling process is electrically insulated from the cover by the insulator. When disposed in the housing 2000, respective exposed collector extensions 1202 of electrode 1200 make internal contact with the bottom end of the housing 2000 and the cover 2002. In one embodiment, external surfaces of the housing 2000 or cover 2002 may include or be coupled to standardized connections/connectors/terminals to facilitate electrical connection to the rolled electrode 1200 within the housing 2000. Contact between respective collector extensions 1202 and the internal surfaces of the housing 2000 and the cover 2002 may be enhanced by welding, soldering, brazing, conductive adhesive, or the like. In one embodiment, a welding process may be applied to the housing and cover by an externally applied laser welding process. In one embodiment, the housing 2000, cover 2002, and collector extensions 1202 comprise substantially the same metal, for example, aluminum. An electrolyte can be added through a filling/sealing port (not shown) to the sealed housing 1200. In one embodiment, the electrolyte is 1.4 M tetramethylammonium or tetrafluoroborate in acetonitrile solvent. After impregnation and sealing, a finished product is thus made ready for commercial sale and subsequent use.

Figure 7:
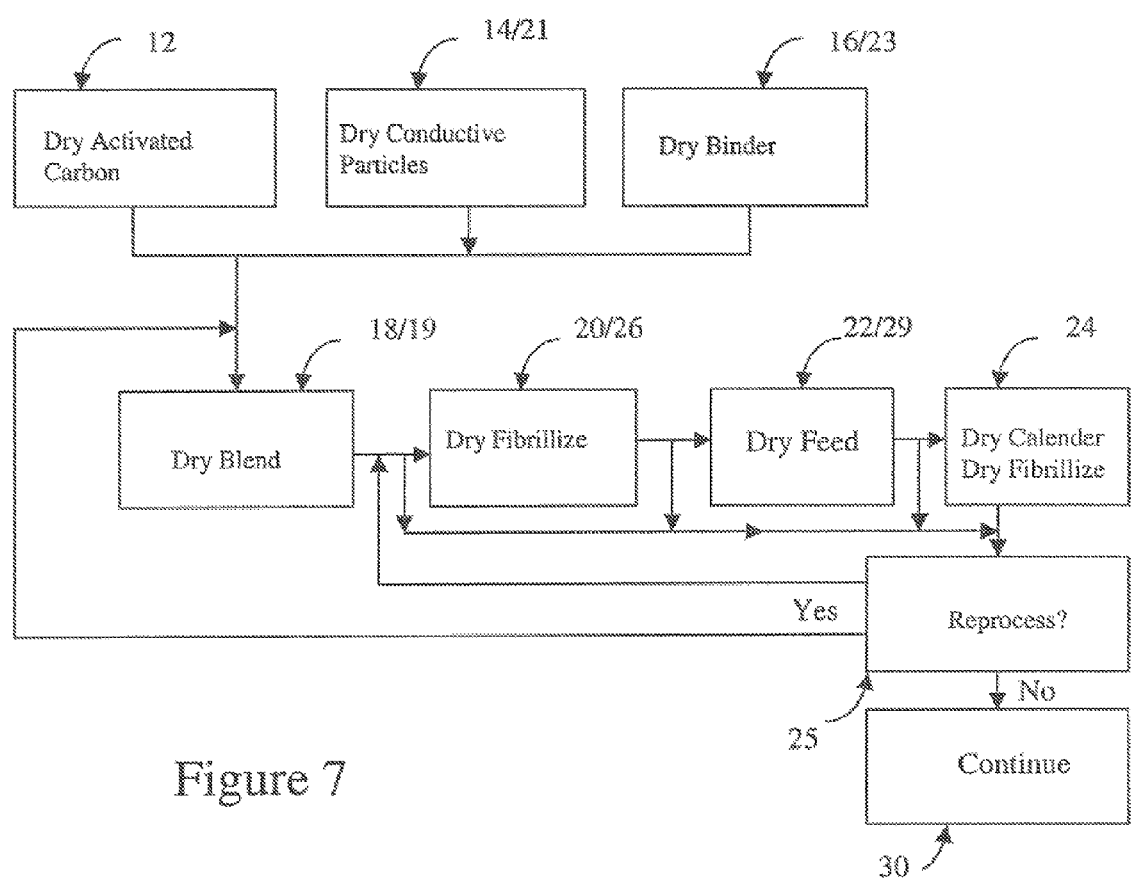
FIG. 7 illustrates a method for recycling/reusing dry particles and structures made therefrom.

Referring to FIG. 7, and preceding Figures as needed, there is seen a block diagram illustrating a method for reusing/recycling dry particles and structures made therefrom. It has been identified that problems may arise during one or more of the process steps described herein, for example, if various process parameters vary outside a desired specification during a process step. It is identified, according to embodiments described further herein, that dry particles 12, 14, 16, 21, 23, dry films 33 and 34, and one or more structures formed therefrom may be reused/recycled despite such problems arise, if so desired or needed. Because of use of additives, prior art process are unable provide such reuse/recycle process steps. In general, because one or more of the embodiments described herein do not utilize processing additives, the properties of the dry particles 12, 14, 16, 21, and/or 23 are not adversely altered ensuing process steps. Because solvent, lubricants, or other liquids are not used, impurities and residues associated therewith do not degrade the quality of the dry particles 12, 14, 16, 21, and/or 23, allowing the particles to be reused one or more times. Because minimal or nor drying times are needed, dry particles 12, 14, 16, 21, and/or 23 may be reused quickly without adversely affecting throughput of the dry process. Compared against the prior art, it has been identified that the dry particles and/or dry structures formed therefrom may be reused/recycled such that overall process yield and cost can be reduced without affecting overall quality.

It is identified that dry particles 12, 14, 16, 21, and/or 23 may be reused/recycled after being processed by a particular dry process step 19, 20, 22, 24, 26, 28, and/or 29. For example, in one embodiment, after dry process step 18 or 20, if it is determined that a defect in dry particles 12, 14, 16, and/or a structure formed therefrom is present, the resulting material may be collected in a dry process step 25 for reuse or recycling. In one embodiment, dry particles 12, 14, and 16 may be returned and reprocessed without addition of any other dry particles, or may be returned and added to fresh new additional particles 12, 14, and/or 16. Dry particles provided for recycling by step 25 may be reblended by dry blend step 18, and further processed according to one or more embodiments described herein. In one embodiment, a dry film 33 comprised of dry particles 12, 14, and 16 as described above in FIG. 2g, and provided as a self-supporting film 33 by step 24, may be recycled in step 25. In one embodiment, after dry process step 19, 26, or 29, if it is determined that a defect in dry particles 21, 23, or a structure formed therefrom is present, the resulting material may be collected in a dry process step 25 and returned for recycling. In one embodiment, dry particles 21 and 23 may be returned and reprocessed without addition of any other dry particles, or may be returned and added to fresh additional particles 21 or 23. Dry particles provided for recycling by step 25 may be reblended by dry blend step 19, and further processed according to one or more embodiments described herein. In one embodiment, dry particles 12, 14, 16, 21, and 23 as provided as a self-supporting film 34 by step 24 may be recycled in step 25. Prior to reuse, the dry film 33 or 34 can be sliced, chopped, or other wise be reduced in size so as to be more easily blended, by itself, or in combination with additional new dry particles 12, 14, 16, 21, and/or 23.

If after bonding dry film 34 to a collector, a defect in the resulting electrode is found, it is envisioned that the combination of dry film and bonded collector could also be sliced chopped, or otherwise reduced in size so as to be easily blended. Because the collector may comprise a conductor, in one embodiment, it is envisioned that the collector portion of the recycled electrode could provide similar functionality to that provided by the dry conductive particles. It is envisioned that the recycled/reused dry film 34 and collector mixture could be used in combination with additional new dry particles 12, 14, 16, 21, and/or 23.

In one embodiment, a certain percentage of dry reused/recycled dry material provided by step 25 can be mixed with a certain percentage of fresh dry particles 12, 14, 16, 21, and/or 23. In one embodiment a mix of fresh particles 12, 14, 16, 21, and/or 23; and dry reused/recycled material resulting from step 25 comprises a 50/50 mix. Other mixtures of new and old dry structures are also within the scope of the invention. In one embodiment, over all particle percentages by weight, after recycle/reuse steps described herein, may comprise percentages previously described herein, or other percentages as needed. In contrast to embodiments of intermixed film 34 discussed above, those skilled in the art will identify that a dry film 34 comprising one or more recycled structures may (depending on what particular point a recycle/use step was performed) comprise a dry film with less, or even no, particle distribution gradients (i.e. an evenly intermixed dry film).

Electro-chemical embodiments that fall within the scope of the present invention are thus understood to include a broad spectrum of technologies, for example, capacitor, battery, and fuel cell technologies. For a particular application, it is understood that different particles and different combinations of particles may be used and that the determination of such use would be within the scope of those skilled in the art. In a lithium polymer ion secondary battery application, it is identified that an anode electrode may be formed of particles that assist in the electrochemical intercalation (charging) and de-intercalation (discharging) of lithium ions. Such electrodes are typically bonded to a suitable metallic or electrically conductive current carrying substrate. Correspondingly, a cathode of a lithium polymer ion battery may be comprised of particles that assist in the electrochemical de-lithiation (charging) and lithiation (discharging) of lithium-metal oxide active material. Such cathodes can be typically bonded to a suitable metallic or electrically conductive current carrying substrate.

Figure 8:
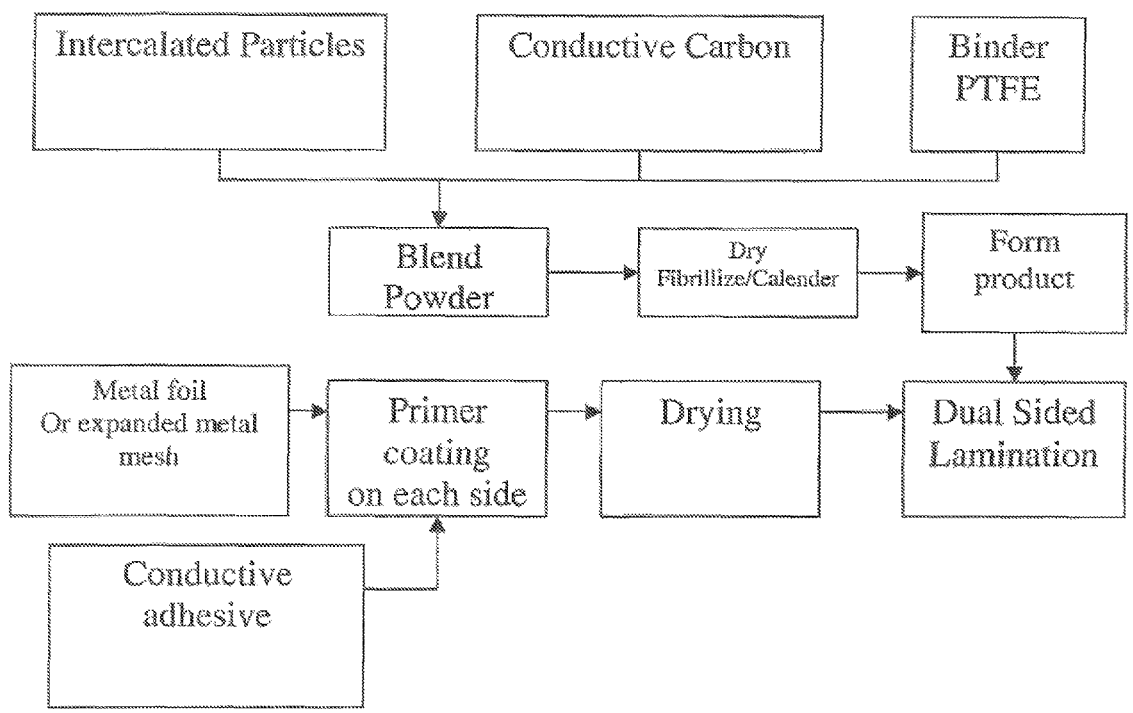
FIG. 8 illustrates in block diagram form a method for anode electrode fabrication.

Referring to FIG. 8, and preceding Figures as needed, there is seen in block diagram form a method for anode electrode fabrication. Intercalated carbon, and conductive carbon black are two types of particles used as constituent components in lithium-ion polymer battery anode construction. Accordingly, it is identified that the dry fibrillization of binder particles and/or dry formation of films described previously can be adapted to create dry anode films. In one embodiment, dry intercalated particles, dry conductive carbon particles, and dry binder are bended. In another step, the dry binder is dry fibrillized so as to form a matrix comprised of the dry particles. One or more subsequent steps of calendering and/or lamination may be used to form a battery anode. In various embodiments, formulations of dry intercalated, conductive, and binder particles may comprise 80 to 96% graphite, 0 to 10% carbon black, and 4 to 10% of fibrillizable binder.

Figure 9:
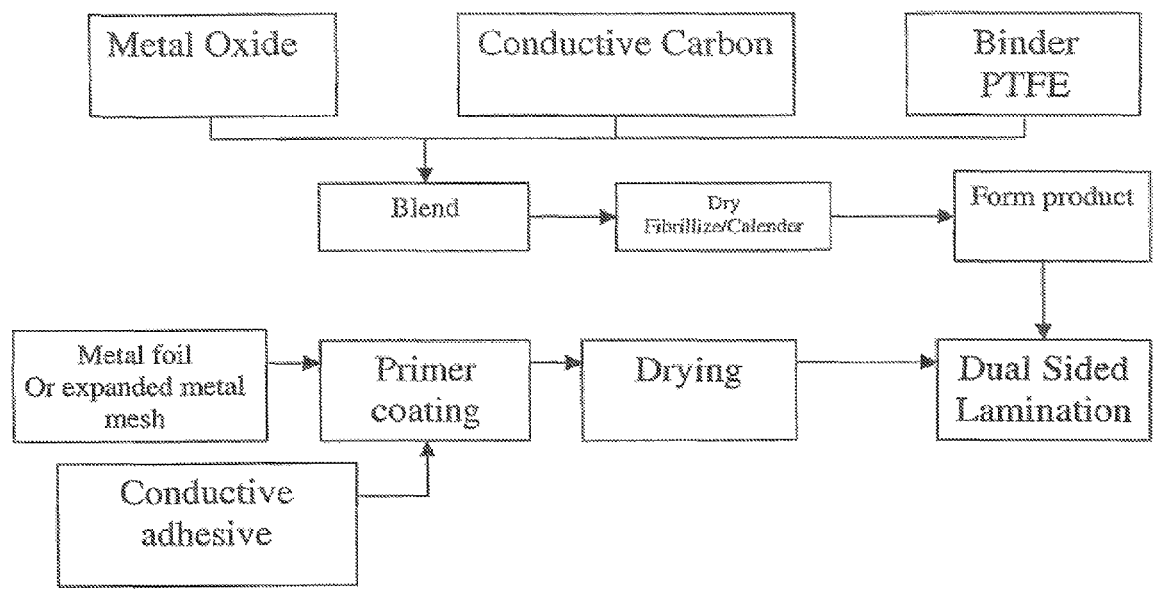
FIG. 9 illustrates in block diagram form a method for cathode electrode fabrication.

Referring to FIG. 9, and preceding Figures as needed, there is seen in block diagram a method for cathode electrode fabrication. Numerous types of lithiated metal oxides have been used to prepare cathodes for lithium-ion polymer batteries, including lithium cobalt oxide, and lithium manganese oxide. In one embodiment, metal oxide, dry conductive carbon so particles, and dry binder are bended. In another step, the dry binder is dry fibrillized so as to form a matrix comprised of the dry particles. One or more subsequent steps of calendering and/or lamination may be used to form a battery cathode. In various embodiments, formulations of metal oxide, conductive carbon, and binder particles may comprise 50 to 96% lithiated metal oxide, 0 to 10% conductive carbon, such as graphite, and 0.5 to 30% fibrillizable binder.

Variations in the dry processes described herein can also be adapted to manufacture of primary lithium batteries. In lithium primary batteries an anode typically comprises a lithium metal foil, while a cathode comprises a particulate material, such as a metal oxide. The cathode is capable of incorporating lithium ions into the metal oxide matrix during discharge. Manganese dioxide is a metal oxide readily used as an active cathode particulate material, which can be mixed with a conductive carbon to improve electrical resistance of the cathode film. In various embodiments, primary battery particulate blends may comprise from 50 to 96% manganese dioxide, 0 to 10% conductive particulate, such as graphite, and 1 to 50% fibrillizable binder.

In addition to primary and secondary batteries, it is identified that variations of principles described herein may be modified to so as to allow fabrication of electrodes used to support electrochemical reduction and oxidation reactions as typically found in fuel cell applications. Particulate materials commonly found in fuel cell electrodes include mixtures of conductive carbons, graphite, and carbons impregnated with catalyst such as noble metals. Other formulations for use in formation of dry electrode films include 0.1 to 30% catalyst impregnated carbon, 0 to 80% conductive carbon, and 1 to 50% fibrillizable polymer. In addition to single film electrodes, multiple films of particulate materials can be stacked together to provide specific electrochemical or physical properties. For example, using variations in dry fibrillization and/or dry film formation described previously, a particulate containing catalyst-impregnated carbon can be formed and be stacked with a film containing no catalyst, but with a high concentration of the fibrillizable binder. Formation of such as stack would allow operation of the electrode with the catalyst while the binder rich layer would reduce the transport of water through the electrode.

Figure 10:
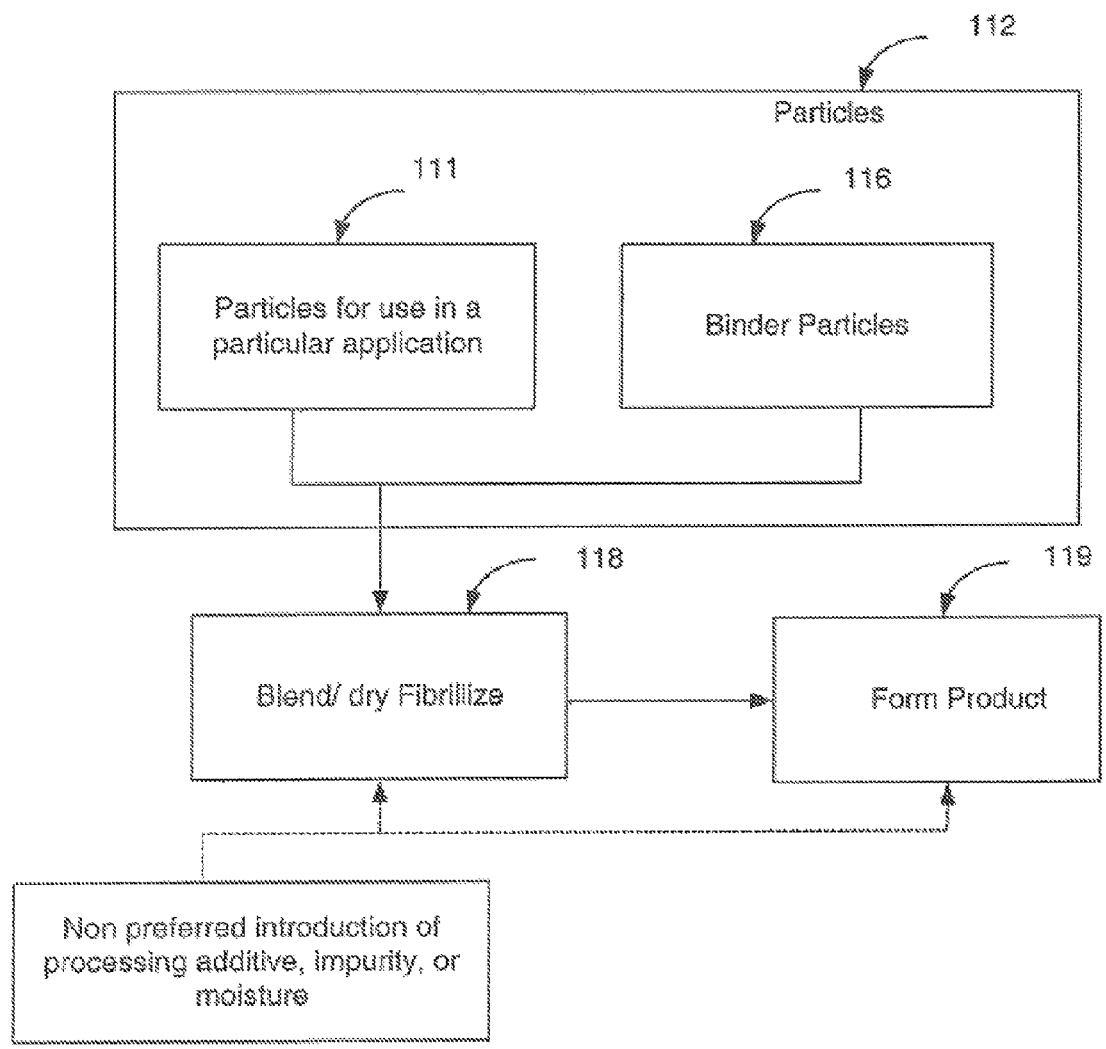
FIG. 10 illustrates in block diagram form other embodiments of the present invention.

Referring to FIG. 10, and preceding Figures as needed, there is seen in block diagram form a representation of another embodiment of the present invention. Although embodiments describe preferred minimization and/or elimination of additives, impurities, and/or moisture in the formation of products, the present invention can be viewed and interpreted more broadly As illustrated by FIG. 10, the present invention contemplates providing one or more particles 112 and blending and/or fibrillizing 118 at least some of the so particles, and forming the particles into a product 119. In one embodiment, the particles include a fibrillizable binder 116 and other particles as determined or required for a particular application. It is identified that the particles may include one or more of a fibrillizable binder, for example, a fluoropolymer such as polytetrafluoroethylene (PTFE) particles, or other possible fibrillizable binders such as ultrahigh molecular weight polypropylene, polyethylene, copolymers, polymer blends, and the like; and one or more applications specific particles, for example, carbon, graphite, intercalated carbon, conductive carbon, catalyst impregnated carbon, metal, metal oxide, manganese dioxide, thermoplastic, homo and copolymers, olefinic oxides, rubbers, butadiene rubbers, nitrile rubbers, polyisobutylene, poly (vinylesters), poly(vinylacetates), polyacrylate, fluorocarbon polymers, heparin, collagen, and other particles as needed. In one embodiment, fibrillization may effectuated by application of a positive pressure (for example, as by a jet mill and/or roll-mill) to binder so as to fibrillize the binder and form a matrix within which application specific particles may be supported. In one embodiment, it is envisioned that fibrillization may be effectuated by application of a negative pressure (for example, as applied to particles introduced into a jet-mill type of apparatus under a vacuum) to binder so as to fibrillize the binder and form a matrix within which application specific particles may be supported. In one embodiment, fibrillization is performed without the use of processing additives. It is, however, possible that in some embodiments, the inclusion of some trace or small amounts of processing additives, impurities, and/or moisture may be contemplated by those skilled in the art. For example, it is envisioned that in an embodiment wherein static is formed during step 118 or step 119, it may be desirable to intentionally add small amounts of static reducing additives. Such additive could for example comprise a mist of moisture, which could be removed by subsequent a desiccant or heated drying. In another embodiment, although it has been described that fibrillization of binder may be performed without the substantial introduction or use of processing additives, impurities, and/or moisture, to aid in the formation of a product, it is envisioned that the use of such may nevertheless find some utility, for example, to help increase the mass flow of particles during application of pressurized gas to the particles. It is understood however, that such deliberate introduction of additives and/or impurities would need to be weighed against the potential for reduced end product performance. In one embodiment, it may be possible to combine a dry blending step with a dry fibrillization step such that blending and fibrillization 118 occur in one apparatus and/or in one step and/or in other combinations of steps. Those skilled in the art will understand that formation of a product in step 119 contemplates that the product could be a dry film 33, a dry film 34, a dry electrode, or other structure comprised of dry fibrillized dry binder that fall within of the scope of the claimed invention.

Thus, the particular systems and methods shown and described herein in detail are capable of attaining the above described objects and advantages of the invention. However, the descriptions and drawings presented herein represent some, but not all, embodiments that have been practiced or that are broadly contemplated. For example, it is contemplated that fibrillization of binder could be used to enmesh types of particles other than those disclosed herein, including particles not normally used in electro-chemical applications. As well, products, structures, and methods that are disclosed may comprise configurations, variations, and dimensions other than those disclosed. In other embodiments, it is identified that in addition to products formed from films, sheets, cylinders, blocks, strings, and other structures are within the scope of structures that may be formed using principles disclosed herein. In one embodiment, an electro-chemical device made according to principles described herein may comprise two different electrode films that differ in composition and/or dimension (i.e. asymmetric electrodes). Housing designs may comprise coin-cell type, clamshell type, prismatic, cylindrical type geometries, as well as others as are known to those skilled in the art. For a particular type of housing, it is understood that appropriate geometrical changes to the embodiments described herein may be needed, but that such changes would be within the scope of those skilled in the art. In a non-energy storage medical embodiment, it is contemplated that dry fibrillization could be used to create matrix of a fibrillized fluoropolymer, and heparin and/or collagen mix, which could subsequently be formed or compacted into a sheet that could be applied to injuries. The present invention should be therefore limited only by the appended claims.

What is claimed is:

1. A process for manufacturing a cathode for use in a lithium ion battery, comprising:
   supplying dry carbon particles and dry metal oxide particles;
   supplying a dry binder consisting essentially of fibrillizable binder particles;
   dry milling the dry carbon particles, dry metal oxide particles and dry binder in the absence of solvent and additional binders to form a powdered dry cathode mixture including fibrillized binder;
   feeding the powdered dry cathode mixture including the fibrillized binder to a compactor to form a self-supporting dry film; and
   applying the dry film to an electrically conductive substrate to form the cathode.

2. The process of claim 1, wherein the metal oxide particles comprise lithium metal oxide particles.

3. The process of claim 2, wherein the lithium metal oxide particles comprise at least one of lithium cobalt oxide and lithium manganese oxide.

4. The process of claim 1, wherein the dry carbon particles comprise intercalated carbon particles.

5. The process of claim 1, further comprising calendering the powdered dry cathode mixture prior to applying the dry film to the electrically conductive substrate.

6. The process of claim 5, wherein the calendering comprises compressing the powdered dry cathode mixture in a roll mill.

7. The process of claim 6, wherein the roll mill is a heated roll mill.

8. The process of claim 1, wherein applying the dry film to the electrically conductive substrate comprising laminating the dry film to the electrically conductive substrate.

9. The process of claim 1, wherein the dry binder consists essentially of polytetrafluoroethylene (PTFE).

10. The process of claim 1, wherein the dry milling comprises jet milling.

11. The process of claim 1, wherein the carbon particles comprise conductive carbon.

12. The process of claim 1, wherein the carbon particles comprise graphite.

13. The process of claim 1, wherein the carbon particles comprise carbon black.

14. The process of claim 1, wherein the dry binder consists essentially of a fluoropolymer.

15. The process of claim 1, wherein the powdered dry cathode mixture comprises up to 10% dry carbon particles, 50% to 96% dry metal oxide particles, and 0.5% to 30% fibrillized binder.

16. The process of claim 1, wherein the dry film has a compression density greater than or equal to $0.45$ gm/cm$^3$.

17. The process of claim 1, wherein the electrically conductive substrate comprises a metal foil.

18. A method of manufacturing a lithium ion battery comprising:

making a cathode according to the process of claim 1:
providing an anode; and
placing the cathode and the anode into a housing with electrolyte.

19. The method of claim 18, wherein the anode comprises a milled dry mix of dry carbon and dry binder consisting essentially of fibrillated binder.

20. The method of claim 19, wherein the anode comprises a dry mix of 80% to 96% graphite, up to 10% carbon black, and 4% to 10% fibrillated binder.

21. The method of claim 18, wherein providing the anode comprises:
dry milling second dry carbon particles and a second dry binder in the absence of solvent and additional binders to form a powdered dry anode mixture including fibrillized binder;
feeding the powdered dry anode mixture including the fibrillized binder to a compactor to form a second self-supporting dry film; and
applying the second dry film to a second electrically conductive substrate to form the anode.

22. The method of claim 18, wherein the anode comprises a lithium metal foil.

23. The method of claim 18, wherein the electrolyte comprises acetonitrile.

24. The method of claim 23, wherein the electrolyte comprises tetrafluoroborate in an acetonitrile solvent.

25. The method of claim 18, wherein the electrolyte comprises tetramethylammonium.

26. The method of claim 18, wherein the electrolyte comprises carbonate-based electrolytes.

27. The method of claim 26, wherein the electrolyte comprises at least one of ethylene carbonate, propylene carbonate, and dimethylcarbonate.

28. The method of claim 18, wherein the electrolyte comprises an alkaline water solution.

29. The method of claim 28, wherein the electrolyte comprises at least one of potassium hydroxide (KOH) and sodium hydroxide (NaOH).

30. The method of claim 18, wherein the electrolyte comprises an acidic water solution.

31. The method of claim 30, wherein the electrolyte comprises sulfuric acid ($H_2SO_4$).

* * * * *